United States Patent
Hung et al.

(10) Patent No.: US 10,656,682 B2
(45) Date of Patent: May 19, 2020

(54) SECURITY APPARATUS

(71) Applicant: ACCO Brands Corporation, Lake Zurich, IL (US)

(72) Inventors: John Hung, Northern Vancouver (CA); Ryan White, San Francisco, CA (US); Guillermo Andres, Pleasanton, CA (US); David Thomas Dobson, Delta (CA); Jacque Gagne, Los Gatos, CA (US)

(73) Assignee: ACCO Brands Corporation, Lake Zurich, IL (US)

( * ) Notice: Subject to any disclaimer, the term of this patent is extended or adjusted under 35 U.S.C. 154(b) by 0 days.

(21) Appl. No.: 16/687,847

(22) Filed: Nov. 19, 2019

(65) Prior Publication Data

US 2020/0081497 A1    Mar. 12, 2020

Related U.S. Application Data

(63) Continuation of application No. 16/166,449, filed on Oct. 22, 2018, now Pat. No. 10,520,985, which is a continuation of application No. 15/784,690, filed on Oct. 16, 2017, now Pat. No. 10,146,264, which is a continuation of application No. 15/217,200, filed on Jul. 22, 2016, now Pat. No. 9,791,894, which is a continuation of application No. 14/275,051, filed on (Continued)

(51) Int. Cl.
*H05K 5/00* (2006.01)
*G06F 1/16* (2006.01)
*E05B 73/00* (2006.01)

(52) U.S. Cl.
CPC ............ *G06F 1/1656* (2013.01); *E05B 73/00* (2013.01); *E05B 73/0005* (2013.01); *E05B 73/0082* (2013.01); *G06F 1/16* (2013.01); *Y10T 70/402* (2015.04); *Y10T 70/413* (2015.04); *Y10T 70/50* (2015.04); *Y10T 70/5009* (2015.04); *Y10T 70/8973* (2015.04)

(58) Field of Classification Search
CPC .......... H05K 5/00; H05K 5/0208; H05K 5/02; H05K 5/0217; H05K 5/0221; E05B 73/0082
USPC ................................................. 361/679.55
See application file for complete search history.

(56) References Cited

U.S. PATENT DOCUMENTS 3,782,146 A    1/1974 Franke
4,015,456 A    4/1977 Moberg
(Continued)

*Primary Examiner* — Tremesha S Willis
(74) *Attorney, Agent, or Firm* — Michael Best & Friedrich LLP

(57) ABSTRACT

A security apparatus for securing a portable electronic device to an immovable object includes a locking head having a base and a first linear element extending from the base. The first linear element is configured to be inserted into the aperture of the portable electronic device. The locking head also has a movable engagement element coupled to an end of the first linear element opposite from the base. The movable engagement element is configured to be inserted into the aperture of the portable electronic device with the first linear element. The movable engagement element is movable to a position in which the movable engagement element is perpendicular to the first linear element to secure the locking head to the portable electronic device. The security apparatus also includes a security device attached to the locking head and configured to engage the immovable object.

20 Claims, 53 Drawing Sheets

Related U.S. Application Data

May 12, 2014, now Pat. No. 9,423,823, which is a continuation of application No. 12/446,560, filed as application No. PCT/US2007/082113 on Oct. 22, 2007, now Pat. No. 8,842,422.

(60) Provisional application No. 60/940,318, filed on May 25, 2007, provisional application No. 60/909,867, filed on Apr. 3, 2007, provisional application No. 60/853,888, filed on Oct. 23, 2006.

(56) References Cited

U.S. PATENT DOCUMENTS

| | | |
|---|---|---|
| 4,030,321 A | 6/1977 | Kenyon |
| 4,186,952 A | 2/1980 | Glass |
| 4,300,371 A | 11/1981 | Herwick et al. |
| 4,391,110 A | 7/1983 | Nielsen, Jr. |
| 4,394,820 A | 7/1983 | Swisher |
| 4,441,347 A | 4/1984 | Taylor |
| 4,543,807 A | 10/1985 | Swisher |
| 4,637,234 A | 1/1987 | Mielonen |
| 4,742,703 A | 5/1988 | DeWalch et al. |
| 4,756,638 A | 7/1988 | Neyret |
| 4,801,232 A | 1/1989 | Hempel |
| 4,818,032 A | 4/1989 | Thomas |
| 4,995,652 A | 2/1991 | Mugnolo et al. |
| 5,050,836 A | 9/1991 | Makous |
| 5,063,763 A | 11/1991 | Johnson |
| 5,076,079 A | 12/1991 | Monoson et al. |
| 5,082,232 A | 1/1992 | Wilson |
| 5,088,853 A | 2/1992 | Reid |
| 5,121,618 A | 6/1992 | Scott |
| 5,138,785 A | 8/1992 | Paterson |
| 5,146,769 A | 9/1992 | Smith |
| 5,154,456 A | 10/1992 | Moore et al. |
| 5,170,650 A | 12/1992 | Kortenbrede |
| 5,171,049 A | 12/1992 | Grandy, Sr. et al. |
| 5,190,466 A | 3/1993 | McVey |
| 5,261,758 A | 11/1993 | Vranish |
| 5,305,621 A | 4/1994 | Broadwater |
| 5,327,752 A | 7/1994 | Myers et al. |
| 5,346,349 A | 9/1994 | Giovannetti |
| 5,351,507 A | 10/1994 | Derman |
| 5,381,685 A | 1/1995 | Carl et al. |
| 5,440,909 A | 8/1995 | Ely et al. |
| 5,447,049 A | 9/1995 | Shieh |
| 5,548,981 A | 8/1996 | Kirk |
| 5,593,265 A | 1/1997 | Kizer |
| 5,597,260 A | 1/1997 | Peterson |
| 5,626,435 A | 5/1997 | Wohlhuter |
| 5,630,632 A | 5/1997 | Swan |
| 5,653,147 A | 8/1997 | Kelley et al. |
| 5,666,829 A | 9/1997 | Aikens |
| 5,709,110 A | 1/1998 | Greenfield et al. |
| 5,722,268 A | 3/1998 | Choi |
| 5,732,580 A | 3/1998 | Gamault et al. |
| 5,761,934 A | 6/1998 | Kuo |
| 5,791,171 A | 8/1998 | Kelley |
| 5,799,520 A | 9/1998 | Laabs et al. |
| 5,829,280 A | 11/1998 | Chen |
| 5,875,657 A | 3/1999 | Kelley |
| 5,913,907 A | 6/1999 | Lee |
| 5,916,279 A | 6/1999 | Shieh |
| 5,960,652 A | 10/1999 | Marmstad |
| 5,983,679 A | 11/1999 | Reyes |
| 5,992,187 A | 11/1999 | Derman |
| 6,003,348 A | 12/1999 | McCrea |
| 6,006,555 A | 12/1999 | Shu-Fen |
| 6,189,407 B1 | 2/2001 | Champ et al. |
| 6,193,207 B1 | 2/2001 | Umberg |
| 6,199,413 B1 | 3/2001 | McDaid et al. |
| 6,205,824 B1 | 3/2001 | Miao |
| 6,212,918 B1 | 4/2001 | Kravtin |
| 6,237,376 B1 | 5/2001 | Surratt |
| 6,244,080 B1 | 6/2001 | Sakurai |
| 6,244,082 B1 | 6/2001 | Avganim |
| 6,254,303 B1 | 7/2001 | Falat et al. |
| 6,257,029 B1 | 7/2001 | Liao |
| 6,305,197 B1 | 10/2001 | Ling |
| 6,321,579 B1 | 11/2001 | Reyes |
| 6,322,284 B1 | 11/2001 | Bonardo et al. |
| 6,341,510 B1 | 1/2002 | Tervo et al. |
| 6,360,405 B1 | 3/2002 | McDaid et al. |
| 6,363,759 B1 | 4/2002 | Ive et al. |
| 6,389,853 B1 | 5/2002 | Pate et al. |
| 6,393,875 B1 | 5/2002 | Garel et al. |
| 6,401,502 B1 | 6/2002 | Yang |
| 6,449,992 B1 | 9/2002 | Yu et al. |
| 6,505,487 B1 | 1/2003 | Garel et al. |
| 6,520,464 B1 | 2/2003 | Morrissey et al. |
| 6,523,373 B1 | 2/2003 | Su |
| 6,536,244 B1 | 3/2003 | Chang |
| 6,601,416 B1 | 8/2003 | Sanders |
| 6,619,078 B1 | 9/2003 | Reese |
| 6,619,080 B1 | 9/2003 | Yu |
| 6,619,081 B1 | 9/2003 | Yu |
| 6,622,532 B2 | 9/2003 | Hsu |
| 6,634,616 B2 | 10/2003 | Belknap |
| 6,662,484 B1 | 12/2003 | Andree et al. |
| 6,672,117 B2 | 1/2004 | Yu |
| 6,726,071 B2 | 4/2004 | Baseflug et al. |
| 6,779,370 B2 | 8/2004 | Bellow, Jr. et al. |
| 6,802,723 B2 | 10/2004 | Decime et al. |
| 6,813,918 B2 | 11/2004 | Reese |
| 6,834,895 B2 | 12/2004 | Lin |
| 6,854,302 B2 | 2/2005 | Zapushek et al. |
| 6,862,905 B2 | 3/2005 | Zapushek |
| 6,880,373 B2 | 4/2005 | Ling |
| 6,918,272 B1 | 7/2005 | Sanders |
| 6,924,975 B2 | 8/2005 | Lai |
| 6,964,184 B1 | 11/2005 | Gregory |
| 6,968,716 B1 | 11/2005 | Ling |
| 6,971,254 B2 | 12/2005 | Bellow, Jr. et al. |
| 6,991,479 B2 | 1/2006 | Miao |
| 7,073,358 B1 | 7/2006 | Lee |
| 7,076,977 B2 | 7/2006 | Lee |
| 7,080,763 B2 | 7/2006 | Allen et al. |
| 7,775,071 B2 | 8/2010 | Agbay |
| 2001/0049949 A1 | 12/2001 | Igelmund |
| 2002/0114665 A1 | 8/2002 | Quardt et al. |
| 2002/0157431 A1 | 10/2002 | Lurie et al. |
| 2003/0015007 A1 | 1/2003 | Zapushek et al. |
| 2003/0029208 A1 | 2/2003 | Merrem et al. |
| 2003/0036054 A1 | 2/2003 | Ladisch et al. |
| 2003/0106349 A1 | 6/2003 | Broadbridge et al. |
| 2003/0138829 A1 | 7/2003 | Unger et al. |
| 2003/0159476 A1 | 8/2003 | Bellow, Jr. et al. |
| 2003/0192354 A1 | 10/2003 | DeWalch et al. |
| 2003/0200775 A1 | 10/2003 | Yu |
| 2004/0025546 A1 | 2/2004 | Reese |
| 2004/0035158 A1 | 2/2004 | Chang |
| 2004/0129037 A1 | 7/2004 | Avganim |
| 2004/0157281 A1 | 8/2004 | Hulkower et al. |
| 2004/0168486 A1 | 9/2004 | Ling |
| 2004/0261473 A1 | 12/2004 | Avganim |
| 2005/0079010 A1 | 4/2005 | Droppleman |
| 2005/0223756 A1 | 10/2005 | Ling et al. |
| 2005/0235710 A1 | 10/2005 | Ling |
| 2005/0262904 A1 | 12/2005 | Ling et al. |
| 2006/0075794 A1 | 4/2006 | Ling et al. |
| 2006/0081021 A1 | 4/2006 | Merrem et al. |
| 2006/0086160 A1 | 4/2006 | Marszalek et al. |
| 2006/0117816 A1 | 6/2006 | Lee |
| 2006/0150692 A1 | 7/2006 | Chang et al. |
| 2006/0267570 A1 | 11/2006 | Arkin |

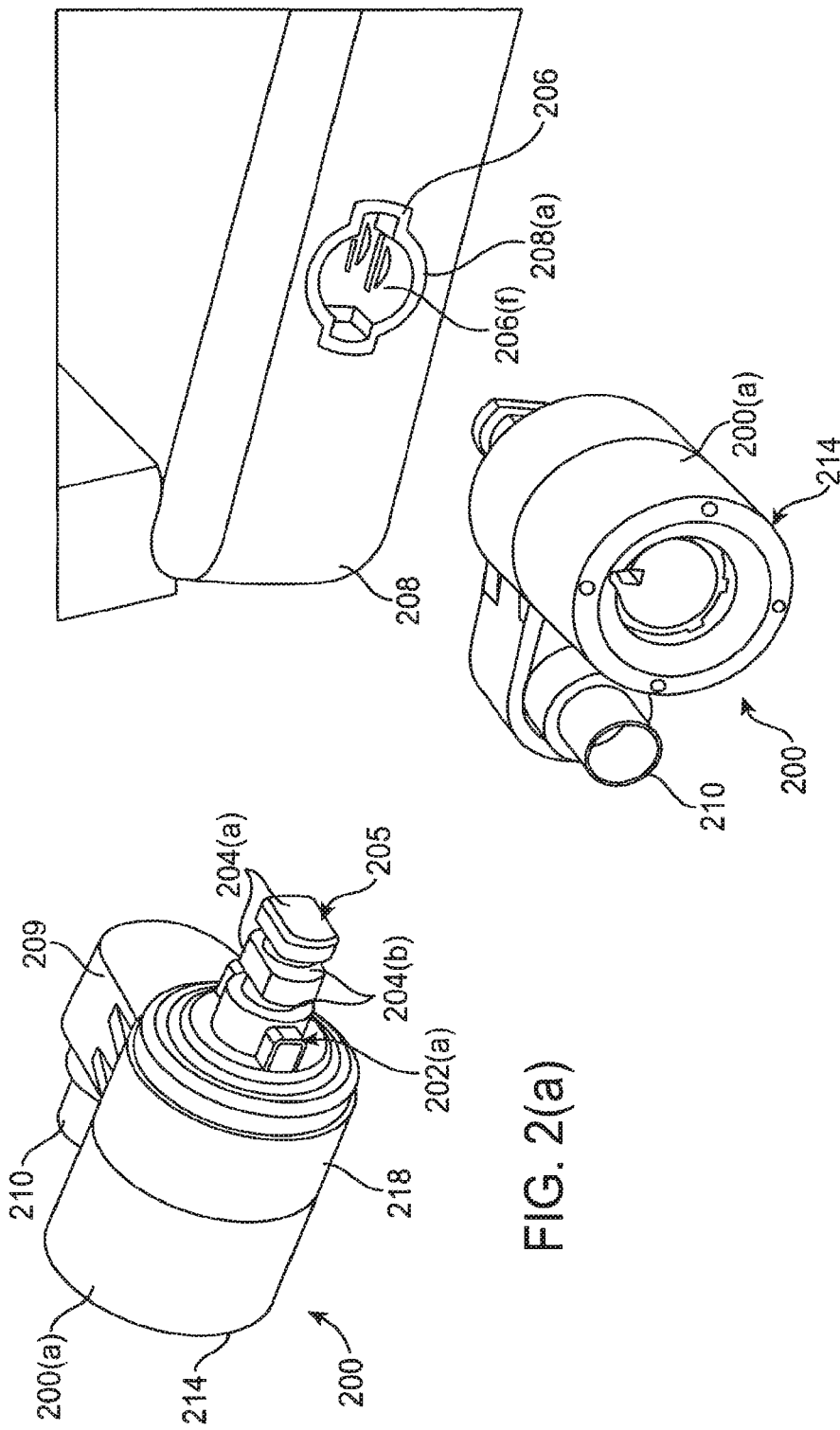

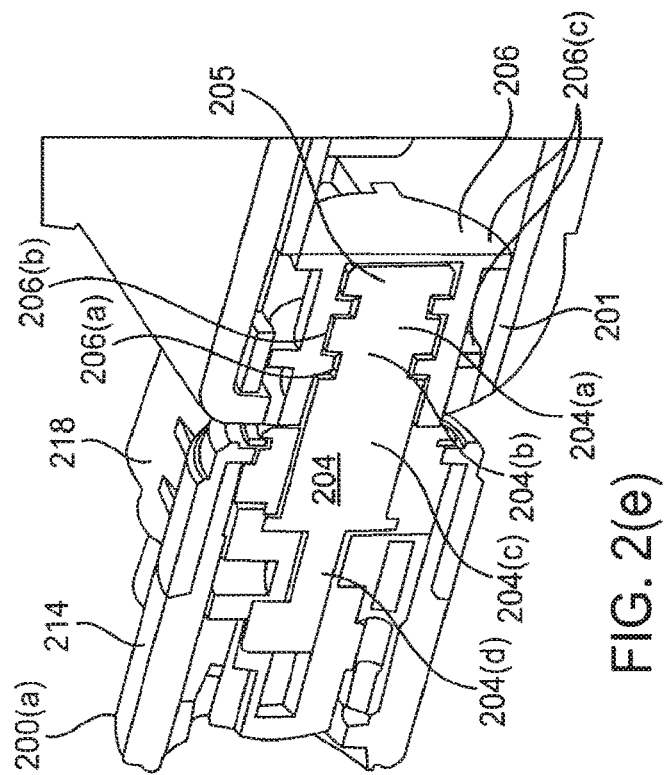
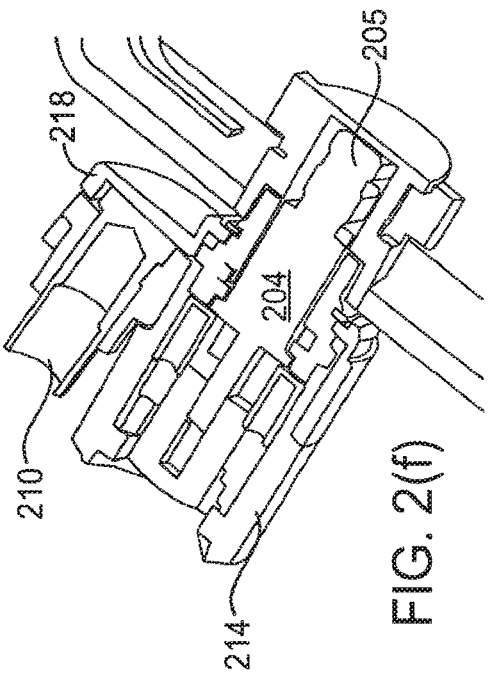
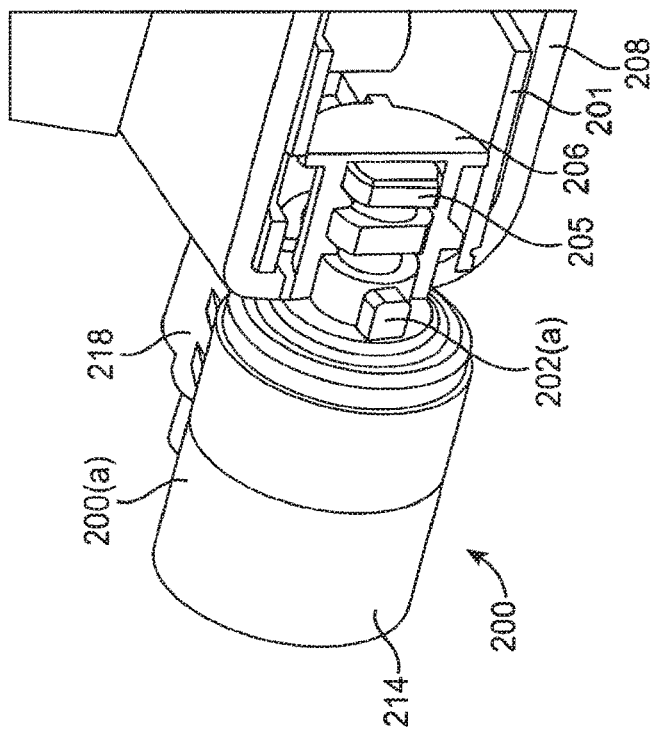
FIG. 2(e)
FIG. 2(f)
FIG. 2(d)

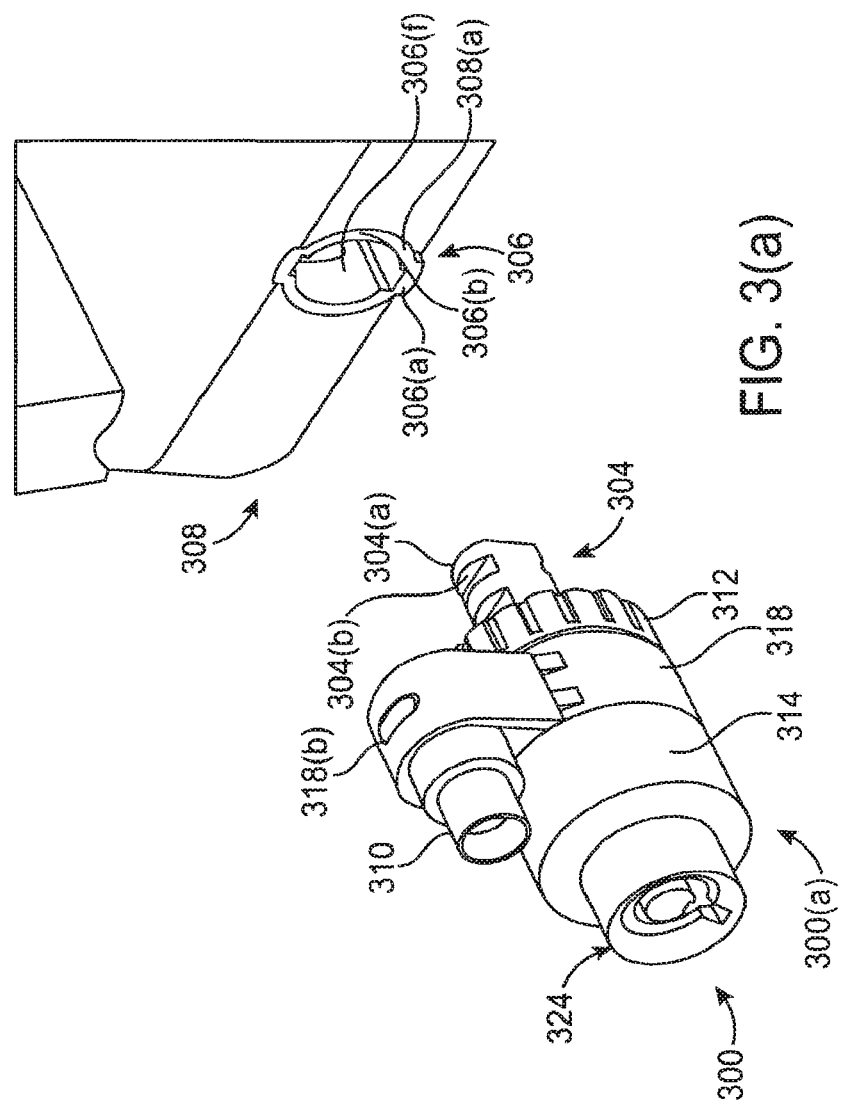

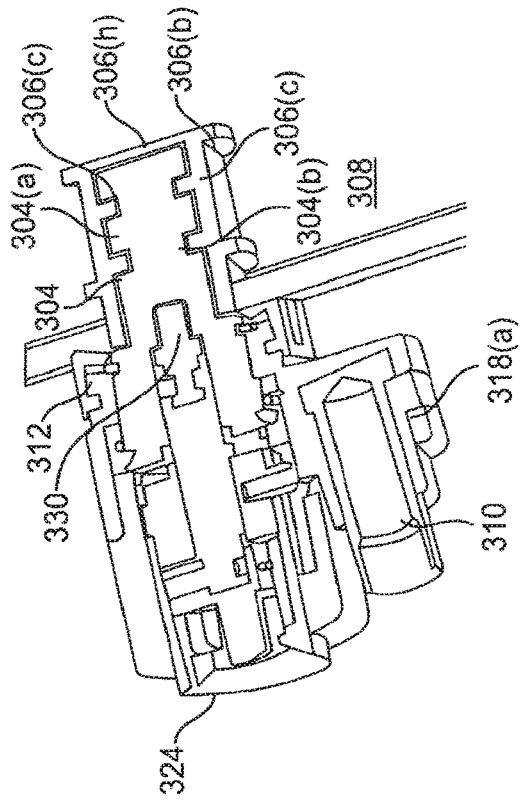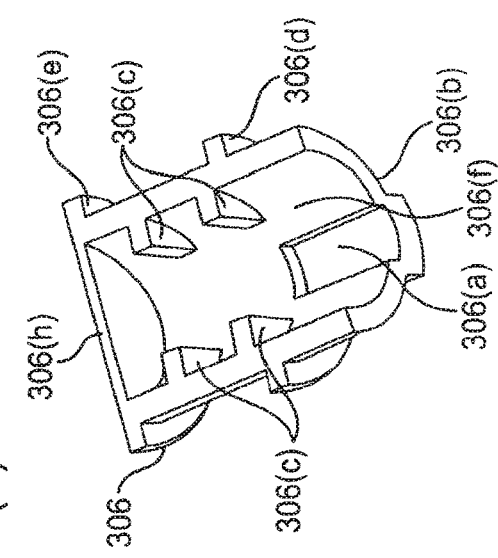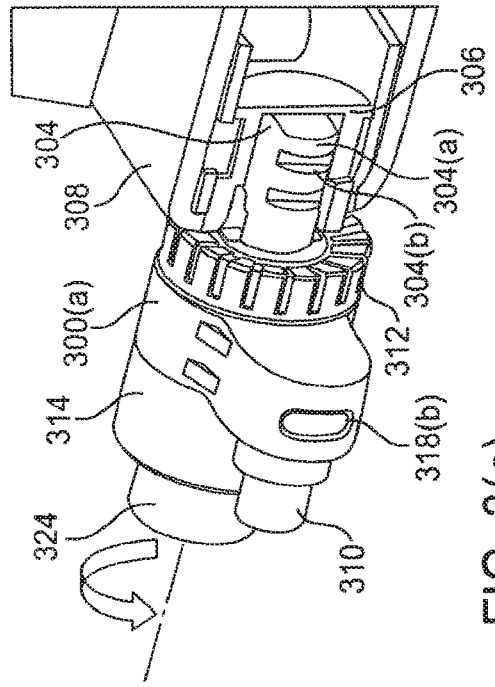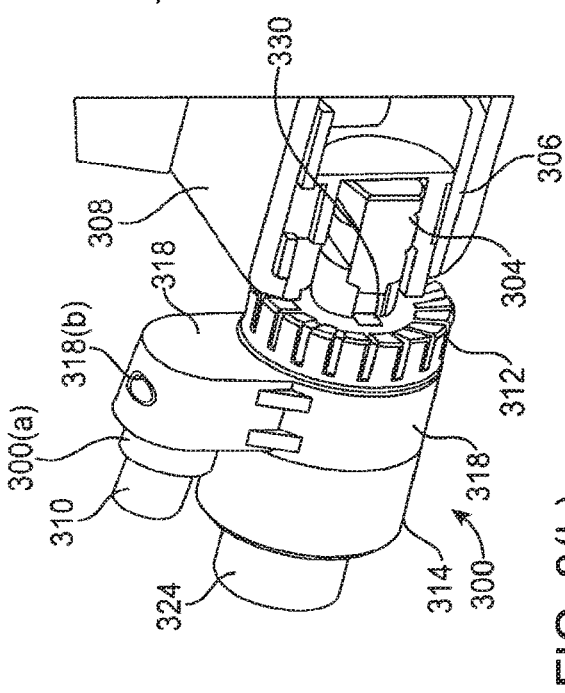

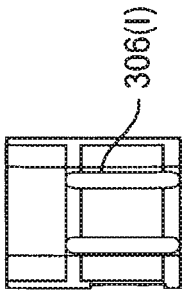
FIG. 3(l)
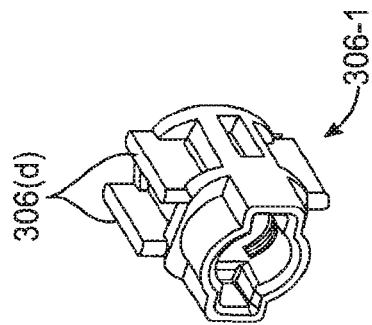
FIG. 3(k)
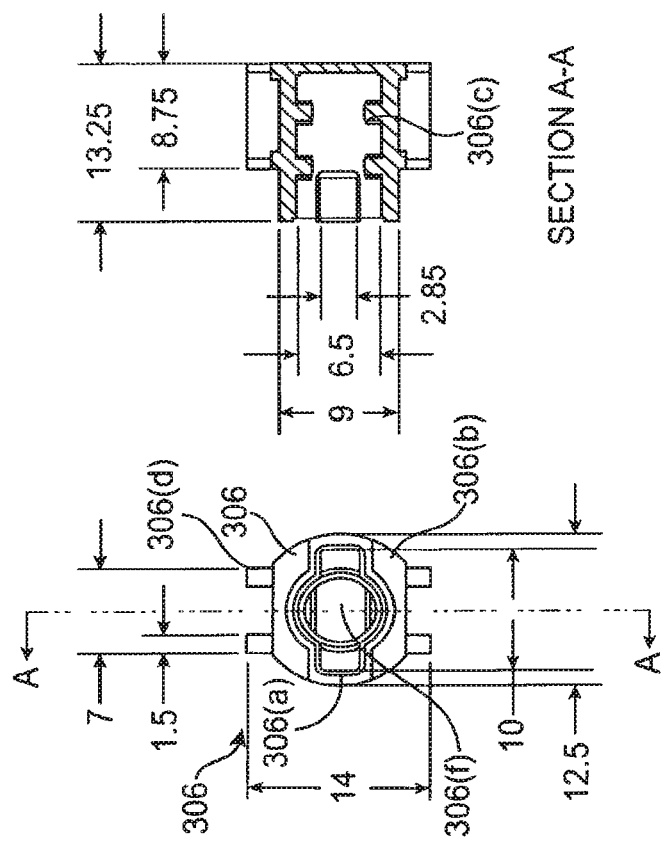
FIG. 3(j)
FIG. 3(i)

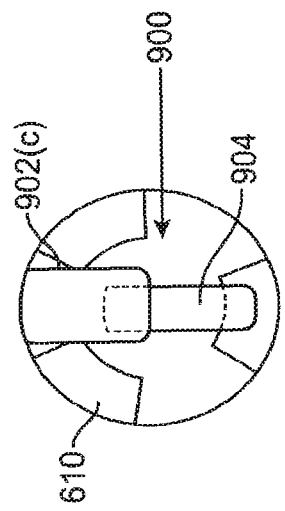
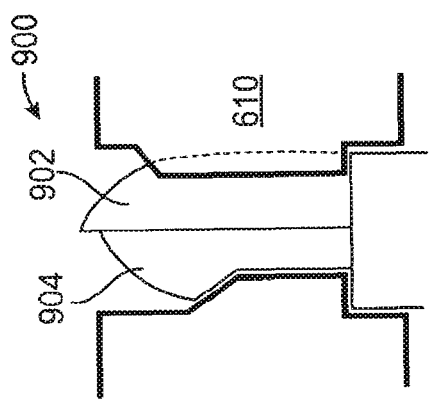
FIG. 9(c)
FIG. 9(d)
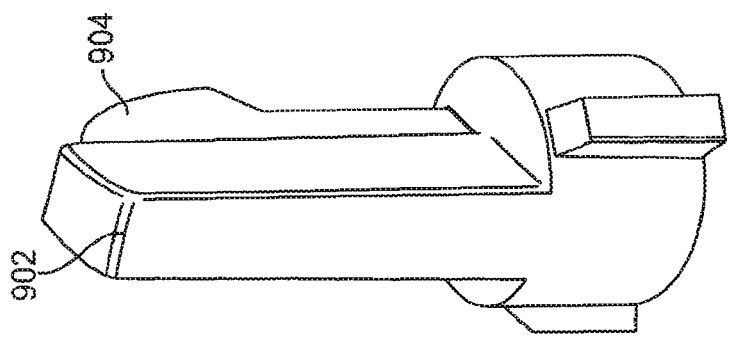
FIG. 9(b)
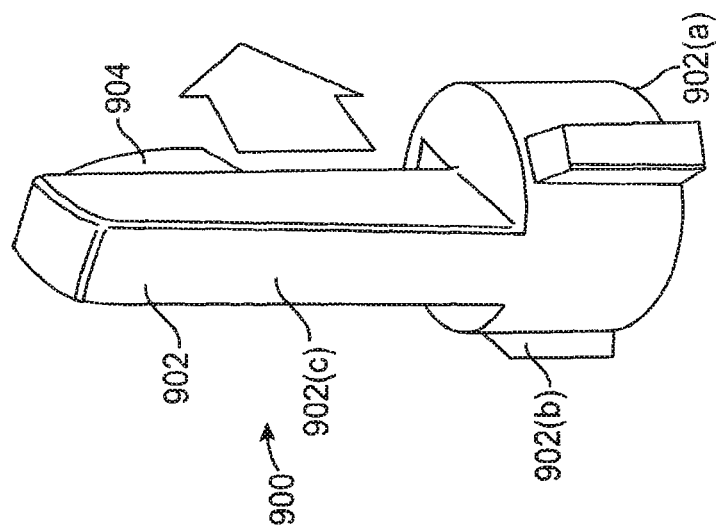
FIG. 9(a)

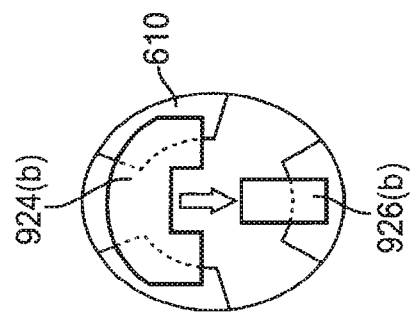
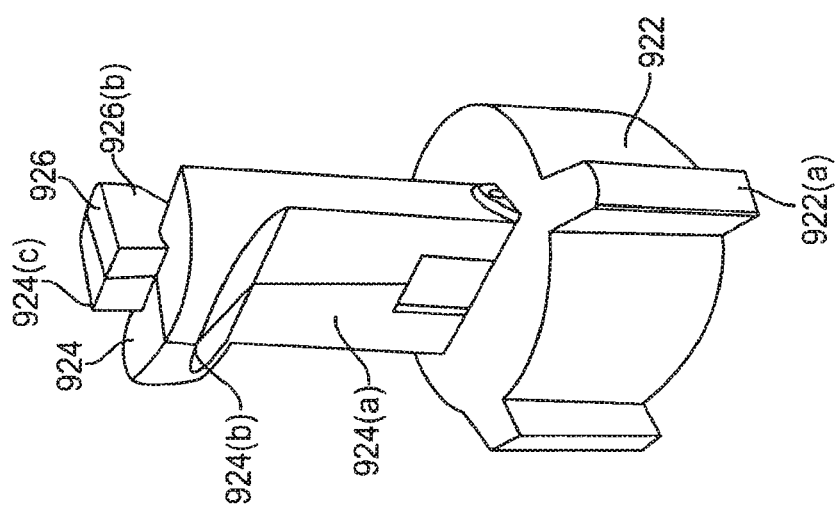
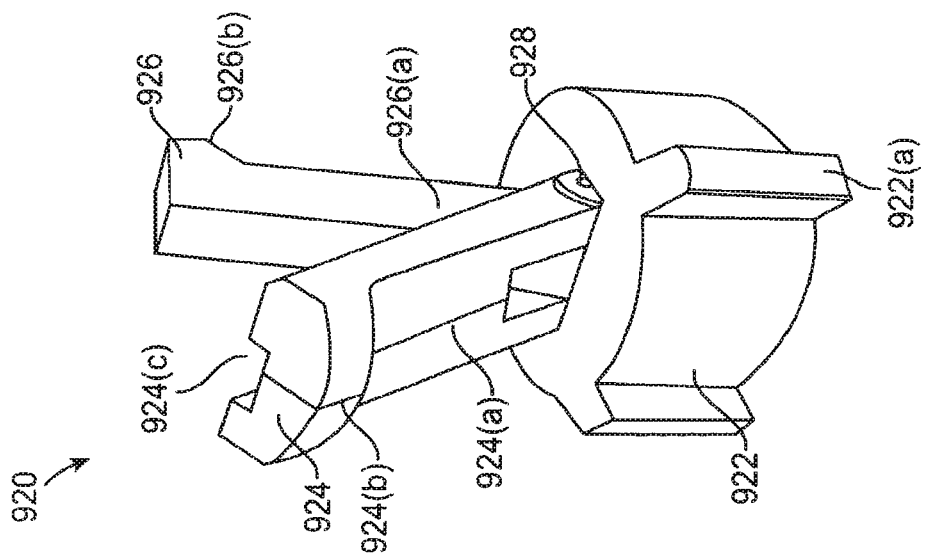

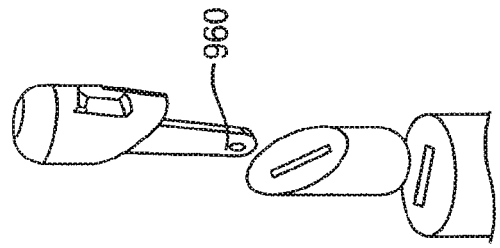
FIG. 14(c)
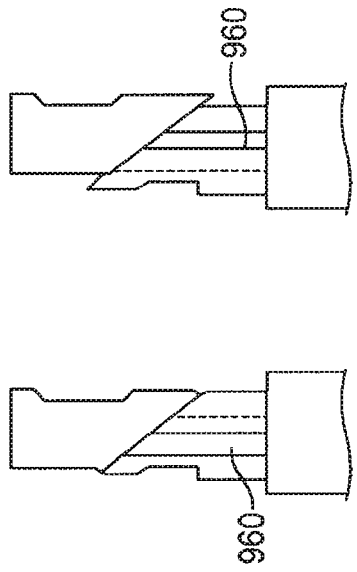
FIG. 14(e)
FIG. 14(d)
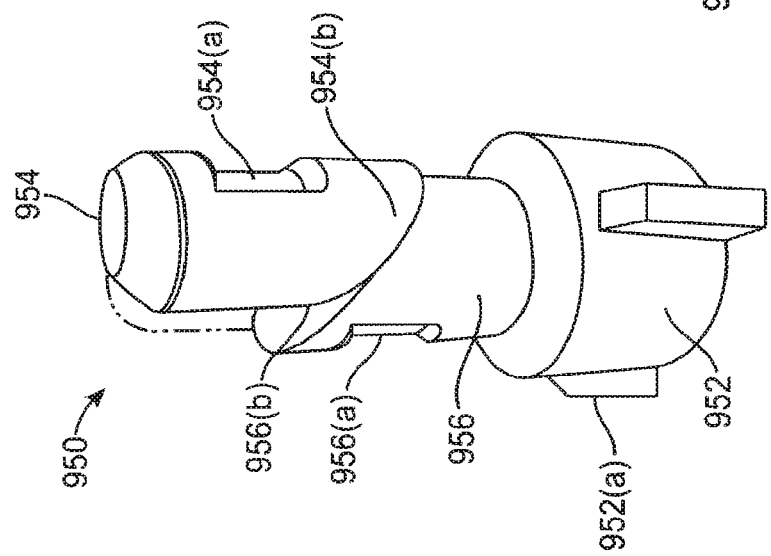
FIG. 14(b)
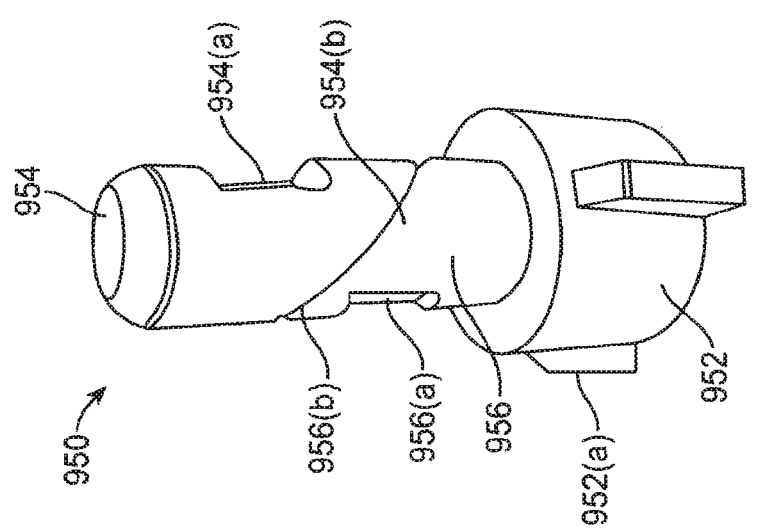
FIG. 14(a)

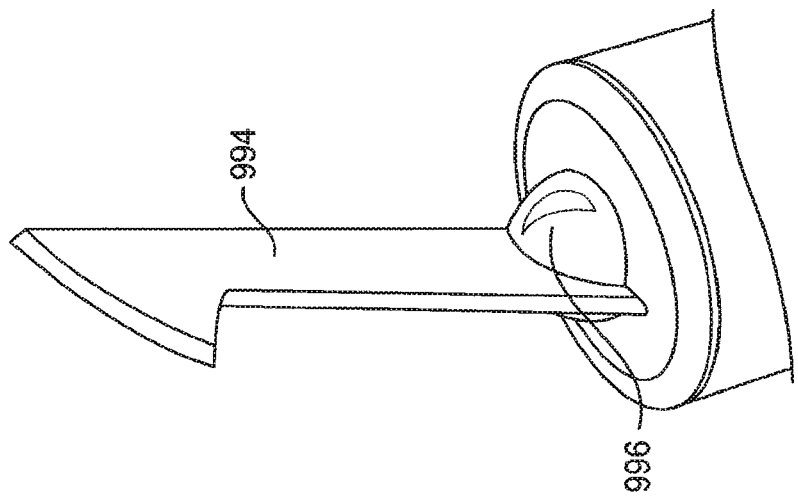
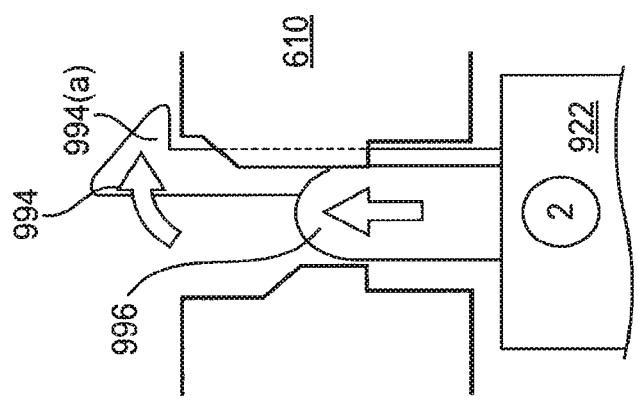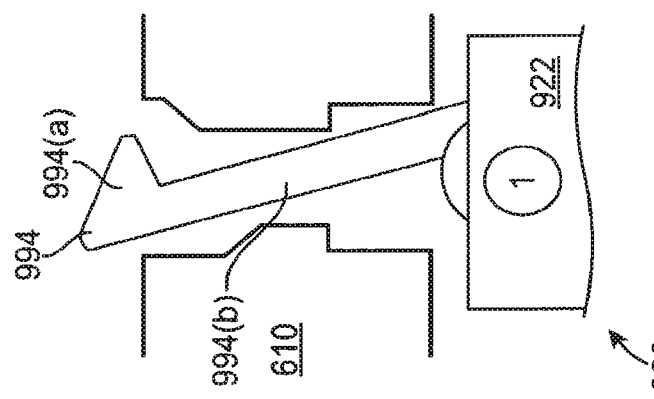

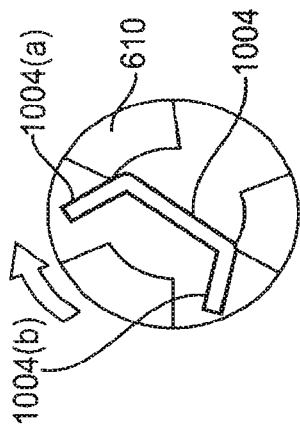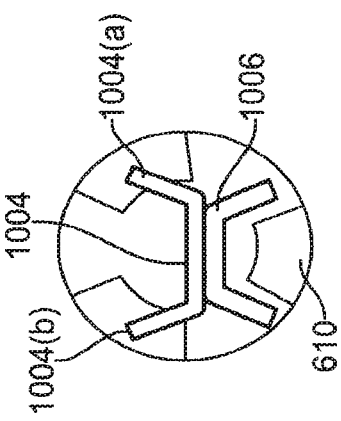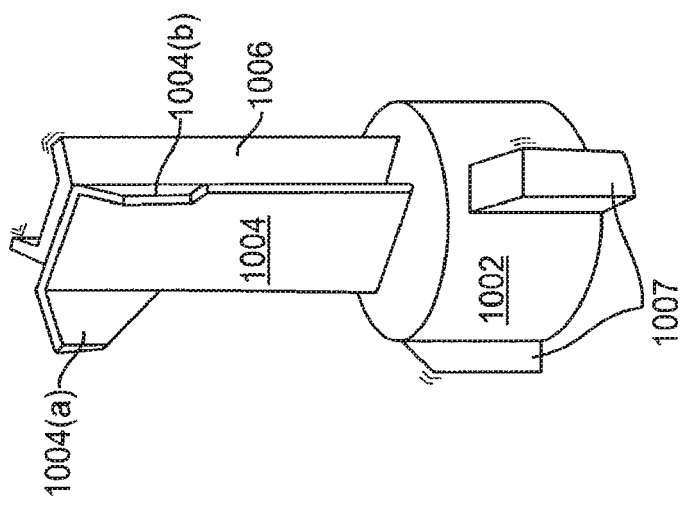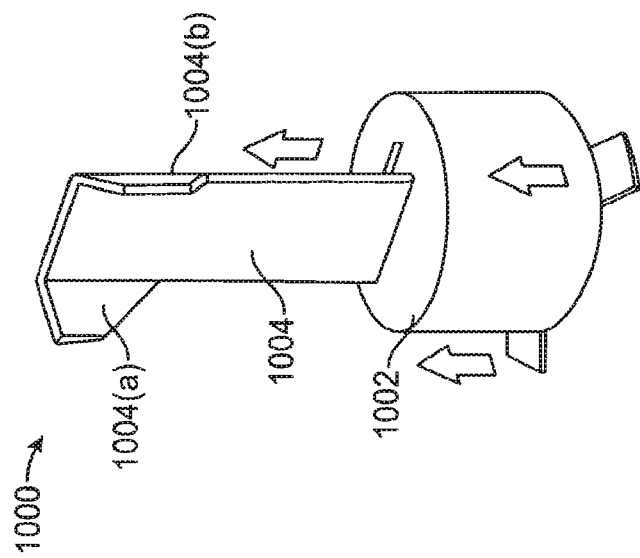

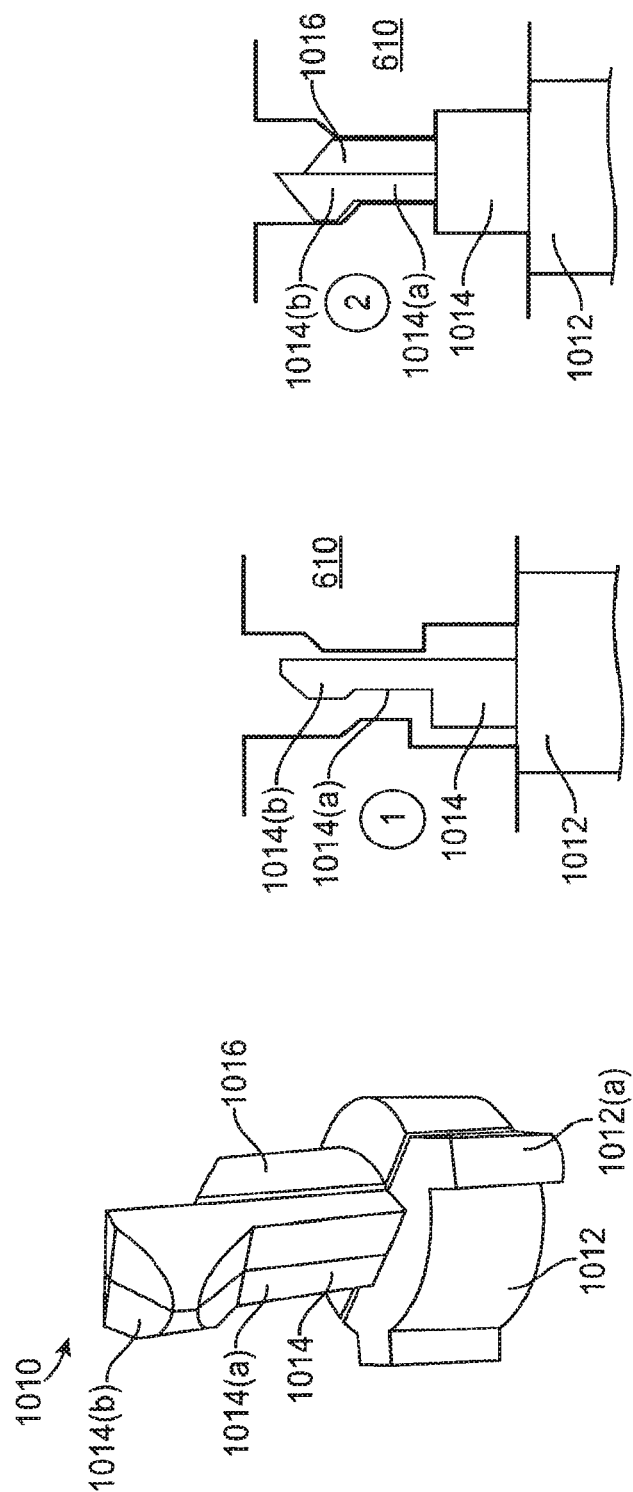

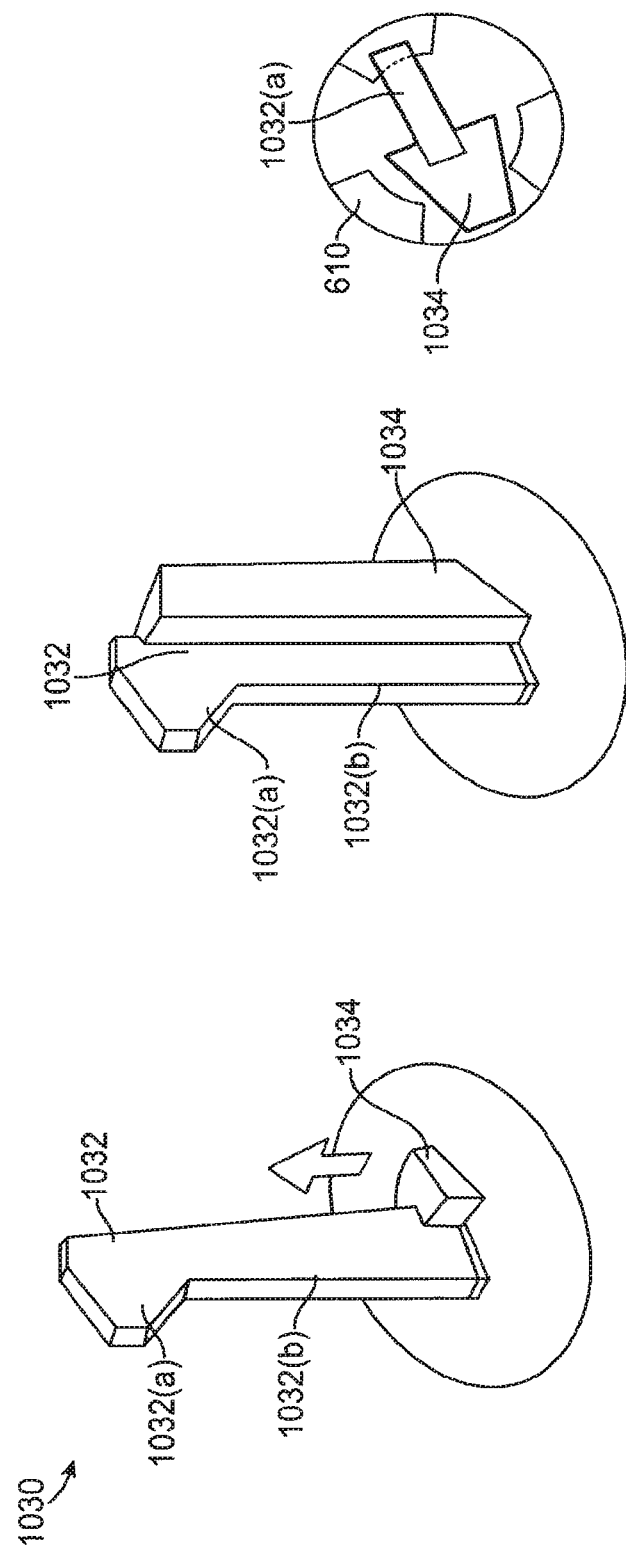

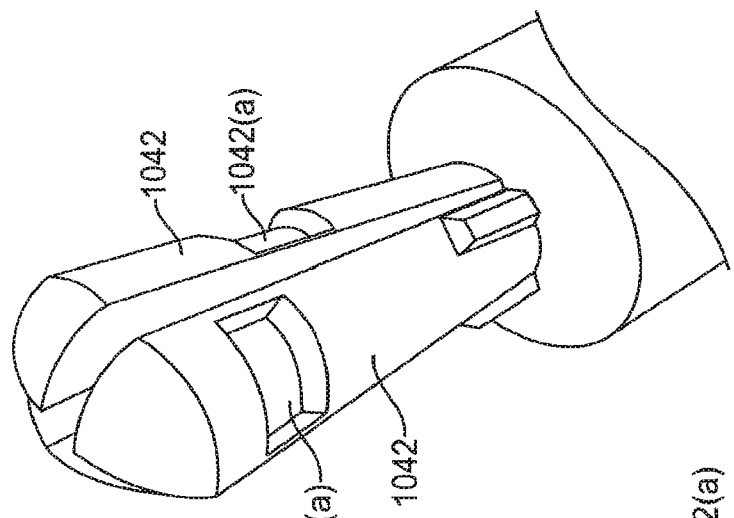
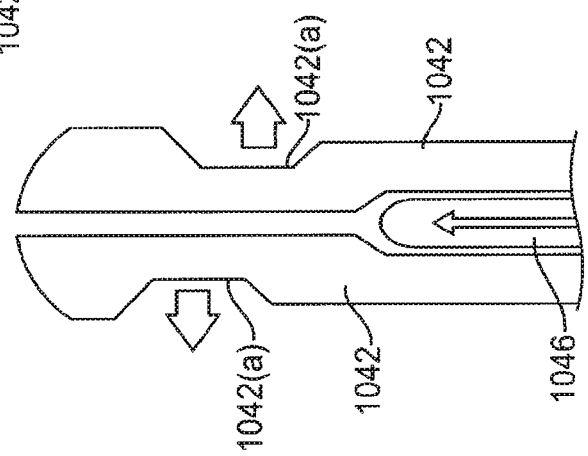
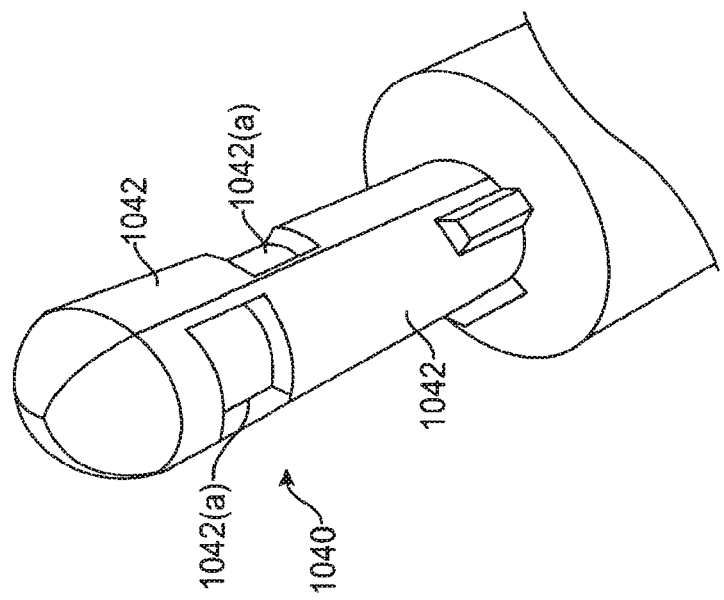
FIG. 23(a)
FIG. 23(b)
FIG. 23(c)

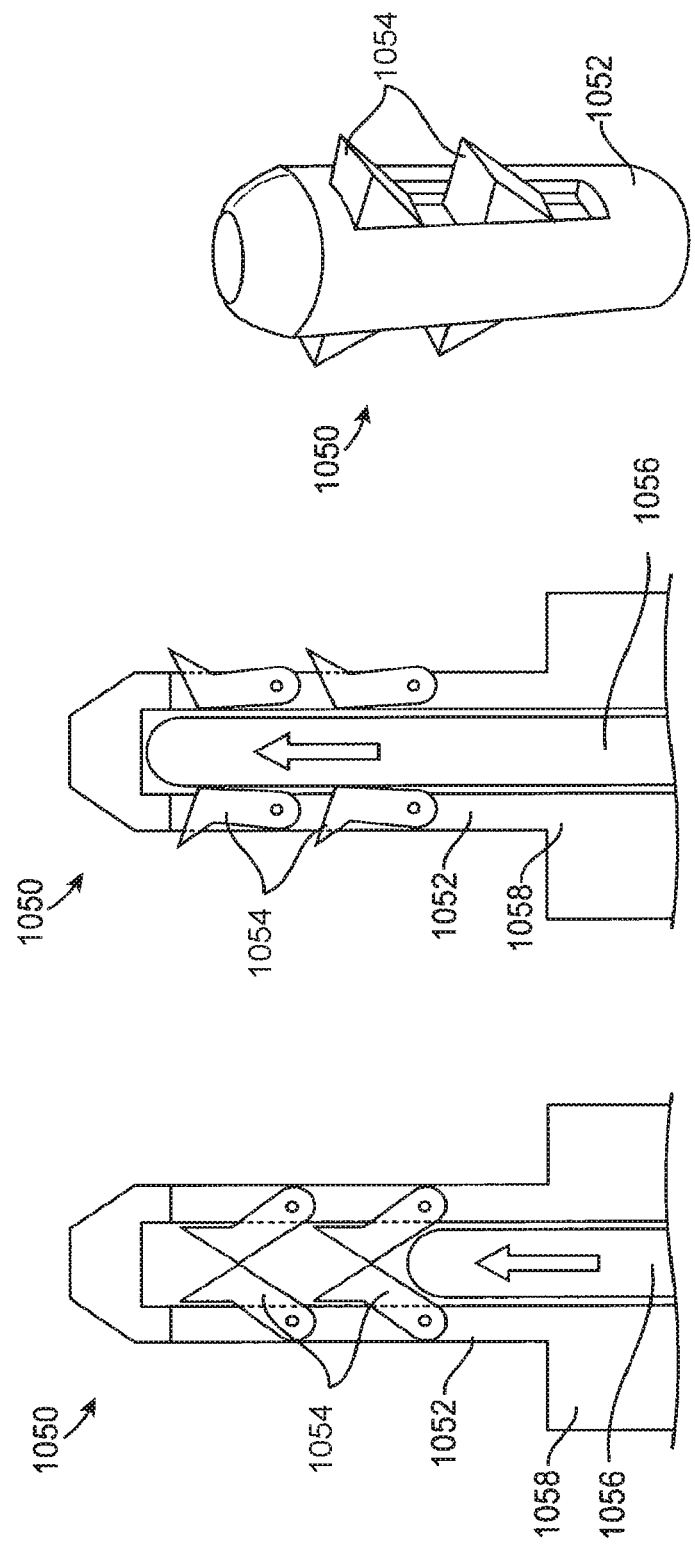

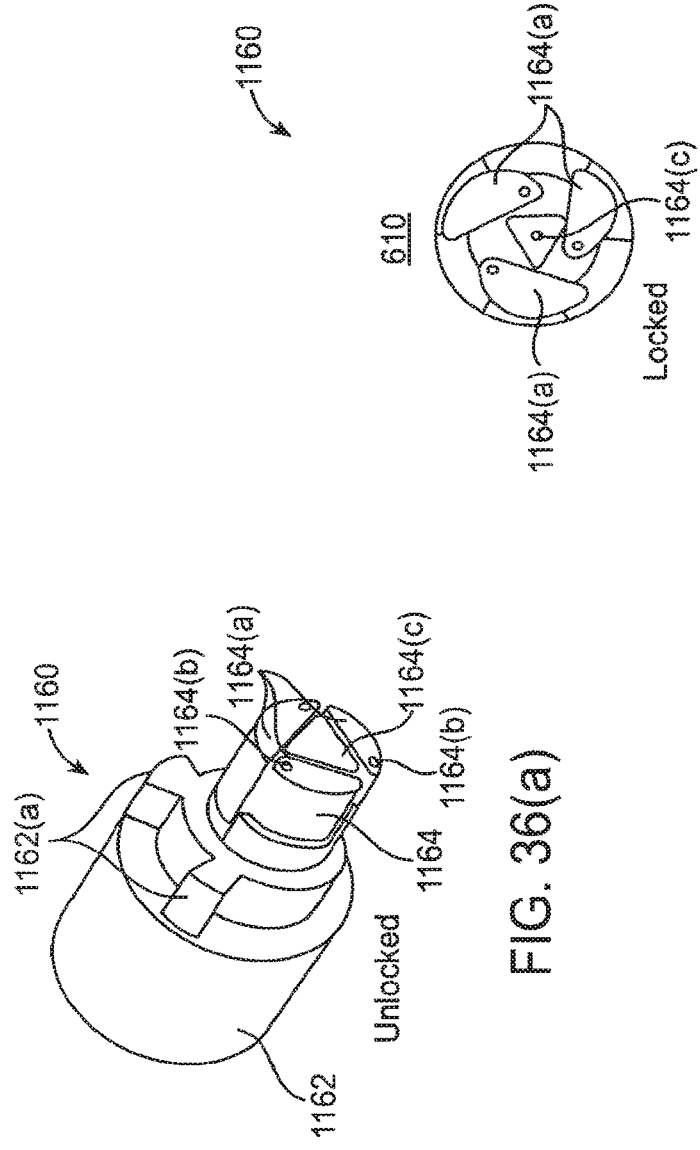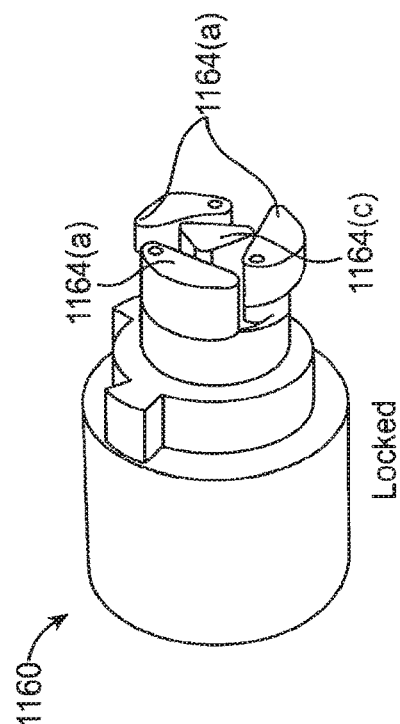

SECURITY APPARATUS

CROSS-REFERENCES TO RELATED APPLICATIONS

This application is a continuation of U.S. patent application Ser. No. 16/166,449, filed on Oct. 22, 2018, which is a continuation of U.S. patent application Ser. No. 15/784,690, filed on Oct. 16, 2017, which is a continuation of U.S. patent application Ser. No. 15/217,200, filed on Jul. 22, 2016, which is a continuation of U.S. patent application Ser. No. 14/275,051, filed on May 12, 2014, which is a continuation of U.S. patent application Ser. No. 12/446,560, filed on Feb. 7, 2011, which is a national stage entry of International Application No. PCT/US07/82113, filed on Oct. 22, 2007, and which is a non-provisional of and claims the benefit of the filing dates of the following U.S. provisional patent applications 60/853,888, filed on Oct. 23, 2006, 60/909,867, filed on Apr. 3, 2007, and 60/940,318, filed on May 25, 2007, all of which are herein incorporated by reference in their entirety for all purposes.

BACKGROUND

Embodiments of the present invention relate to devices for inhibiting the theft of relatively small but expensive pieces of equipment.

Computers have evolved rather rapidly from large, expensive machines usable only by a few, to relatively small, portable machines which are usable by many. In particular, the development of personal computers with significant processing power has made computers available to the general population. It is now common for college and even high school students to have their own computer, and personal computers are in wide spread use as word processors and work stations in almost all forms of business. Personal computers are relatively small and easily transportable, and an undesirable side effect of their proliferation is the fact that the theft of such computers is a significant problem.

A variety of devices have been developed to inhibit the theft of personal computers and similar equipment. Since personal computer systems involve several components, typically including the computer itself, a separate monitor, keyboard and often a printer, such security systems often employ a cable which attaches each of the components to each other and to a relatively immovable object such as a desk. The principal difficulty in such systems is providing an effective and convenient method for attaching the cable itself to the equipment.

One way to address the problem of computer security is to provide a small, generally rectangular slot in a wall of a computer. A security apparatus with a locking head may be secured to the computer via the rectangular slot.

While the conventional rectangular slot solution is effective, improvements could be made. For example, although thieves are deterred from stealing portable computers secured by conventional security mechanisms, in some cases, such thieves may be more interested in the data stored in the computers rather than the computers themselves. Accordingly, the damage that may occur to a computer that may occur during the theft of the computer may not deter a thief who wants the data stored inside of the computer. It would be desirable to improve the strength of the physical coupling between the security apparatus and the computer and so that it is more difficult for potential thieves to separate the security apparatus from the computer.

Embodiments of the invention address these and other problems, individually and collectively.

BRIEF SUMMARY

Embodiments of the invention are directed to security apparatuses, systems, and methods for using such security apparatuses. Other embodiments of the invention may be directed to lock interface members and systems and methods incorporating such lock interface members.

One embodiment of the invention is directed to a system including a portable electronic device comprising a lock interface member having an aperture and a protrusion, and a security apparatus. The security apparatus comprises a head comprising an engagement element adapted to engage the lock interface member via the aperture and the protrusion, and is preferably cooperatively structured with the protrusion. The head also comprises a stabilizing element capable of preventing the engagement element from being separated from the lock interface member when the engagement element is in a locked configuration.

Another embodiment of the invention is directed to a method for securing a security apparatus. The security apparatus is used with a lock interface member having an aperture and a protrusion. The security apparatus comprises a head comprising an engagement element adapted to engage the lock interface member via the aperture and the protrusion. The head also comprises a stabilizing element capable of being inserted into the lock interface member to prevent the engagement element from being removed from the aperture, and a security device attached to the head. The method includes: (a) inserting the engagement element into the aperture, (b) moving the engagement element so that the engagement element is secured to the lock interface member, and wherein at least a portion of the engagement element engages the protrusion, and (c) inserting the stabilizing element into the lock interface member.

Another embodiment of the invention is directed to a security apparatus for use with a lock interface member having an aperture and a protrusion. The security apparatus includes a head comprising an engagement element adapted to engage the lock interface member via the aperture and the protrusion. The engagement element is configured to engage the lock interface member. The head also includes a stabilizing element that is capable of being inserted into the lock interface member to prevent the engagement element from being removed from the aperture. A security device may be attached to the head.

These and other embodiments of the invention are described in further detail below.

BRIEF DESCRIPTION OF THE DRAWINGS

FIG. 2(a) shows a front, perspective view of a portion of a security apparatus according to another embodiment of the invention.

FIG. 2(b) shows a rear perspective view of the security apparatus portion shown in FIG. 2(a), along with a perspective view of a lock interface member in a portable electronic device.

FIG. 2(d) shows a perspective view of a portion of the security apparatus shown in FIGS. 2(a) and 2(b) when it is configured in a locked position in a lock interface member in a portable electronic device. A portion of the portable electronic device is cut away for clarity of illustration.

FIG. 2(e) shows a side, cross-sectional view of the portion of the security apparatus and portable electronic device shown in FIG. 2(c).

FIG. 2(f) shows a top, cross-sectional view of the portion of the security apparatus and the portable electronic device shown in FIG. 2(c).

FIG. 3(a) shows a front view of a portion of a security apparatus according to another embodiment of the invention, as it is about to be secured to a portable electronic device via a lock interface member.

FIG. 3(b) shows a perspective view of the portion of the security apparatus shown in FIG. 3(a) as it is inserted into the lock interface member. A portion of the lock interface member and the portable electronic device are cut away for clarity of illustration.

FIG. 3(c) shows a perspective view of the portion of the security apparatus shown in FIG. 3(a), as a portion of the head in the security apparatus is inserted into the lock interface member, and is rotated to engage engagement elements in the head to inner protrusions and slots in the lock interface member.

FIG. 3(d) shows a horizontal cross-sectional view of a lock interface member.

FIG. 3(e) shows a horizontal, cross-sectional view of the portion of the security apparatus shown in FIG. 3(a).

FIG. 3(i) is a front view of a lock interface member.

FIG. 3(j) shows a side cross-sectional view of the lock interface member shown in FIG. 3(i).

FIG. 3(k) is a perspective view the lock interface member shown in FIG. 3(i).

FIG. 3(1) is a top view of the lock interface member shown in FIG. 3(i).

FIGS. 9(a)-9(b) respectively show perspective views of a locking head embodiment in unlocked and locked configurations.

FIG. 9(c) shows a side view of the locking head embodiment shown in FIGS. 9(a)-9(b) when it is engaged with a lock interface member.

FIG. 9(d) shows a top view of the locking head embodiment shown in FIG. 9(a)-9(b) when it is engaged with a lock interface member.

FIGS. 11(a)-11(b) respectively show perspective views of another locking head embodiment in unlocked and locked configurations.

FIG. 11(c) shows an outward view of the locking head embodiment shown in FIG. 11(c), when it is engaged with a lock interface member.

FIGS. 14(a)-14(b) respectively show perspective views of another locking head embodiment in unlocked and locked configurations.

FIG. 14(c) shows a perspective view of the locking head shown in FIGS. 14(a)-14(b) in a partially exploded view.

FIGS. 14(d)-14(e) respectively show side views of another locking head embodiment in unlocked and locked configurations.

FIGS. 18(a)-18(b) respectively show perspective views of another locking head embodiment in unlocked and locked configurations.

FIG. 18(c) shows an outward view of the locking head embodiment shown in FIGS. 18(a)-18(b), when it is engaged with a lock interface member.

FIGS. 19(a)-19(b) respectively show perspective views of another locking head embodiment in unlocked and locked configurations.

FIGS. 19(c)-19(d) respectively show outward views of the locking head embodiment shown in FIGS. 19(a)-19(b), when they are in unlocked and locked configurations when associated with a lock interface member.

FIG. 20(a) shows a perspective view of another locking head embodiment.

FIGS. 20(b) and 20(c) respectively show embodiments where the locking head is not secured to a lock interface member and where the locking head is secured to the lock interface member.

FIG. 22(a) shows a locking head embodiment with an engagement element in a retracted position.

FIG. 22(b) shows a locking head embodiment with an engagement element in an extended position.

FIG. 22(c) shows a locking head that is secured to a lock interface member.

FIGS. 23(a) and 23(b) show a locking head embodiment in an unlocked configuration and a locked configuration.

FIG. 23(c) shows a side, cross-sectional view of the locking head embodiment shown in FIG. 23(a).

FIGS. 24(a) and 24(b) respectively show side cross-sectional views of locking head embodiments that are in unlocked and locked configurations.

FIG. 24(c) shows a perspective view of a locking head embodiment in a locked configuration.

FIGS. 36(a)-36(b) show perspective views of another locking head embodiment in an unlocked and a locked configuration.

FIG. 36(c) shows the locking head embodiment shown in FIG. 36(a) when it is secured to a lock interface member.

In the Figures, like numerals designate like elements.

DETAILED DESCRIPTION

Figure 1:
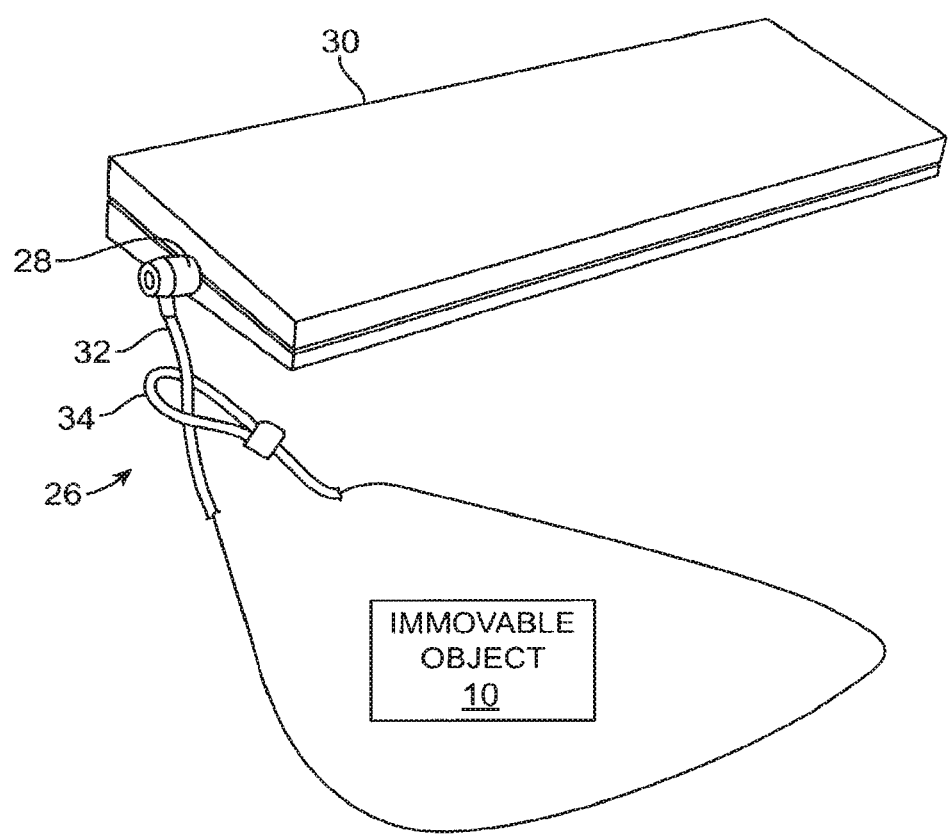
FIG. 1 shows a perspective view of a portable electronic device and a security apparatus.
Figure 2C:
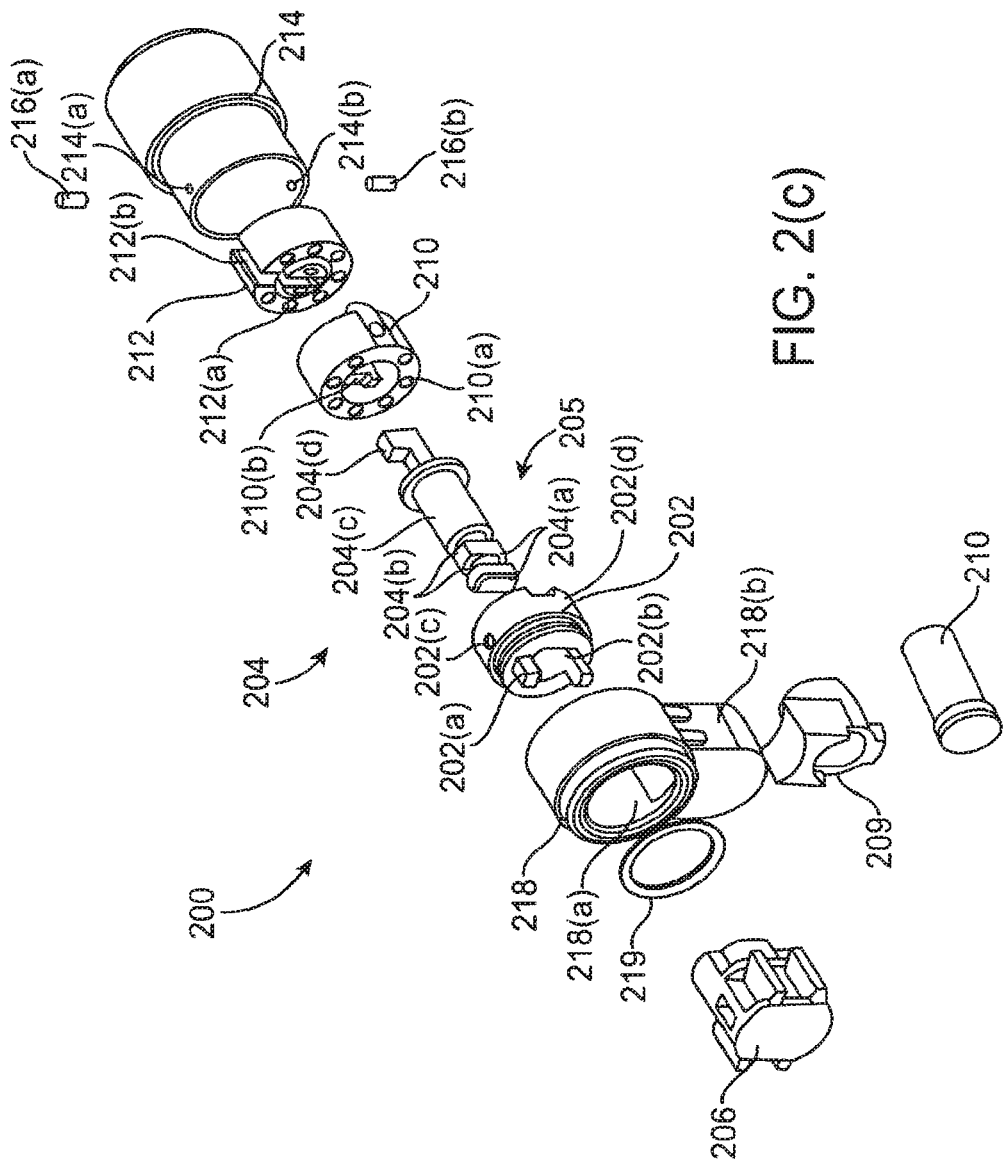
FIG. 2(c) is an exploded view of the security apparatus shown in FIGS. 2(a)-2(b).
Figure 2H:
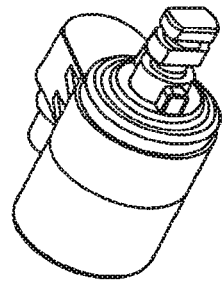
FIG. 2(h) shows a perspective view of the head shown in FIG. 2(g).
Figure 2K:
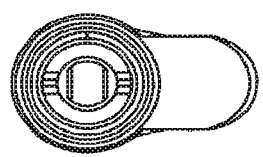
FIG. 2(k) shows a front view of the head shown in FIG. 2(i).
Figure 2G:
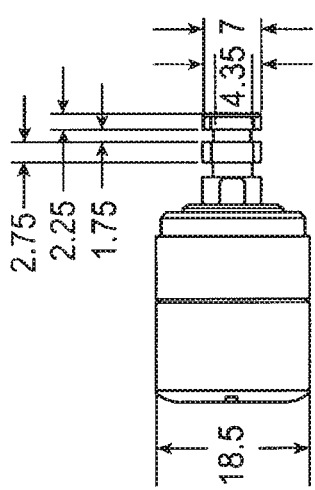
FIG. 2(g) shows a side view of a head of the type shown in FIG. 2(a).
Figure 2J:
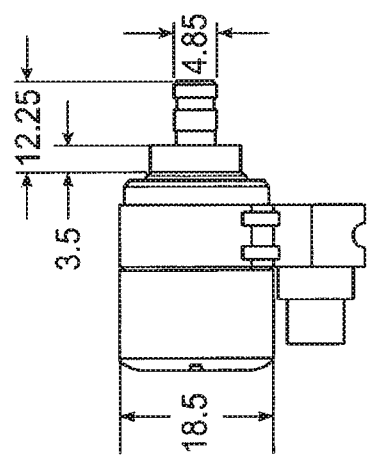
FIG. 2(j) shows a side view of the head shown in FIG. 2(i).
Figure 2I:
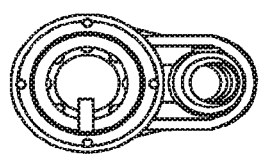
FIG. 2(i) shows a rear view of the head shown in FIG. 2(h).

Embodiments of the invention are directed to security apparatuses, methods for using security apparatuses, and systems using such security apparatuses. The security apparatuses can be used to prevent or deter the theft of devices such as portable electronic devices.

In addition, in embodiments of the invention, a lock interface member may be used to enhance security and to improve the strength of the coupling between a portable electronic device and a security apparatus. The lock interface member may be an attachment that may be attached to the housing of the portable electronic device, or it may be integrally formed in the housing or other component of the portable electronic device. For example, in some embodiments, the lock interface member may be integrally formed with (e.g., a wall portion of a wall or chassis portion of a chassis, and the lock interface member may be formed from the same material without an interface), or operatively or physically coupled to the chassis of the portable electronic device and/or may be operatively or electrically coupled to some electrical component (e.g., a memory chip, disk drive, or microprocessor) in the portable electronic device. In addition, if the lock interface member is a separate component from the wall of the portable electronic device, the lock interface member may be positioned within an aperture formed in a wall of the portable electronic device, or inside of the portable electronic device. Exemplary lock interface members are described in further detail below.

By using a lock interface member, the strength of the coupling between the security apparatus and the lock interface member is increased over a conventional physical security system including a portable electronic device comprising only a 3.times.7 mm·sup.2 security slot and a physical security apparatus secured to the portable electronic device via the security slot. A conventional security system such as this can withstand 150 lbs of force, because the plastic housing of the portable consumer device can fail or break when this magnitude of force is applied. Also, current locks on the market are designed to withstand 300 lbs of force before they are broken. Further, the ability to "torque" the conventional security apparatus out of a security slot is also of concern. Improved security apparatuses and systems are therefore desirable.

Using embodiments of the invention, the strength of the coupling between the security apparatus and the portable electronic device may be increased by at least 2, 6, or even 8 times compared to conventional systems. For example, by using embodiments of the invention, it may take more than about 300 lbs of force, or even more than about 500, 1000, or 2000 lbs of force to break the physical coupling between the head in a security apparatus and the lock interface member associated with the portable electronic device to which it is secured. As shown below, the engagement elements and stabilizing elements are preferably cooperatively structured with the internal surfaces of the lock interface member. The potential contact area between the engagement element and the inner surfaces of the lock interface member is more than in a conventional locking system. For example, in some embodiments, the contact area between the lock interface member and parts of a corresponding locking head can be at least about 5 times greater than conventional security systems. This increased contact area can also provide for better load distribution when stresses are applied to mating surfaces. The engagement elements and the stabilizing elements are also stronger than conventional elements in conventional locks, and weak links are reduced as compared to conventional security systems. Accordingly, embodiments of the invention are stronger and therefore more effective at deterring and preventing the theft of portable electronic devices than conventional security systems.

A security apparatus according to an embodiment of the invention may comprise a head and a security device. The head and the security device may be physically and/or operationally coupled together.

The security device may comprise a cable, or some other type of device to provide security. If the security device comprises a cable, then the cable may be secured to an immovable object such as a desk or cabinet so that a portable electronic device coupled to the cable cannot be removed. The cable may comprise stainless steel, Kevlar®, or some other type of strong material.

In another embodiment, the security device may comprise a wireless device such as a wireless transmitter and/or receiver. The wireless device may be used in a proximity detection system or a motion detection system. For example, a motion detector could present in the wireless device so that when the motion detector moves, an associated alarm is triggered. The alarm may be in the security device or may be external to the security device. In another embodiment, there may be a base device associated with the wireless device, and these components may be used in a proximity detection system. Wireless signals may be transmitted between the security device and the base device, and when these devices are separated by a predetermined distance, an associated alarm (e.g., an audible alarm) may be triggered. The alarm could be in the base device or in the security device. The electronics associated with such wireless systems are known to those of ordinary skill in the art.

The head in the security apparatus may be a locking head. A locking head according to an embodiment of the invention may comprise a locking mechanism such as a key locking mechanism or a combination locking mechanism disposed within a locking head housing. Various types of locking heads are described in further detail below.

In some embodiments, a locking head according to an embodiment of the invention includes at least one engagement element that is inserted into an aperture in the lock interface member and engages at least one protrusion in the lock interface member. In some embodiments, the at least one engagement element may comprise lobes that can be cooperatively structured with and can engage the at least one protrusion in the lock interface member.

The at least one engagement element can engage the at least one protrusion in the lock interface member in any suitable manner. For example, the at least one engagement element can be inserted into an aperture in the lock interface member and past at least one internal protrusion in the lock interface member. Once the at least one engagement element is inserted past the at least one protrusion, it can be rotated, or otherwise moved to engage the at least one protrusion. The engagement between the at least one engagement element and the at least one protrusion could be a single point of contact between them, or could be a continuous interface between contacting surfaces of the engagement element and the at least one protrusion. In some embodiments, at least 2, 3, or even 4 or more distinct continuous surfaces of the protrusion can be in contact with and/or facing at least 2, 3, or even 4 or more continuous surfaces of the engagement element when the engagement element is engaged to the protrusion.

At least one stabilizing element is also present in the locking head to stabilize the position of the locking head relative to the lock interface member. The stabilizing element can take various forms. For example, the stabilizing elements can be in the form of pins, pillars, etc., and may be integrally formed with other portions of the locking head. The stabilizing element may or may not engage protrusions in the lock interface member, and may or may not be inserted into the same aperture in the locking interface member as the at least one engagement element.

To secure the locking head to the interface member, the engagement element can be associated with (e.g., contact, engage, etc.) the lock interface member before or after the stabilizing element is associated with the lock interface member. For example, in some embodiments, the engagement element can first engage the lock interface member. Then, the stabilizing element can be inserted into the lock interface member to secure the locking head to the lock interface member. In other embodiments, the stabilizing element may first be inserted into the lock interface member and then the engagement element may engage the lock interface member.

The portable electronic device that is to be secured may comprise any suitable device. Examples of such devices comprise portable computers such laptop, desktop, and server computers, flat panel televisions, projectors, printers, monitors, portable music players, printers, external hard-drives, cell phones, etc.

FIG. 1 shows a system comprising a portable electronic device 30 and a security apparatus 26 that is used to secure the portable electronic device 30 to an immovable object 10 such as a desk leg or the like. The security apparatus 26 comprises a head 28 and a cable 32 coupled to the head 28, which may be a locking head in this example. A loop 34 is at a terminal end of the head 28. The cable 32 may comprise a strong material such as stainless steel or Kevlar™.

To secure the portable electronic device 30 to the immovable object, the cable 32 may be wrapped around the immovable object and the head 28 may pass through the loop 34. An engagement element in the head 28 may then be inserted into an aperture in the portable electronic device 30, or in an aperture in a lock interface member that is associated with the portable electronic device 30. A stabilizing element may then be inserted into the aperture in the lock interface member to stabilize the head 28 so that the engagement element cannot be readily withdrawn from the aperture. In other embodiments, the stabilizing element may first be inserted into the aperture in the lock interface member, and/or an aperture in the portable electronic device, and the engagement element may thereafter be inserted therein to engage the aperture in the portable electronic device or in the lock interface member.

A locking mechanism including any suitable key locking mechanism or combination locking mechanism may be used to keep the stabilizing element and/or the engagement element from moving or not moving. Some specific locking mechanisms are described in this application. Other locking mechanisms that are known to those of ordinary skill in the art could alternatively be used to actuate stabilizing and/or engagement elements to secure a locking head to a lock interface member.

As used herein, in the above described embodiments and in other embodiments, an "aperture" may include a blind aperture or a through aperture. A through aperture may be in the form of a hole, or a recess. Apertures according to embodiments of the invention can be of any suitable size, but preferably have dimensions less than about 10 mm in some embodiments.

As noted above, an embodiment of the invention is directed to a security apparatus for use with a lock interface member having an aperture and a protrusion (i.e., at least one protrusion). The protrusion can form part of an internal surface of the lock interface member, and there can be one, two, three, or more protrusions in the lock interface member. The protrusions may have the same or different configurations and they be may regularly or irregularly spaced inside of the lock interface member. Also, the protrusions may have slanted surfaces, and the size and/or dimensions (e.g., an axial dimension) of the protrusions may be proportionate or inversely proportionate to lobes on an engagement element in a locking head.

Also, as noted above, the security apparatus comprises a head comprising at least one engagement element that is adapted to engage the lock interface member via the aperture and the at least one protrusion. The at least one engagement element is preferably cooperatively structured with the at least one protrusion, and the locking head also comprises a stabilizing element that is capable of being inserted into the lock interface member to prevent the locking head from being separated from the lock interface member. A security device may be coupled to the head.

Generally, when the locking head, or parts of the locking head, are in an "unlocked configuration," the locking head is generally removable from the lock interface member. When the locking head or parts of the locking head are in a "locked configuration," the locking head is not removable from the lock interface member when it is present in a lock interface member.

The parts of the locking head and/or the lock interface member may be made of any suitable material, and may be formed in any suitable manner. Suitable materials include materials such as stainless steel, nickel alloys, etc. They can be formed by machining, molding, etc.

A number of specific embodiments will now be described. It is understood that the descriptions above, and the features of the different embodiments may be combined in any suitable manner and may still be within embodiments of the invention. For example, the description of the exemplary materials for the lock interface member and/or the locking head above may be applicable to any of the specific embodiments described below.

FIG. 2(*a*) shows a front perspective view of a security apparatus 200 according to an embodiment of the invention. The security apparatus 200 comprises a head 200(*a*) comprising a body 214 attached to a cable ring 218. A ferrule holder 209 and a ferrule 210 are attached to the cable ring 218. The ferrule holder 209 and the body 214 may form a base or housing.

In this embodiment, the head 200(*a*) comprises an engagement element 205 that is rotatable. It also comprises a number of cross-members 204(*a*) and depressions 204(*b*) formed between the cross-members 204(*a*). The engagement element 205 may also be characterized as having alternating wider cross-member portions and narrower axial shaft portions.

The head 200(*a*) also comprises two stabilizing elements 202(*a*) that are on opposite sides of the engagement element 205. The two stabilizing elements 202(*a*) are in the form of stationary pins in this embodiment.

FIG. 2(*b*) shows a rear view of the head 200(*a*). The rear of the head 200(*a*) has a keyway for receiving a key. The keyway is circular and can receive a key with a circular cross-section.

FIG. 2(*b*) also shows a side view of a portable electronic device 208 comprising an aperture 208(*a*), and a lock interface member 206 disposed in the aperture 208(*a*) of the portable electronic device 208. The lock interface member 206 may also have its own aperture 206(*f*). As shown in FIG. 2(*b*), the lock interface member 206 may have lateral ends which are somewhat rectangularly shaped, and a central portion which has upper and lower curved portions. The rectangularly shaped portions can be cooperatively structured with the stabilizing elements 202(*a*), 202(*b*) and may receive them. The rectangular shaped portions may include generally straight sides. Further details regarding the lock interface member 206 are provided below.

FIG. 2(*c*) shows an exploded view of the security apparatus 200 shown in FIGS. 2(*a*) and 2(*b*). FIG. 2(*c*) shows a body 214 in the form of a cylinder. The body 214 is coupled to an abutment structure 202 via pins 216(*a*), 216(*b*). The pins 216(*a*), 216(*b*) pass through holes 214(*a*), 214(*b*) in the body 214, and holes in the abutment structure 202 (one of which is hole 202(*c*)). The abutment structure 202, in this example, comprises a cylindrical structure 202(*d*) with stabilizing elements 202(*a*), 202(*b*) in the form of pins extending axially from the cylindrical structure 202(*d*). The stabilizing elements 202(*a*), 202(*b*) in this embodiment and in other embodiments can have any suitable cross-sectional shape including a circular, square, or rectangular cross-sectional shape.

A locking mechanism comprising a first fixed cylinder 210 and a second rotatable cylinder 212 are inside of the body 214. The first fixed cylinder 210 comprises a plurality of axially extending holes 210(*a*) surrounding a central hole 210(*b*). Likewise, the second cylinder 212(*b*) comprises a plurality of axially extending holes 212(*a*) around another central hole 212(*b*).

A locking spindle 204 passes through the central hole 210(*b*) in the first fixed cylinder 210 and is engaged with the second cylinder 212 via its central hole 212(*b*) at its rear end 204(*d*). The locking spindle 204 also includes a central portion 204(*c*) and a front portion which may form the engagement element 205. The engagement element 205 may comprise cross-members 204(*a*) and depressions 204(*b*) as discussed previously.

A snap ring 219, a ferrule holder 209, and a cable ferrule 210 are attached to the cable ring 218. The abutment structure 202 may fit within a hole 218(*a*) in the cable ring 218. A lock interface member 206 is also shown in FIG. 2(*f*), and can receive the engagement element 205, as well as the stabilizing elements 202(*a*), 202(*b*).

In operation, referring to FIGS. 2(*a*)-2(*f*) the engagement element 205 and the stabilizing elements 202(*a*), 202(*b*) are inserted into the lock interface member 206. As shown in FIG. 2(*a*), the cross-members 204(*a*) are aligned with the stabilizing elements 202(*a*) as the engagement element 205 and the stabilizing elements 202(*a*) are inserted into the aperture 206(*f*) in the lock interface member 206. At this point, the head 200(*a*) and its components are in an unlocked configuration, and can be readily inserted into or withdrawn from the lock interface member 206. After the stabilizing elements 202(*a*), 202(*b*), and the engagement element 205 are inserted into the interface member 206, a key (not shown) is inserted into the rear keyway in the head 200(*a*). The key is then turned and this in turn rotates the engagement element 205 clockwise (or counterclockwise in other embodiments). At this point, the cross-members 204(*a*) of the engagement element 205 are not aligned with the stabilizing elements 202(*a*). Once the key is withdrawn from the rear keyway in the head 200(*a*), the head 200(*a*) and its components can be in a locked configuration.

As shown in FIGS. 2(*d*), 2(*e*), and 2(*f*), the rotation of the engagement element 205 causes the cross-members 204(*a*) to fill depressions 206(*b*) inside of the lock interface member 206. It also causes the protrusions 206(*a*) inside of the lock interface member 206 to fill the depressions 206(*b*) between the cross-members 204(*a*). The engagement element 205 is therefore strongly interlocked with the lock interface member 206 so that the head 200(*a*) cannot be separated from the lock interface member 206 and cannot be separated from the portable electronic device 208. As shown in FIGS. 2(*d*) and 2(*e*), the lock interface member 206 may be attached to or may be part of a chassis 201 inside of the portable electronic device 208.

FIGS. 2(*g*)-2(*k*) show various views of the previously described head embodiment. Exemplary dimensions of parts of the locking head are shown in millimeters in FIGS. 2(*g*) and 2(*j*). Other dimensions for such parts could be present in other embodiments of the invention. Generally, the frontal dimensions of the previously described cross members 204 (*a*) in this embodiment and in other embodiments may less than about 10 mm (e.g., about 5 by 7 mm·sup.2), when the thickness of each cross-member 204(*a*) may be 2.75 mm or about 2.25 mm. The thicknesses of the different cross-members 204(*a*) can be different or may be the same. As shown in FIG. 2(*g*), a depression 204(*b*) between two adjacent cross members 204(*c*) may be less than about 2 mm (e.g., about 1.75 mm).

FIG. 3(*a*) shows another embodiment of the invention. FIG. 3(*a*) shows a system including a portable electronic device 308 comprising an aperture 308(*a*), and a lock interface member 306 in the aperture 308(*a*). The lock interface member 306 has opposing curved walls 306(*b*) and opposing rectangular ends 306(*a*), and may have its own aperture 306(*f*).

FIG. 3(*a*) also shows a security apparatus 300 comprising a head 300(*a*) comprising an engagement element 304 at a front end, and a push cylinder 324 at a rear end. A cable ring 318 including an attachment portion 318(*b*) and a body 314 form a housing for the head 300(*a*). A cable ferrule 310 extends from the attachment portion 318(*b*). These components are disposed between the ends of the push cylinder 324 and the engagement element 304. A rubber bumper 312 also surrounds the engagement element 304. In this example, the engagement element 304 would have a fixed position relative to the body 314 and/or the cable ring 318. As in prior embodiments, the engagement element 304 includes cross-members 304(*a*) and depressions 304(*b*) between the cross-members 304(*a*).

A method for using the security apparatus shown in FIG. 3(*a*) can be described with reference to FIGS. 3(*b*)-3(*e*). As shown in FIG. 3(*b*), the engagement element 304 is inserted into the lock interface member 306. At this time, the push cylinder 324 is in an extended position and a biasing element such as a spring (not shown) in the head 300(a) is in an uncompressed state.

Referring to FIGS. 3(c) and 3(d), the entire head 300(a) is rotated so that the engagement element 304 is correspondingly rotated (e.g., 90 degrees). The cross-members 304(a) and the depressions 304(b) are cooperatively structured with and engage protrusions 306(c) in the lock interface member 306. The head 300(a) is thereafter engaged with the lock interface member 306 and the portable electronic device 308.

A cross-section of the lock interface member 306 is shown in FIG. 3(d). In this example, the aperture 306(f) is a blind aperture, because the lock interface member 306 has a rear wall 306(h). In other embodiments, the rear wall 306(e) could be omitted, and in this case, the lock interface member 306 would be a through aperture. The lock interface member 306 may comprise the same or different materials than the previously described lock interface members.

The inside of the lock interface member 306 has a number of internal protrusions 306(c) (e.g., ribs) that fill a portion of the radial cross-section of the aperture 306(f) in the lock interface member 306. The edges of the internal protrusions 306(c) in the lock interface member 306 shown in FIG. 3(d) may be defined by chords which extend from one part of the inner wall of the lock interface member 306 to another part of the inner wall of the lock interface member 306. The protrusions can be in any suitable form including bumps, plates, cylinders, pyramids, etc.

In FIG. 3(d), the lock interface member 306 has four internal protrusions 306(c). In this example, a pair of opposing internal protrusions is disposed towards the front of the aperture 306(f) and a pair of opposing internal protrusions is disposed towards the rear of the aperture 306(f). As explained above, the internal protrusions 306(c) are received in depressions 304(b) in the engagement element 304 when the engagement element 304 is engaged to the lock interface member 306. The walls defining the slots 306(a) also define the aperture 306(f) in this example.

The lock interface member 306 also comprises at least one slot 306(a) configured to receive a movable or non-movable stabilizing element. In this example, there are two such slots (one is shown in FIG. 3(d)) between the opposing pairs of protrusions 306(c). However, in other embodiments, there may be more or less stabilizing element receiving slots 306(a) in the lock interface member 306.

As shown in FIG. 3(d), the lock interface member 306 also comprises a number of external protrusions 306(d) and 306(e). These external protrusions 306(d), 306(e) can be used to secure the lock interface member 306 to the portable electronic device 308. Alternatively, the lock interface member 306 could be an integral part of a portion of a portable electronic device.

FIG. 3(e) shows a horizontal cross section of the lock apparatus when at least one stabilizing element 330 and at least one engagement element 304 is present in the lock interface member 304. As shown in FIG. 3(e), the internal protrusions 306(c) in the lock interface member 306 fill the depressions 304(b) between the protrusions 304(a) in the engagement element 304. Consequently, the engagement element 304 is secured to the lock interface member 306 and the portable electronic device 308.

Figure 3F:
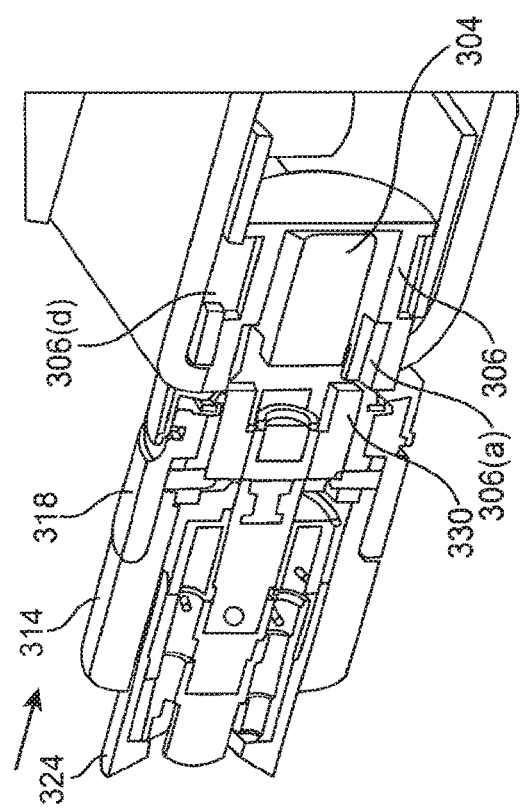
FIG. 3(f) shows a side, cross-sectional view of the head of the security apparatus shown in FIG. 3(c), before a stabilizing element is inserted into the lock interface member.
Figure 3G:
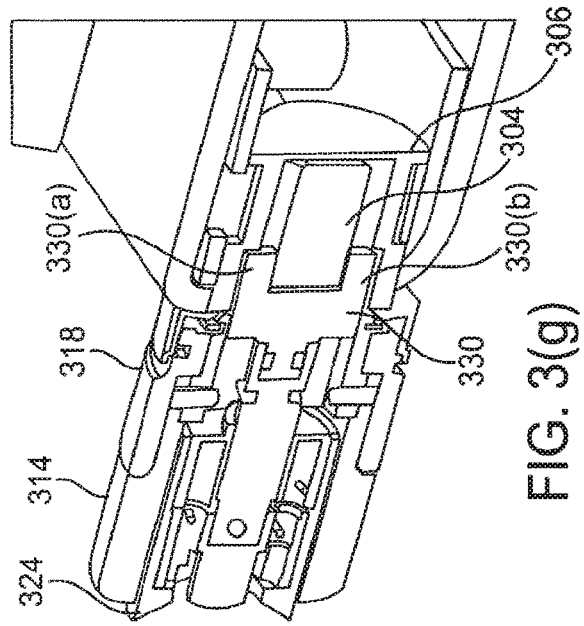
FIG. 3(g) shows a side, cross-sectional view of the head of the security apparatus shown in FIG. 3(c), after a stabilizing element is inserted into the lock interface member.
Figure 3H:
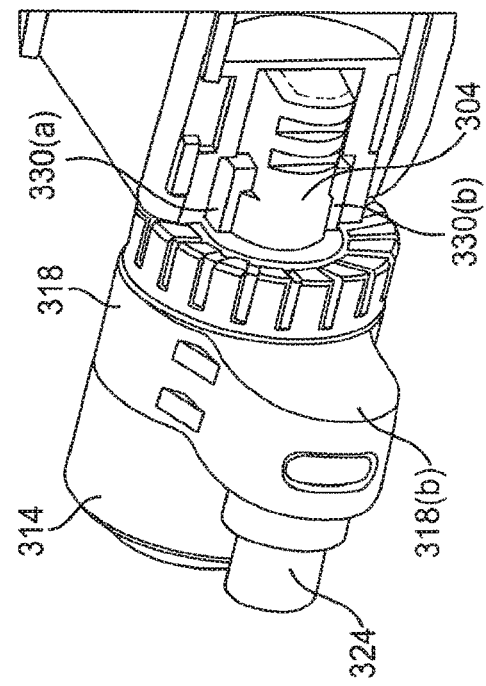
FIG. 3(h) shows a perspective view of the security apparatus shown in FIG. 3(c), after a stabilizing element is inserted into the lock interface member. A portion of the lock interface member and the portable electronic device are cut away for clarity of illustration.

FIGS. 3(f)-3(h) show how a stabilizing element 330 in the lock apparatus can be inserted into the lock interface member 306. After the engagement element 304 is engaged with the lock interface member 306 as shown in FIG. 3(c), a user may push the push cylinder 324 inward as shown in FIG. 3(f). As shown in FIGS. 3(g) and 3(h), the stabilizing elements 330(a), 330(b) then fill the opposing slots (including slot 306(a)) in the lock interface member 306 to stabilize the position of the engagement element 304 and the locking head 300(a). The locking mechanism associated with the stabilizing element 330 can be the same as or different than the locking mechanism that is associated with the stabilizing element 102 shown in FIG. 2(e) in U.S. provisional application No. 60/853,888, filed on Oct. 23, 2006; and 60/909,867, filed on Apr. 3, 2007. For example, as in the embodiment described in FIG. 2(e), to unlock the head 300(a), a key may be used and to turn a spindle which in turn causes a clip to disengage from the spindle. A biasing element such as a spring can then be used to push the stabilizing elements towards the rear of the lock head and are withdrawn from the slots in the lock interface member 306.

FIGS. 3(i)-3(1) show front, side cross-sectional, perspective, and top views of the lock interface member 306. Various dimensions are also shown in millimeters. As shown, the width of the aperture 306(f) may be about 10 mm or less, while the height of the aperture 306(f) may be about 6.5 mm or less. Opposing internal protrusions 306(c) may be spaced apart by about 2.85 mm or less in some embodiments.

The lock interface member 306 includes a main portion 306(b) which may be generally cylindrically shaped. External protrusions 306(d) may extend outward from the main portion 306(b). The external protrusions 306(d) may be used to secure the lock interface member 306 to a portable electronic device. The lock interface member 306 has a low profile so that it can be incorporated into a thin portable electronic device such as a laptop computer. However, it also has a high internal surface area so that its strength is improved over a traditional security slot in a conventional laptop computer.

Figure 3N:
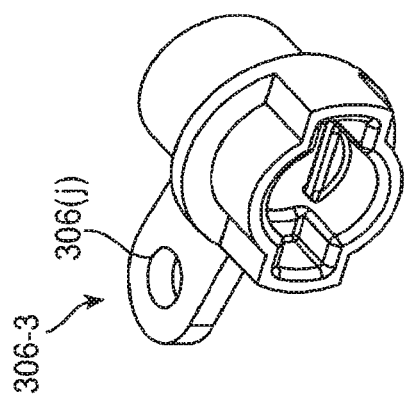
FIGS. 3(m) and 3(n) are perspective views of other lock interface members according to other embodiments of the invention.
Figure 3M:
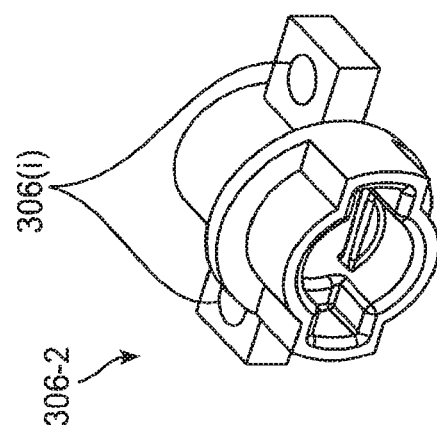

FIG. 3(m) shows another lock interface member 306-2 according to an embodiment of the invention. Lock interface member 306-2 includes two lateral wings 306(i) with holes. Securing elements such as bolts or screws may be inserted into the holes so that the lock interface member can be secured to a portion (e.g., an internal chassis) of a portable electronic device. FIG. 3(n) shows a similar lock interface member 306-3 with only one wing 306(j).

Figure 4C:
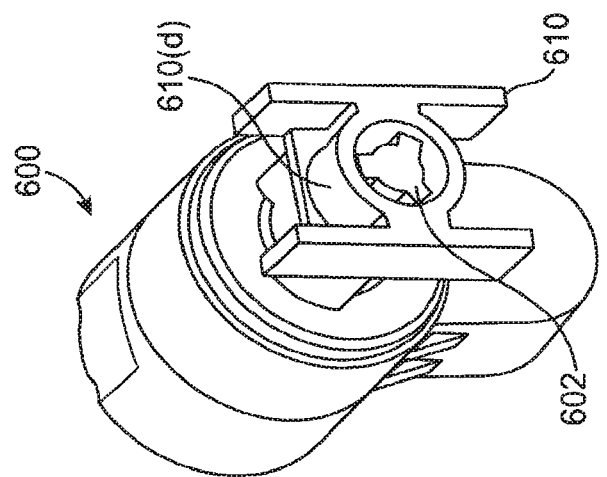
FIGS. 4(a)-4(c) show perspective views of another security apparatus and lock interface member according to an embodiment of the invention.
Figure 4B:
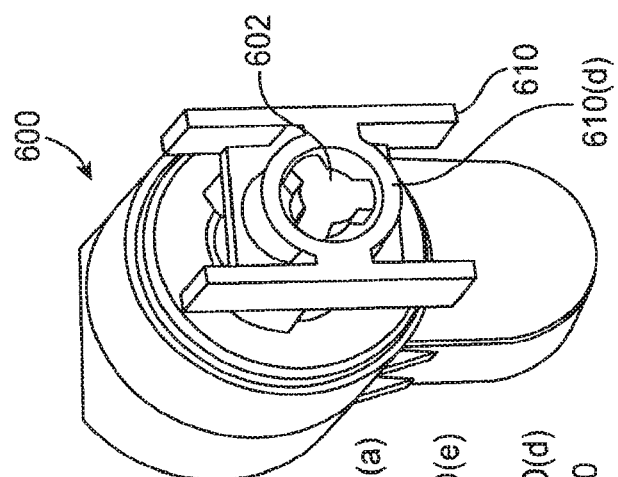
Figure 4A:
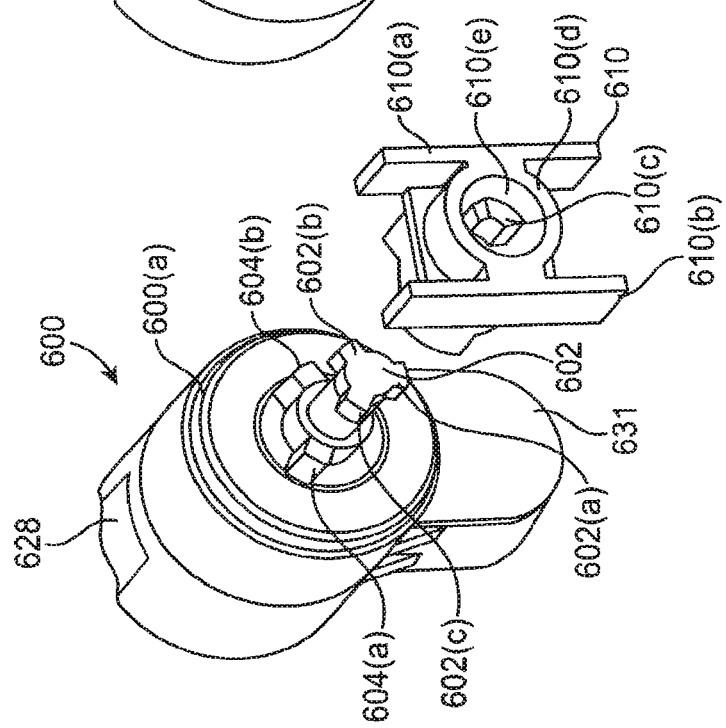

FIG. 4(a) shows another embodiment of the invention. FIG. 4(a) shows a security apparatus 600 comprising a head 600(a). The head 600(a) comprises a body 628, and a ferrule holder 631. The head 600(a) also comprises stationary first and second stabilizing elements 604(a), 604(b), and a rotatable engagement element 602. In other embodiments, the stabilizing elements 604(a), 604(b) could be retractable. In this example, the stabilizing elements 604(a), 604(b) are about 120 degrees apart.

The rotatable engagement element 602 comprises a shaft and a plurality of lobes on the shaft. In this example, the lobes comprise first, second, and third lobes 602(a), 602(b), 602(c). As will be described in further detail below, the different lobes 602(a), 602(b), 602(c) have different axial lengths. In other embodiments, the lobes 602(a), 602(b), 602(c) may have the same lengths.

The rotatable engagement element 602 and the first and second stabilizing elements 604(a), 604(b) can engage and interface with the lock interface member 610. The lock interface member 610 comprises an aperture 610(e) defined by a wall 610(d). In this example, the wall 610(d) has a circular shape. The lock interface member 610 also comprises a pair of external protrusions 610(a), 610(b) so that the lock interface member 610 can be secured to chassis of a portable electronic device or the like. In other embodiments, the lock interface member 610 could have a boss with a screw or other attachment mechanism. It could also be part of a computer chassis or could be molded into a computer housing or the like.

FIG. 4(a) also shows an internal protrusion 610(c) which is axially shaped and extends inwardly from the wall 610(d). As will be explained in further detail below, the protrusion 610(c) can engage one of the lobes on the engagement element 602 to secure the security apparatus 600 to the lock interface member 610.

As shown in FIG. 4(b), the engagement element 602 can be inserted into the aperture 610(e) in the lock interface member 610. To secure the security apparatus 100 to the lock interface member 610, the lobes 602(a), 602(b), 602(c) may be inserted inward, between and past adjacent protrusions (e.g., 610(c)) in the lock interface member 610.

As shown in FIG. 4(c), the engagement element 602 can be rotated after it is fully inserted into the aperture 610(e) in the lock interface member 610. In this example, the engagement element 602 can be rotated 60 degrees (e.g., by using a key, or rotating the entire locking head) so that the lobes 602(a), 602(b), 602(c) may be positioned behind corresponding protrusions in the lock interface member 610. The first and second stabilizing elements 604(a), 604(b) shown in FIG. 4(a) would then be inserted into corresponding slots in the lock interface member 610 so that the head 600(a) is secured to the lock interface member 610 and to the portable electronic device (not shown) to which the lock interface member 610 is attached.

As illustrated in FIGS. 4(a)-4(c), embodiments of the invention may be directed to a method for securing a security apparatus 100 of the type shown in FIGS. 4(a)-4(c). The security apparatus 600 comprises a head 600(a). The method comprises inserting the engagement element 602 into an aperture 610(e) in the lock interface member 610, moving the engagement element 602 so that the engagement element 602 is secured to the lock interface member 610 via the aperture 610(e), and wherein at least a portion of the engagement element 602 engages the protrusion 610(c), and inserting the stabilizing element 604(a) into the lock interface member 610. In the specifically described examples, the stabilizing element 604(a) is stationary. However, in other embodiments, the stabilizing element 604(a) may be retractable and movable relative to other parts of the head 600(a) in the security apparatus 600. Suitable methods of use may also comprise wrapping a cable attached to the head 600(a) around an immovable object, inserting the head into the loop, and securing the head 600(a) to a portable electronic device comprising the lock interface member 610.

Figure 4D:
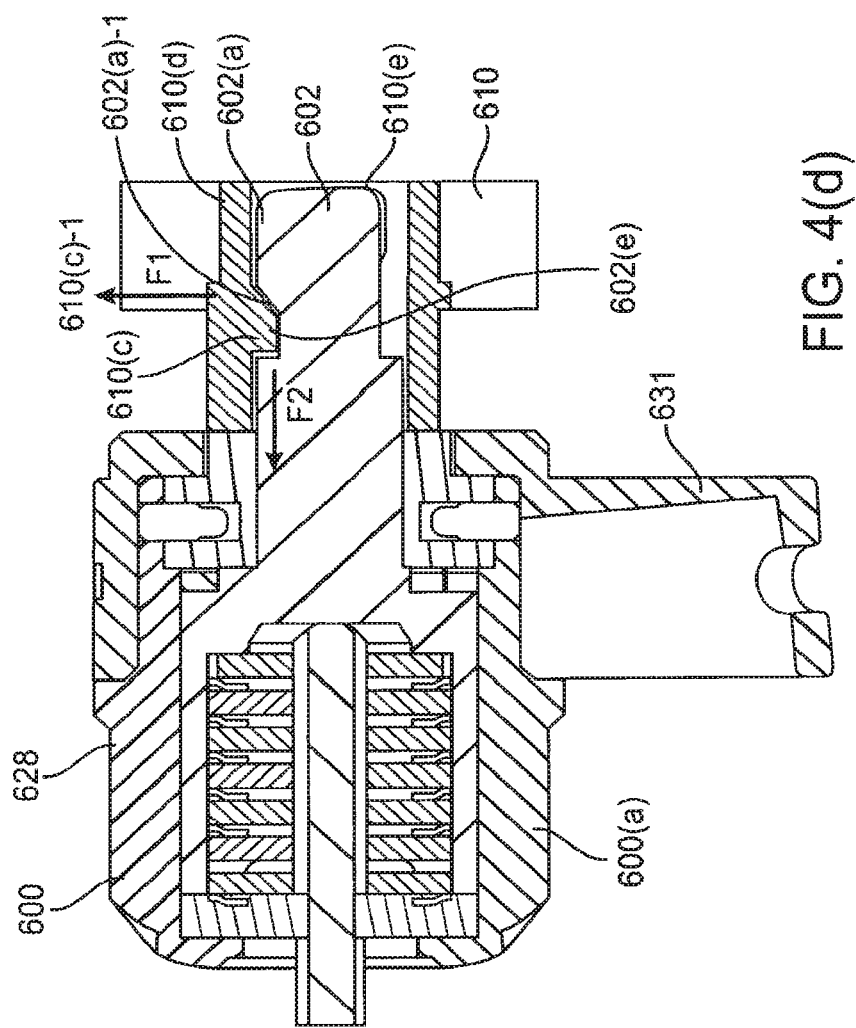
FIG. 4(d) shows a side-cross-sectional view of the security apparatus in FIGS. 4(a)-4(c) when it is engaged with the lock interface member.

FIG. 4(d) shows a cross-sectional view of a system including the security apparatus 600 and the lock interface member 610. FIG. 4(d) shows the shape of the protrusion 610(c) and the engagement element 602. As shown, the protrusion 610(c) has a sloped surface 610(c)-1 (about 45 degrees) which can interface with a corresponding sloped surface 602(a)-1 on the lobe 602(a) on the engagement element 602. The sloped surface 610(c)-1 and the sloped surface 602(a)-1 may form a 45 degree angle (or more or less than this) with the axis of the engagement element 602. The protrusion 610(c) fits into a gap 602(e) defined by the outer surface of the engagement element 602. It is understood that although a protrusion 610(c) with a sloped surface 610(c)-1 is shown in the security system in FIG. 4(d), this feature may be used in any of the previously described embodiments as well. In other embodiments, the surfaces 610(c)-1 and 602(a)-1 need not be sloped, but could be perpendicular to the axis of the engagement element 602. As shown in FIG. 4(d), at least 3 (or even 4) external surfaces of the engagement element 602 face at least 3 (or even 4) distinct surfaces of the protrusion 610(c).

The engaged, opposing sloped surfaces 610(c)-1, 602(a)-1 improve the strength of the bond between the security apparatus 600 and the lock interface member 610. For example, if one tries to disengage the security apparatus 600 and the lock interface member 610 by pulling the security apparatus 600 in the direction F2, the engaged, opposing sloped surfaces 610(c)-1, 602(a)-1 cause any force to be applied to the lock engagement element 610 in a radial direction (e.g., in the direction F1) as well as in an axial direction (e.g., in the direction F1). Since there is a plurality of such slanted surfaces on corresponding lobe/protrusion pairs, any pulling forces can be evenly distributed around the engagement element 602. If the protrusion 610(c) had a flat surface perpendicular to the axis of the engagement element 602, then the protrusion 610(c) would bear substantially all of the force applied in the axial direction (e.g., direction F2), thereby subjecting protrusion 610(c) to a greater amount of force and increasing the likelihood that protruding portion 610(c) might break.

Figures 5A, 5B, 5C:
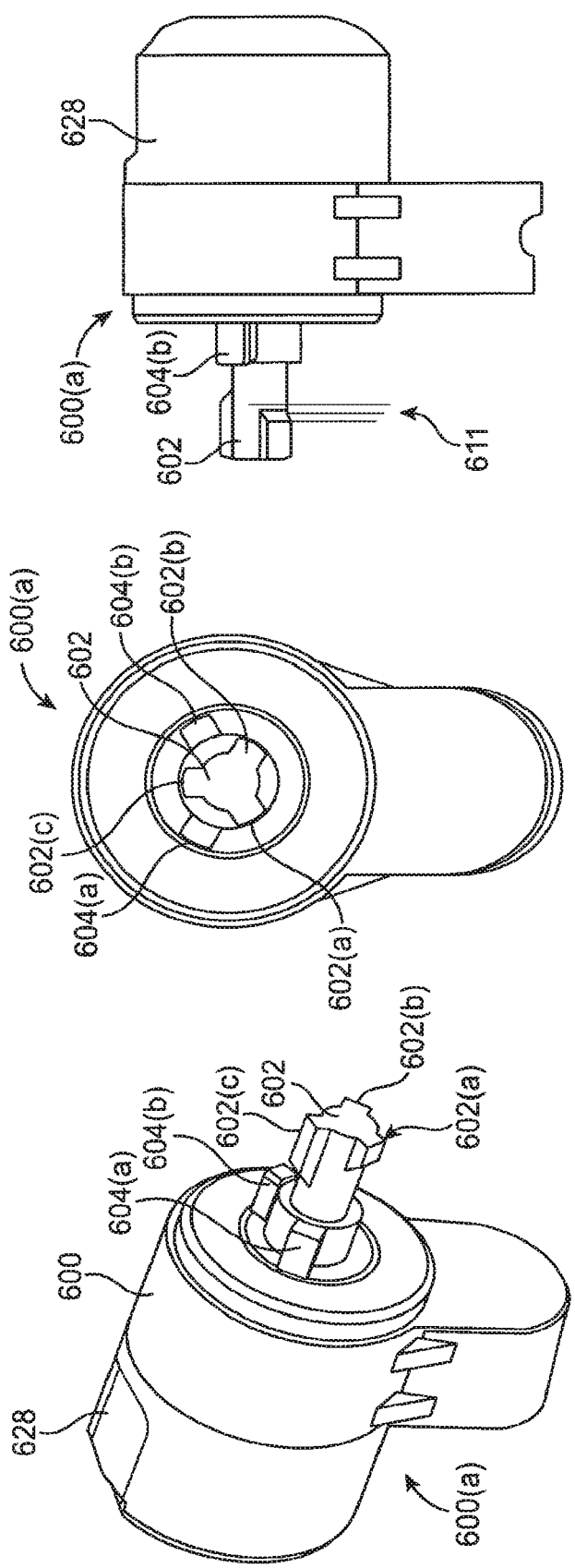
FIGS. 5(a)-5(c) shows perspective, front, and side views of a locking head.

FIGS. 5(a)-5(c) show perspective, front, and side views of the head 600(a). Many of the features in FIGS. 5(a)-5(c) are described above. FIGS. 5(a)-5(b), however, more clearly show three lobes 602(a), 602(b), 602(c) on the shaft of the engagement element 602. They protrude radially from the axis of the engagement element 602, but are elongated in the direction of the axis of the engagement element 602. As shown in FIG. 5(a), the lobes 602(a), 602(c) have different lengths, and the slanted surfaces of the lobes 602(a), 602(b), 602(c) may contact the protrusions in the lock interface member in different planes perpendicular to the axis of the engagement element. This is illustrated by the lines 611 in FIG. 5(c), where each line may represent a different perpendicular plane corresponding to corresponding to an end portion of the lobe 602(a), 602(b), 602(c).

FIG. 5(b) more clearly shows the lobes 602(a), 602(b), 602(c) being located 120 degrees apart from each other, and also two stabilizing elements 610(a), 610(b) being located approximately 120 degrees apart from each other. Although specific angular relationships between the lobes 602(a), 602(b), 602(c) and the stabilizing elements 610(a), 610(b) are described and a specific number of lobes and stabilizing elements are shown in the Figures, it is understood that embodiments of the invention may include any suitable number of lobes and stabilizing elements in any suitable relative relationships.

Figure 6A:
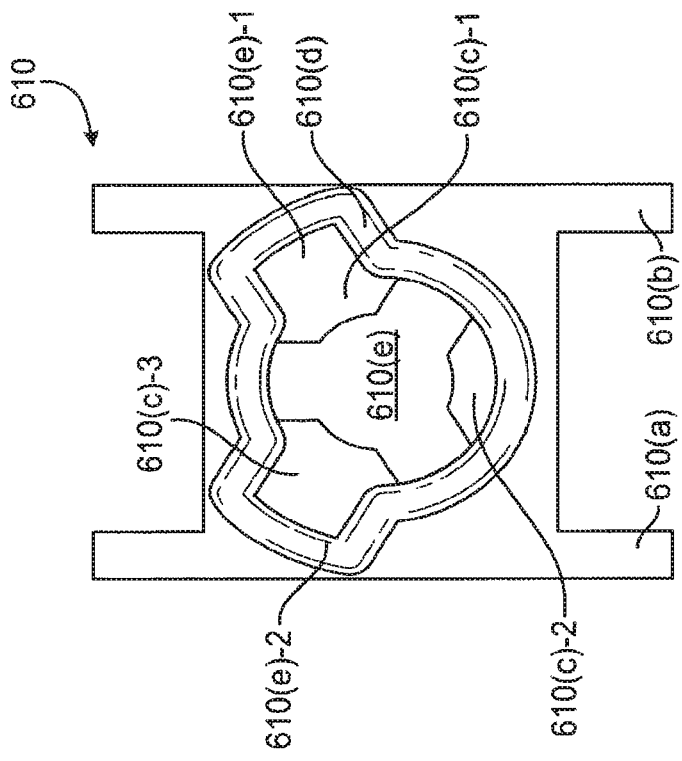
FIGS. 6(a)-6(b) show front views of lock interface members.

FIG. 6(a) shows a front view of the previously described lock interface member 610. As shown in FIG. 6(a), the lock interface member 610 has external protrusions 610(a), 610(b) which allows the lock interface member 610 to be secured to a portable electronic device (not shown). The wall 610(d) may define two slots 610(e)-1, 610(e)-2 which may receive the previously described stabilizing elements 604(a), 604(b) (see FIG. 5(a)). In this example, the slots 610(e)-1, 610(e)-2 may be co-extensive with the aperture 610(e). However, in other embodiments, the slots which receive the stabilizing elements 604(a), 604(b) may be separately formed from aperture 610(e). For example, the slots could be in the form of stabilizing apertures specifically designed to receive stabilizing elements. The internal and external dimensions of the lock interface member 610 can be substantially the same as or different than the exemplary dimensions of the previously described lock interface members.

The use of the slots 610(e)-1, 610(e)-2 is particularly advantageous. Each slot can receive a stabilizing element, and the slots 610(e)-1, 610(e)-2 may be spaced apart. When stabilizing elements are present within them, it is very difficult for one to torque out any locking head that may be engaged with the lock interface member 610.

Figure 6B:
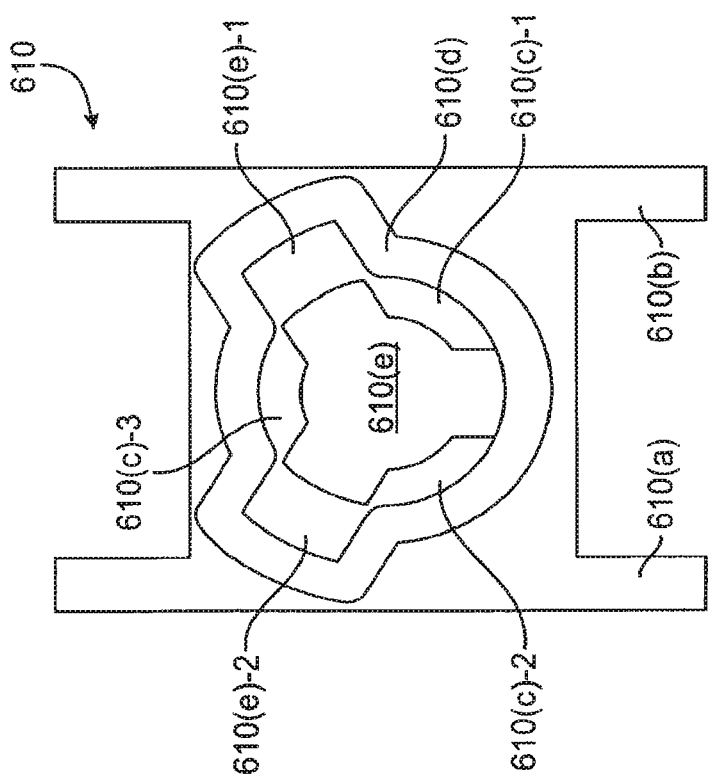

As shown in FIGS. 6(a) and 6(b), the internal protrusions 610(c)-1, 610(c)-2, and 610(c)-3 are spaced about 60 degrees apart from each other. Although three internal protrusions are shown in FIGS. 6(a) and 6(b), in other embodiments, there can be more or less internal protrusions.

FIG. 6(a) also shows axial views of three protrusions 610(c)-1, 610(c)-2, 610(c)-3 which may extend radially inward. As shown, the inner radial surfaces of the protrusions 610(c)-1, 610(c)-2, 610(c)-3 may be curved to receive the curved outer surface of the shaft of the engagement element 602. As explained previously, rear surfaces of the protrusions 610(c)-1, 610(c)-2, 610(c)-3 may be slanted to help distribute any axial pulling force on the head.

FIG. 6(b) shows another lock interface member 610. It is similar to the lock interface member 610 shown in FIG. 6(a), except that the protrusions 610(c)-1, 610(c)-2, 610(c)-3 are positioned about 120 degrees from the corresponding protrusions 610(c)-1, 610(c)-2, 610(c)-3 in FIG. 6(a).

Figure 7C:
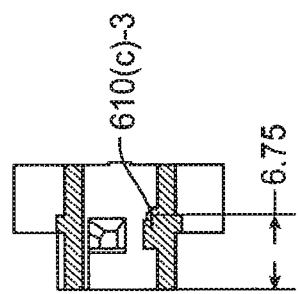
FIGS. 7(a)-7(c) show cross-sectional views of a lock interface member.
Figure 7B:
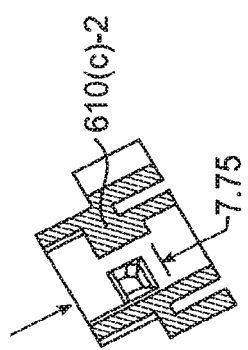
Figure 7A:
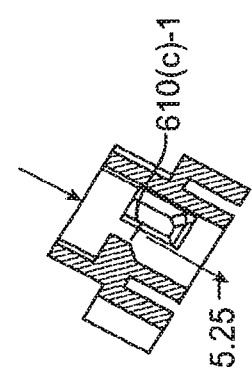

FIGS. 7(a)-7(c) shows cross-sectional views of the lock interface member 610. As shown in FIGS. 7(a)-7(c), the three protrusions 610(c)-1, 610(c)-2, 610(c)-3 may be elongated and may have different lengths. In other embodiments, they may have the same lengths. End portions of the protrusions 610(c)-1, 610(c)-2, 610(c)-3 can be spaced more than about 5 mm (e.g., about 5.25, 6.75, and 7.75 mm) from the entrance of the lock interface member 610 in the illustrated embodiment.

Figure 8:
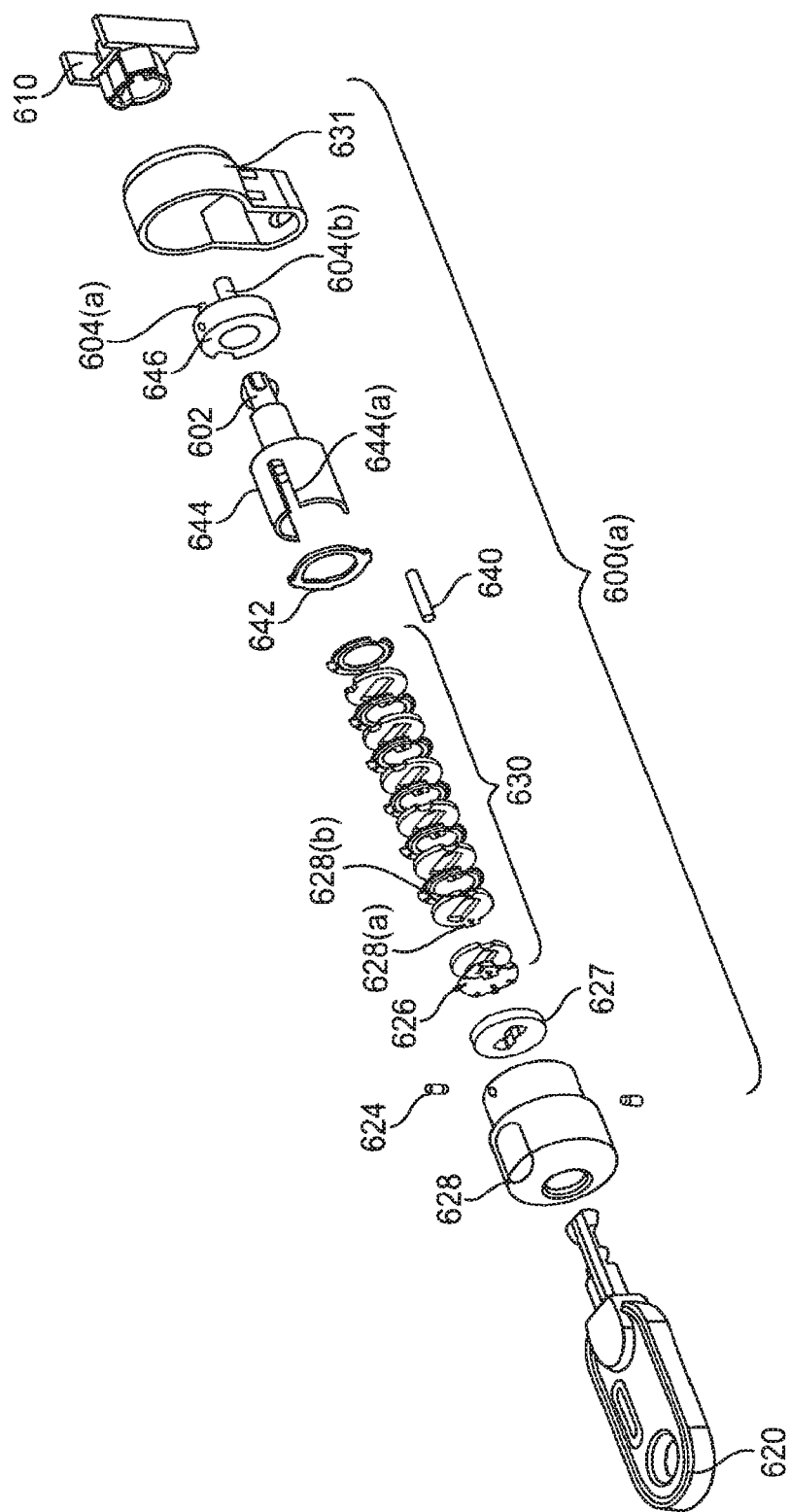
FIG. 8 shows an exploded view of a lock head and a lock interface member according to one embodiment of the invention.

FIG. 8 shows an exploded view of a head 600(a) and lock interface member 110 according to one embodiment of the invention. In this specific embodiment, a disk lock mechanism is shown. It is understood that any other type of lock mechanism (e.g., a tumbler lock mechanism) can be used in the security apparatus 600 including those that have been previously described.

FIG. 8 shows a key 620 which can be used with the head 600(a). The head 600(a) comprises a lock body 628 and a ferrule holder 631 (or cable ring) which can form a housing for the head 600(a). Pins 624 may be used to secure an anti-rotation plate 646 with stabilizing elements 604(a), 604(b) to the lock body 628. The engagement element 602 passes through a central hole in the anti-rotation plate 646.

The engagement element 602 is part of a locking spindle 644, which has a rear housing including a longitudinal slot 644(a). The longitudinal slot 644(a) receives a lock pin 640 when the lock is in a locked position. In the locked position, the edges of the disks in a set of disks 630 can push the pin 640 outward and into the longitudinal slot 644(a) and into a longitudinal groove (not shown) in the inner surface of the lock body 628 so that the locking spindle 644 cannot rotate.

On the other hand, the correct key 620 can be used to turn the disks in the set of disks to appropriate radial positions so that the notches 628(b) in the disks align. As a result, the lock pin 640 can be received in the aligned notches, and the lock pin 640 falls out of the longitudinal groove in the lock body, thereby allowing the locking spindle 644 to rotate. An ear 628(a) on each disk can prevent the disk from rotating beyond a predetermined point. Other components illustrated in FIG. 8 include a key plate 627, a compression spring 626, as well as an alignment disk 642.

The embodiments that are described with respect to FIGS. 4-8 have a number of advantages. For example, as explained above, the bond between the security apparatus and the lock interface member is very strong, because there is a good deal of contact area between the lock interface member and the components of the security apparatus. Also, any axial pulling force applied to the lock head is distributed in different directions so that one part of the lock interface member does not have to bear all of the applied force.

A number of additional locking head embodiments, and corresponding locking head/interface member combinations, are shown in FIGS. 9-45. It is understood that any of the embodiments shown in FIGS. 9-45 can be used with any of the previously described embodiments (e.g., the system in FIG. 1, the lock mechanism shown in FIG. 2(c), the previously described lock interface members, etc.). Also, although specific locking mechanisms are not shown in FIGS. 9-45, it is understood that suitable locking mechanisms can be used to actuate the engagement elements and/or stabilizing elements shown in FIGS. 9-45 can be determined by those of ordinary skill in the art.

FIGS. 9(a) and 9(b) show another example of a locking head 900 according to another embodiment of the invention. The locking head 900 comprises a first portion 902 including a generally cylindrically-shaped base 902(a) with a plurality of integrally formed stabilizing elements 902(b) extending radially outward therefrom. An additional stabilizing element 902(c) may extend axially and integrally from the base 902(a), and may be configured as a trough, which partially contains a second portion in the form of a movable engagement element 904. As shown in FIG. 9(a), the locking head, and more particularly, the engagement element 904 may be in an unlocked configuration and may be closer (i.e. proximate) to the stabilizing element 902(c), while the engagement element 904 is further (i.e., distal) to the stabilizing element 902(c) when the engagement element 904 is in the locked configuration shown in FIG. 9(b). As shown, the engagement element 904 can move radially into and out of the trough formed by the stabilizing element 902(c).

FIG. 9(c) shows parts of the first and second portions 902, 904 of the locking head 900 being within an aperture in the lock interface member 610. The locking head 902 is in a locked configuration in FIG. 9(c), since the second portion 904 including the engagement element is engaged to an internal protrusion in the lock interface member 610. FIG. 9(d) shows an outward view of the locking head 900 and lock interface member 610 combination shown in FIG. 9(c). As shown in FIG. 9(d), the stabilizing element 902(c) is between two adjacent internal protrusions in the lock interface member 610.

Figure 10A:
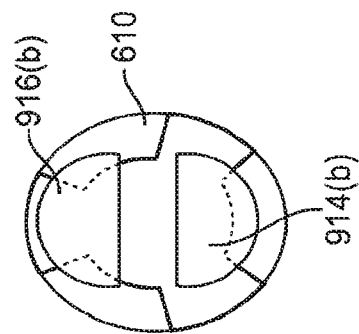
FIGS. 10(a)-10(b) respectively show perspective views of another locking head embodiment in unlocked and locked configurations.

FIG. 10(a) shows another locking head embodiment according to another embodiment of the invention. The locking head 910 includes a base 912 (which may be part of a housing of the locking head 910) as well as first and second arms 914, 916 coupled to the base 912 via a hinge 918. Each arm 914, 916 includes a linear portion 914(a), 916(b) and an engagement portion 914(b), 916(b). The arms 914, 916 are connected at their terminal ends at the hinge 918 so that the arms 914, 916 are part of a scissor-like mechanism. In this example, one arm (e.g., arm 914) can be considered an engagement element while the other arm can be considered a stabilizing element (e.g., arm 916).

Figure 10B:
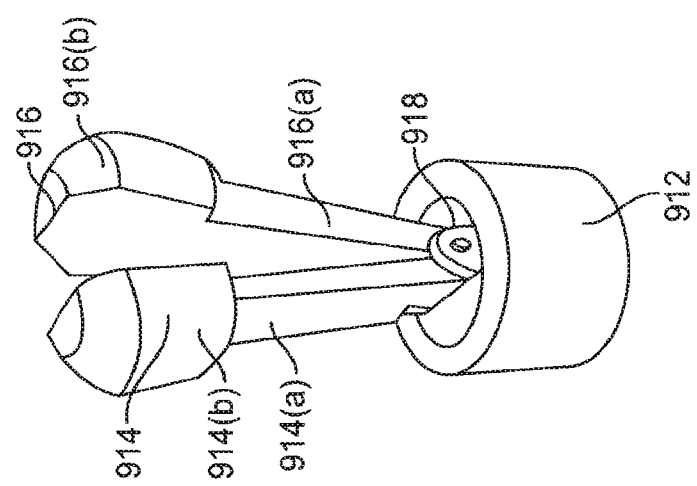
Figure 10C:
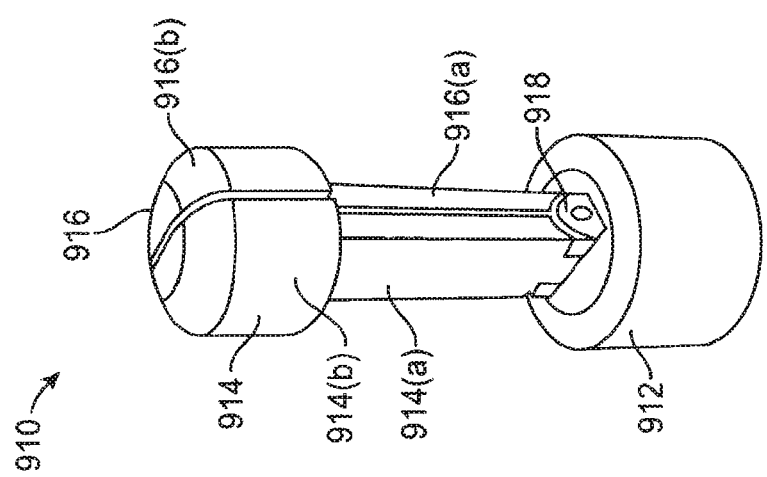
FIG. 10(c) shows an outward view of the locking head embodiment shown in FIG. 10(c), when it is engaged with a lock interface member.

As shown in FIG. 10(b), the arms 914, 916 can open up to a locked configuration. As shown in FIG. 10(c), the engagement portions 914(b), 916(b) can engage the internal protrusions in the lock interface member 610, so that the locking head 910 is secured to the lock interface member 610.

FIG. 11(a) shows another locking head embodiment according to another embodiment of the invention. The locking head 920 includes a base 922 with radially extending stabilizing elements 922(a) as well as first and second arms 924, 926 coupled to the base 922 via a hinge 928. Each arm 924, 926 includes a linear portion 924(a), 926(b) and an engagement portion 924(b), 926(b). The first and second arms 924, 926 are connected at their terminal ends at the hinge 928. Also, the first arm 924 includes a trough 924(c) at its inner face, where the trough 924(c) receives the second arm 926 (see FIG. 11(b)). In this example, one arm (e.g., arm 924) can be considered an engagement element while the other arm can be considered a stabilizing element (e.g., arm 926).

As shown in FIG. 11(c), the engagement portions 924(b), 926(b) can engage the internal protrusions in the lock interface member 610, so that the locking head 920 is secured to the lock interface member 610. The engagement portions 924(b), 926(b) face away from each other in this example.

Figure 12C:
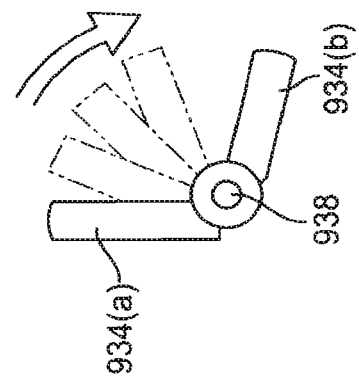
FIG. 12(c) shows a top view of a portion of the locking head shown in FIG. 12(a).
Figure 12B:
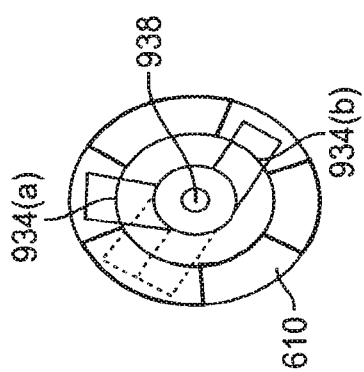
FIG. 12(b) shows an outward view of the locking head embodiment shown in FIG. 12(a) when it is engaged with a lock interface member.
Figure 12A:
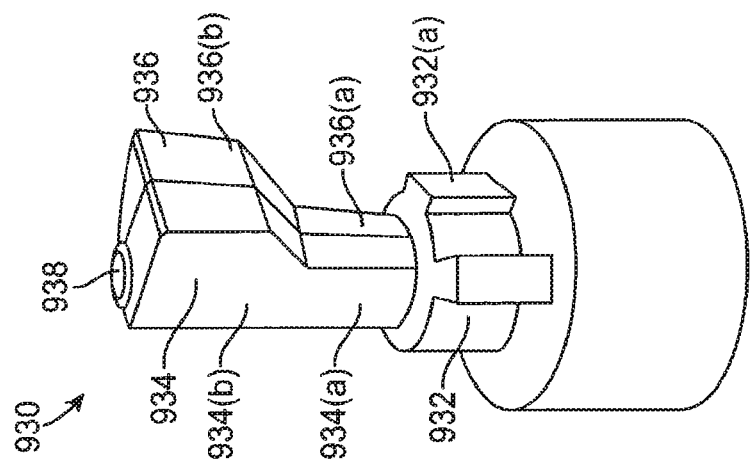
FIG. 12(a) shows a perspective view of another locking head embodiment, in an unlocked configuration.

FIG. 12(a) shows another locking head embodiment according to another embodiment of the invention. The locking head 930 includes a base 932 with radially extending stabilizing elements 932(a) as well as first and second arms 934, 936 coupled to the base 932 via a pivot element 938. Each arm 934, 936 includes a linear portion 934(a), 936(a) and an engagement portion 934(b), 936(b). The first and second arms 934, 936 are connected though the pivot element 938.

FIG. 12(b) shows an outward view of the top of the locking head 930 when it is in a lock interface member 610 in a locked position. As shown by the dotted lines in FIG. 12(b), the arms 934, 936 can be inserted between adjacent internal protrusions in the lock interface member 610. Once the engagement portions 934(b), 936(b) are inserted past the internal protrusions, the engagement portions 934(a), 934(b) can rotate away from each other as shown in FIGS. 12(b) and 12(c). Once this is done, as shown in FIG. 12(b), the locking head 930 cannot be separated from the lock interface member 610.

Figure 13C:
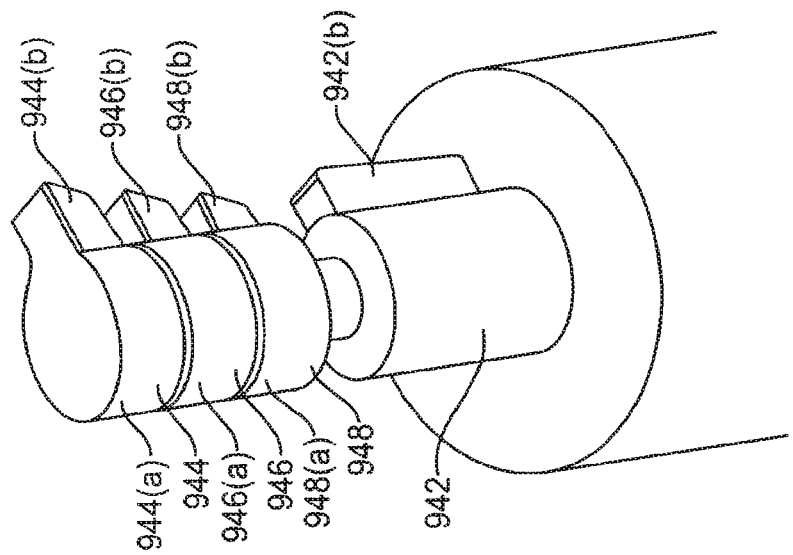
FIG. 13(c) shows a perspective view of the locking head embodiment in an unlocked configuration.
Figure 13B:
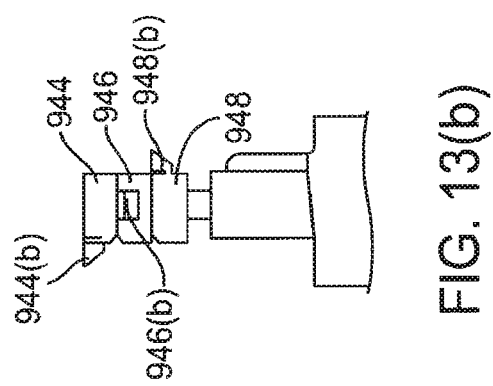
FIGS. 13(a) and 13(b) respectively show a perspective view and side view of another locking head embodiment in a locked configuration.
Figure 13A:
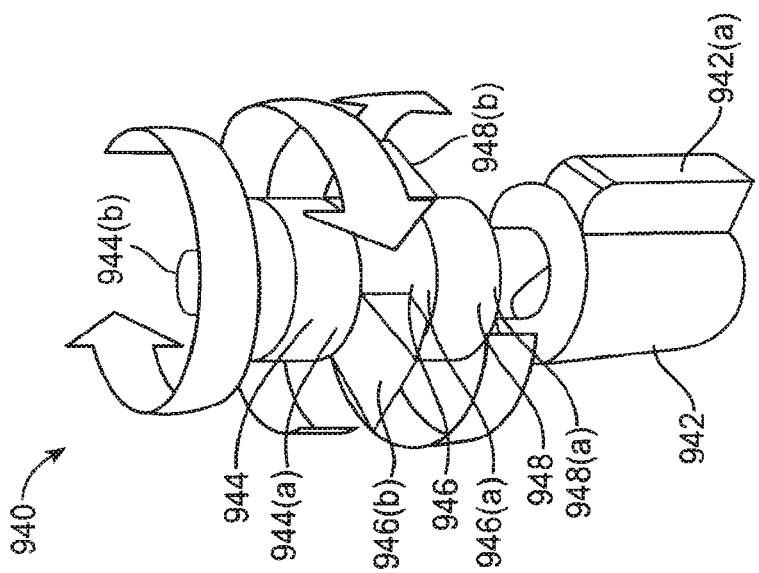

FIG. 13(a) shows another locking head embodiment. The locking head 940 includes a base 942 with radially extending stabilizing elements 942(a) as well as first, second, and third engagement elements 944, 946, 948 coupled to the base 932 via a pivot element (not shown). Each engagement element 944, 946, 948 includes a main portion 944(a), 946(a), 948(a), and an engagement portion 944(b), 946(b), 948(b) integral with and extending from the main portion 944(a), 946(a), 948(a). As shown in FIG. 13(a), the engagement elements 944, 946, 948 can rotate independently of each other so that the locking head 940 can be in a locked configuration as shown in FIGS. 13(a) and 13(b), or in an unlocked configuration as shown in FIG. 13(c). As shown in FIG. 13(c), the engagement portions 944(b), 946(b), 948(b) are all aligned so that they can be inserted past and between any adjacent internal protrusions in the lock interface member. Once the locking head 940 is in its proper position within the lock interface member, the engagement elements 944(b), 946(b), 948(b) can be rotated independently of each other, so that they can engage corresponding internal protrusions in the lock interface member.

FIG. 14(a) shows another locking head embodiment. The locking head 950 includes a base 952 with radially extending stabilizing elements 952(a) as well as first and second engagement elements 954, 956 coupled to the base 952 via an attachment element 960 (see FIG. 14(c)). Each engagement element 954, 956 includes a groove 954(a), 956(a), where the grooves 954(a), 956(a) face away from each other. The first and second engagement elements 954, 956 are also slidably coupled together via slanted surfaces 954(b), 956(b).

FIGS. 14(b) and 14(e) show the locking head 950 in a locked configuration while FIGS. 14(a) and 14(d) show the locking head 950 in an unlocked configuration. In the unlocked configuration, the first and second engagement elements 954, 956 can freely move into and out of a lock interface member. However, in the locked configuration, the first and second engagement elements 954, 956 are positioned slightly away from each other so that the grooves 954(a), 956(a) can engage any internal protrusions in the lock interface member.

Figure 15C:
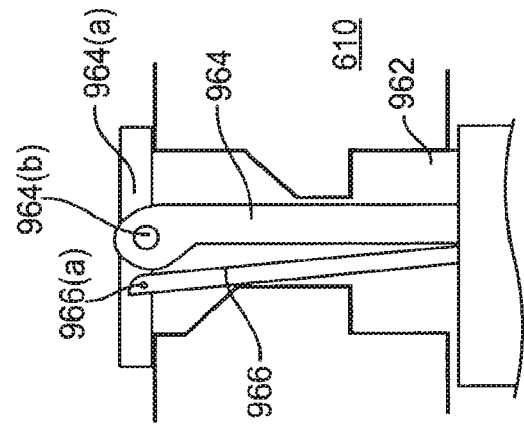
FIG. 15(c) shows an outward view of the locking head embodiment shown in FIGS. 15(a)-15(b), when it is engaged with a lock interface member.
Figure 15B:
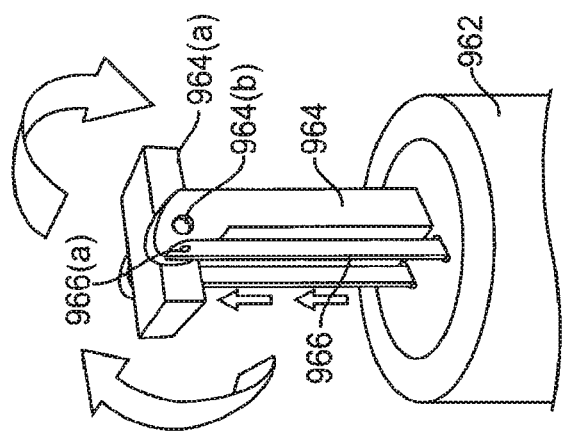
FIGS. 15(a)-15(b) respectively show perspective views of another locking head embodiment in unlocked and locked configurations.
Figure 15A:
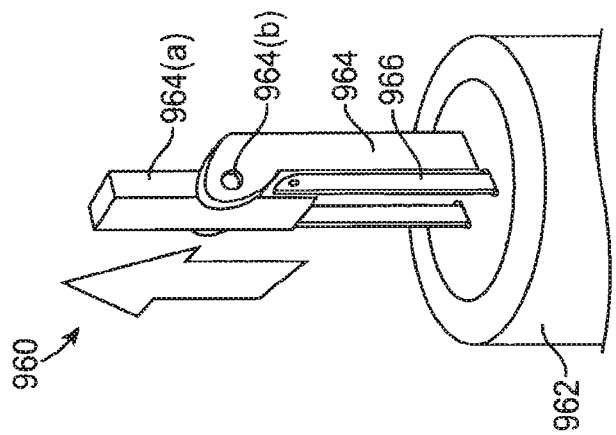

FIG. 15(a) shows another locking head embodiment according to another embodiment of the invention. The locking head 960 comprise a base 962 and first linear element 964 extending from the base 962. A movable engagement element 964(a) is coupled to the first linear element 964 via a hinge 964(b). A second linear element 966 can be a stabilizing element and can be connected to one end of the movable engagement element 964(a).

As shown in FIG. 15(b), the second linear element 966 can actuate in an axial direction out of the base 962 to cause the movable engagement element 964(a) to be perpendicular to the orientation of the first linear element 964. Alternatively, the second linear element 966 can actuate in an axial direction into the base 962 to cause the movable engagement element 964(a) to be parallel to the orientation of the first linear element 964 as shown in FIG. 15(a).

As shown in FIG. 15(c), when the movable engagement element 964(a) is perpendicular to the first linear element 964(a), the movable engagement element 964(a) is engaged with the lock interface member 610 and the locking head 960 is secured to the lock interface member 610.

Figure 16:
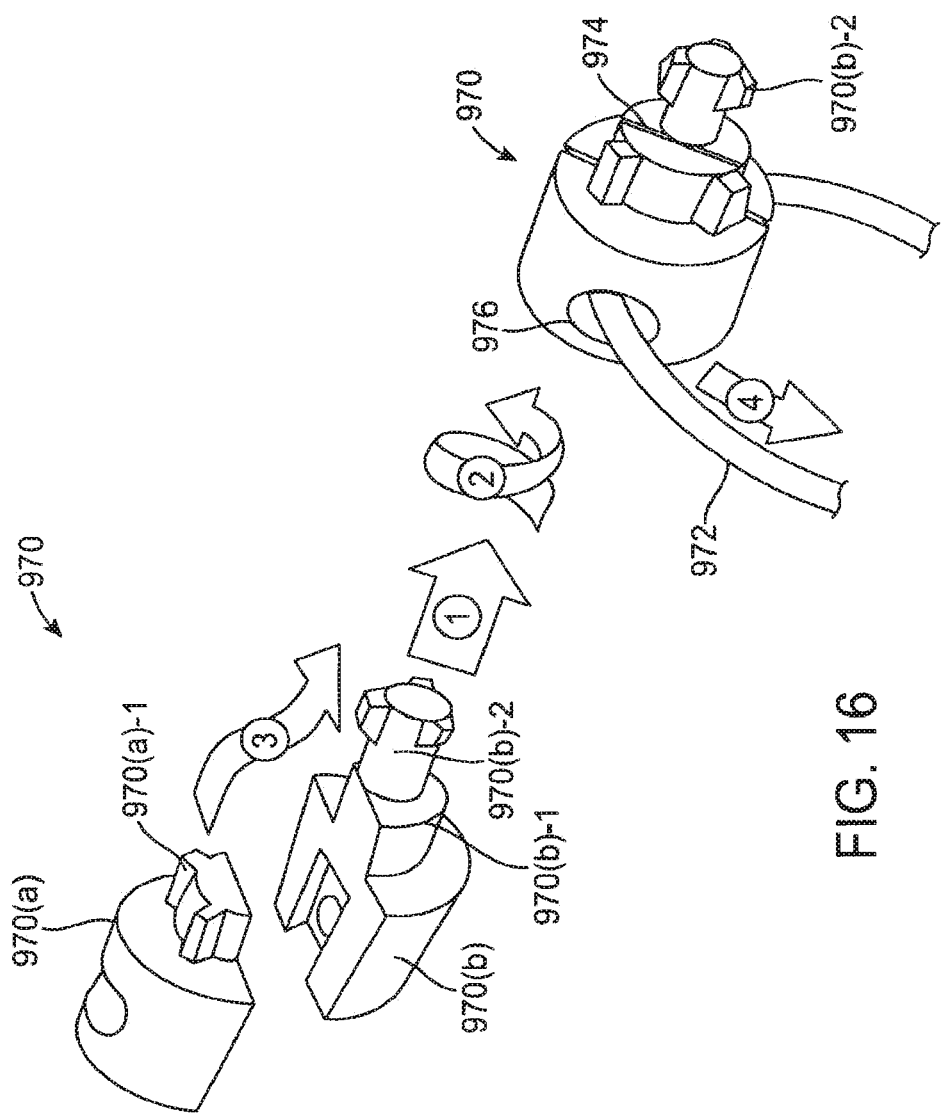
FIG. 16 shows perspective views of another security apparatus embodiment in disassembled and assembled states.

FIG. 16 shows another locking head embodiment according to an embodiment of the invention. The locking head 970 comprises a first part 970(a) and a second part 970(b) that is cooperatively configured to the first part 970(a). The first part 970(a) includes a first base portion 970(a)-1 and the second part includes a second base portion 970(b)-1. The first and/or second base portions 970(a)-1, 970(b)-1 can form a base and can have radially extending stabilizing elements. An engagement portion 970(b)-2 is part of the second part 970(b) and extends axially from the second base portion 970(b)-1.

When it is used, the engagement portion 970(b)-2 can be inserted past internal protrusions in a lock interface member (not shown). After it is in a locked configuration, the first part 970(a) with the first base portion 970(a)-1 can mate with the second part 970(b), and the first base portion 970(a)-1 can be inserted into the lock interface member. Then, as shown in FIG. 16, a cable 972 can thread through an aperture 976 in the locking head 970.

Figure 17C:
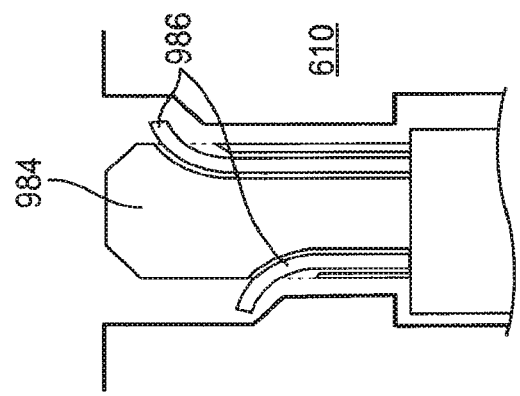
FIG. 17(c) shows an outward view of the locking head embodiment shown in FIGS. 17(a)-17(b), when it is engaged with a lock interface member.
Figure 17B:
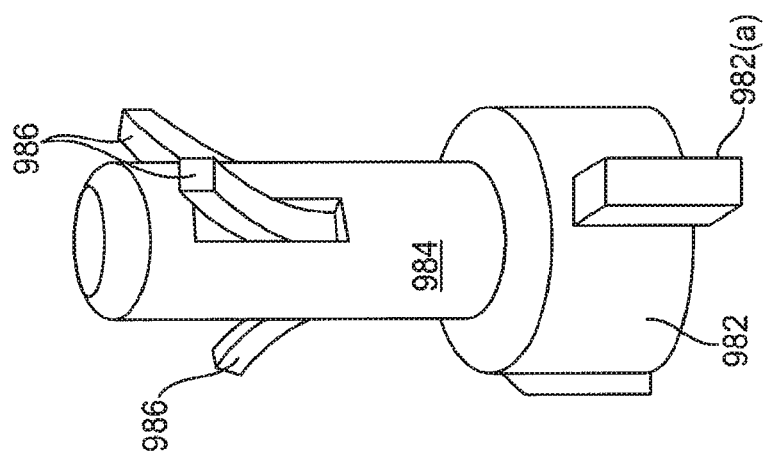
FIGS. 17(a)-17(b) respectively show perspective views of another locking head embodiment in unlocked and locked configurations.
Figure 17A:
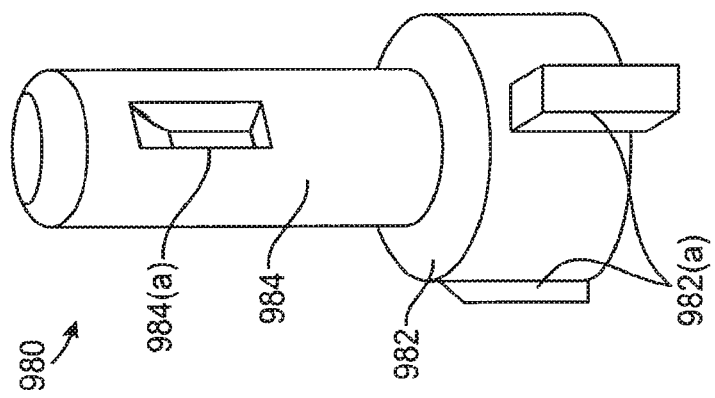

FIG. 17(a) shows another locking head embodiment according to another embodiment of the invention. FIG. 17(a) shows a locking head 980 comprising a base 982 including radially extending stabilizing elements 982(a). A stabilizing element 984 including apertures 984(a) extends from the base 982.

As shown in FIG. 17(b), engagement elements 986 can extend outward from the stabilizing element 984 at different points along the stabilizing element 984. As shown in FIG. 17(c), when the locking head 980 is in a locked configuration, the engagement elements 986 engage the internal protrusions in the lock interface member 610.

FIG. 18(a) shows another locking head embodiment according to another embodiment of the invention. FIG. 18(a) shows a locking head 990 comprising a base 992 and an engagement element 994 extending from the base 992. The engagement element 994 includes a linear portion 994(b) and an engagement portion 994(a).

As shown in FIG. 18(b), to engage the lock interface member 610, the engagement portion 994(a) contacts an inner wall of the lock interface member 610, and a stabilizing element 996 is inserted into the aperture in the lock interface member 610 to fill any remaining space. FIG. 18(c) shows that the stabilizing element 996 may have a groove which receives the linear portion 994(b) of the engagement element 994.

FIG. 19(a) shows another locking head embodiment according to another embodiment of the invention. The locking head 1000 includes a base 1002 and an engagement element 1004 extending from the base 1002. The engagement element 1002 includes first and second lateral wings 1004(a), 1004(b) at a distal end of the engagement element 1002.

As shown in FIG. 19(b), a first stabilizing element 1006, and base stabilizing elements 1007 can stabilize the locking head within a lock interface member 610 when the locking head 1000 is in a locked configuration.

As shown in FIG. 19(c), after the engagement element 1004 is inserted into the lock interface member 610 and after the wings 1004(a), 1004(b) are inserted past the protrusions in the lock interface member 610, it is rotated slightly so that wings 1004(a), 1004(b) overlap with the internal protrusions of the lock interface member 610. Then, the stabilizing element 1006 is inserted into the aperture in the lock interface member 610.

FIG. 20(a) shows another locking head embodiment according to another embodiment of the invention. FIG. 20(a) shows a locking head 1010 including a base 1012 including radially extending stabilizing elements 1012(a). An engagement element 1014 including a linear portion 1014(a) and an engagement portion 1014(b) extends from the base 1012. A movable stabilizing element 1016 also extends from the base 1012.

FIG. 20(b) shows the locking head 1010 in an unlocked configuration. FIG. 20(b) shows the locking head 1010 in a locked configuration. As shown in FIG. 20(c), the engagement element 1014 engages the inner wall of the lock interface member 610, while the stabilizing element 1016 fills the remaining space in the aperture in the lock interface member 610.

Figure 21C:
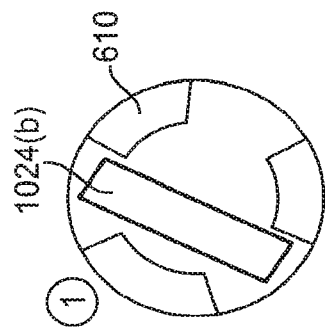
FIG. 21(c) shows a locking head with an engagement element not engaged with a lock interface member.
Figure 21D:
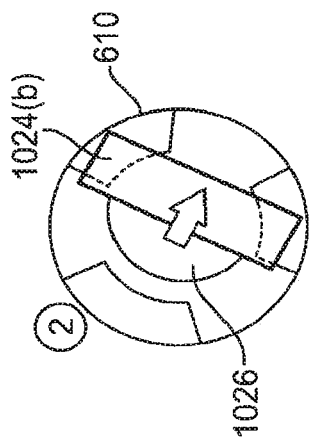
FIG. 21(d) shows a locking head with an engagement element that is engaged with a lock interface member.
Figure 21B:
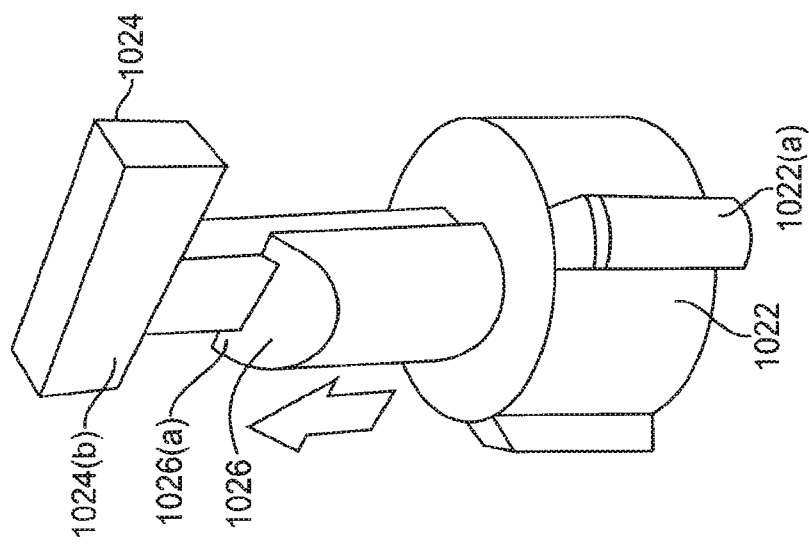
FIGS. 21(a) and 21(b) respectively show a locking head with a stabilizing element in a retracted position and an extended position.
Figure 21A:
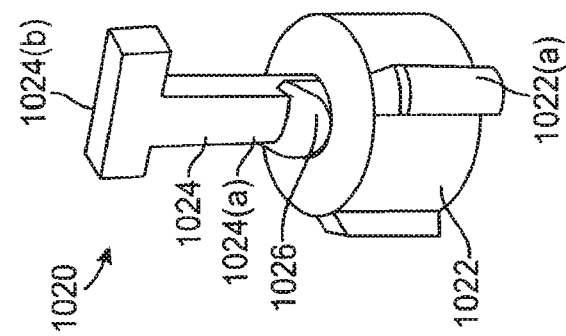

FIG. 21(a) shows another locking head embodiment according to another embodiment of the invention. FIG. 20(a) shows a locking head 1020 including a base 1022 including radially extending stabilizing elements 1022(a). An engagement element 1024 including a linear portion 1024(a) and an engagement portion 1024(b) in the form of a "T" extends from the base 1022. A movable stabilizing element 1026 also extends from the base 1012.

FIG. 21(a) shows the locking head 1020 in an unlocked configuration. FIG. 21(b) shows the locking head 1020 in a locked configuration. As shown, the stabilizing element 1026 can move in an axial direction towards the engagement element 1024, and may include a groove 1026(a) which can receive the linear portion 1024(a) of the engagement element 1024.

As shown in FIG. 21(c), the engagement portion 1024(b) of the engagement element 1024 can be inserted into the lock interface member 610, past protrusions in the lock interface member 610. The engagement portion 1024(b) can then be moved so that it overlaps with the protrusions in the lock interface member 610. Then, as shown in FIG. 21(d), the stabilizing element 1026 fills space in the aperture in the lock interface member 610 to secure the locking head 1020 to the lock interface member 610.

FIG. 22(a) shows a locking head embodiment according to another embodiment of the invention. FIG. 22(a) shows a stationary engagement element 1030 including a linear portion 1032(b) and an engagement portion 1032(a). As shown in both FIGS. 22(a) and 22(b), a linear stabilizing element 1034 with a trough can actuate in an axial direction.

FIG. 22(c) shows the locking head embodiment when the locking head is in a locked configuration within a lock interface member 610. As shown, the engagement portion 1032(a) lies over a protrusion while the stabilizing element 1034 stabilizes the locking head 1030 and secures it to the lock interface member 610.

FIG. 23(a) shows another locking head embodiment according to another embodiment of the invention. The locking head 1040 includes three engagement elements 1042(a), each including a groove 1042(a) at a different axial location. The grooves 1042(a) may be configured to receive protrusions in a lock interface member, when the three engagement elements 1042(a) extend in a radially outward direction as shown in FIG. 23(b). As shown in FIG. 23(c), a stabilizing element 1046 may actuate in a forward axial direction to cause the engagement elements 1042 to move away from each other.

FIG. 24(a) shows another locking head embodiment according to another embodiment of the invention. The locking head 1050 comprises a base 1058, and a plurality of engagement elements 1054 coupled to the base 1058 via small hinges. As shown in FIG. 24(b), a stabilizing element 1056 may move in a forward axial direction and may consequently push the engagement elements 1054 outward to engage protrusions in a lock interface member. FIG. 24(c) shows a perspective view of the locking head 1050 when it is in a locked configuration.

Figure 25C:
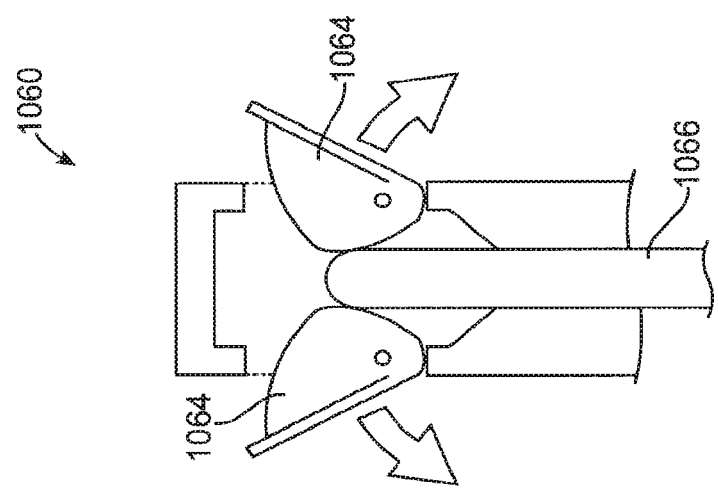
FIG. 25(c) shows a side, cross-sectional view of the locking head embodiment in FIG. 25(a) in a locked configuration.
Figure 25B:
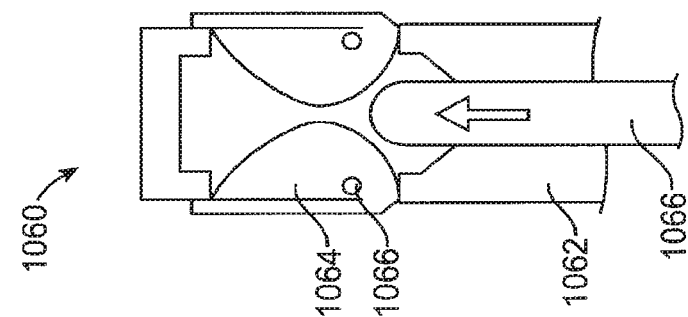
FIG. 25(b) shows a side, cross-sectional view of the locking head embodiment in FIG. 25(a) in an unlocked configuration.
Figure 25A:
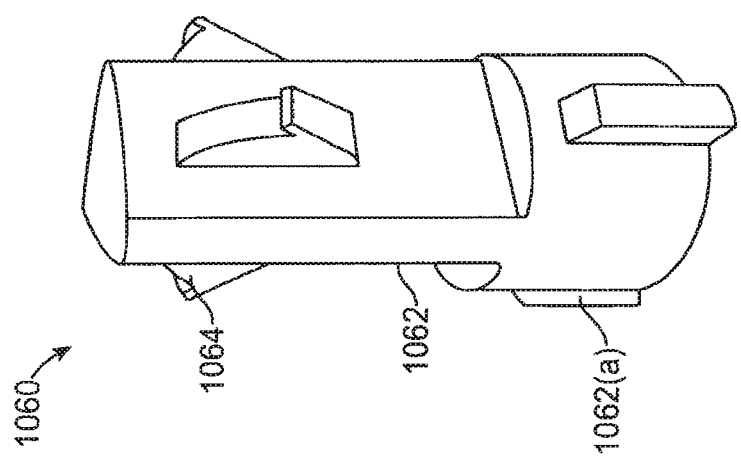
FIG. 25(a) shows a perspective view of a locking head embodiment in a locked configuration.

FIG. 25(a) shows another locking head embodiment according to another embodiment of the invention. The locking head 1060 comprises a base 1062 including radially extending stabilizing elements 1062(a), and a plurality of engagement elements 1064 coupled to the base 1062 via small hinges 1066. As shown in FIGS. 25(b) and 25(c), a stabilizing element 1066 may move in an axial direction upward and may consequently push the engagement elements 1064 outward to engage protrusions in a lock interface member.

Figure 26C:
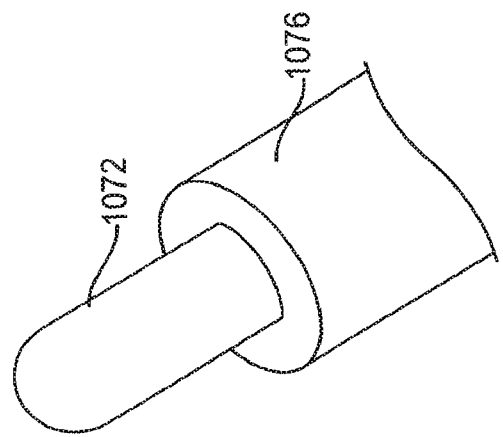
FIG. 26(c) shows a perspective view of another locking head embodiment.
Figure 26B:
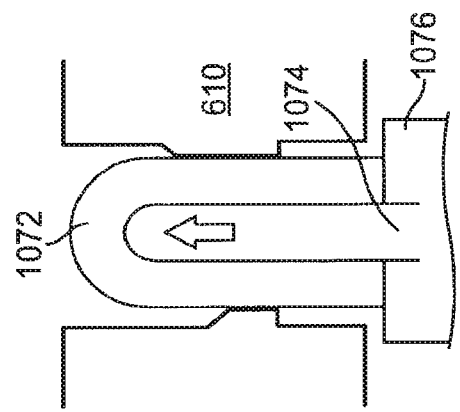
FIGS. 26(a) and 26(b) show side views of a locking head embodiment in a locked configuration and an unlocked configuration when present in a lock interface member.
Figure 26A:
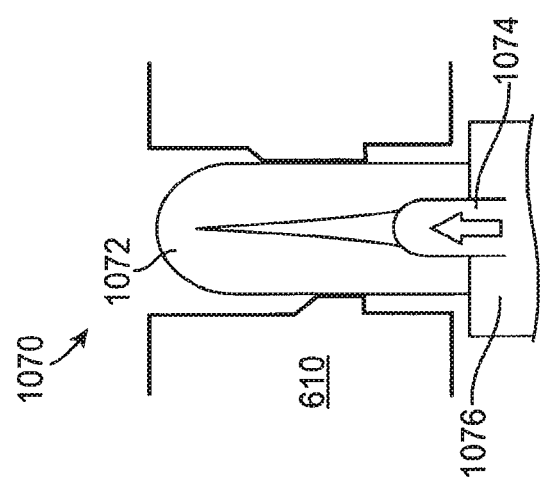

FIG. 26(a) shows another locking head embodiment according to another embodiment of the invention. The locking head 1070 comprises a base 1076, and a compressible element 1072 comprising an elastomeric material coupled to the base 1076. The elastomeric material 1072 has a central hole, and a movable stabilizing element 1074 can move in an axial direction within the hole. As shown in FIG. 26(b), when the moving stabilizing element 1074 fills the hole in the compressible element 1072, the compressible element 1072 is pushed radially outward so that it engages the protrusions of the lock interface member 610. In this example, the compressible element 1072 may be an example of an engagement element. FIG. 26(c) shows a perspective view of the locking head 1070.

Figure 27C:
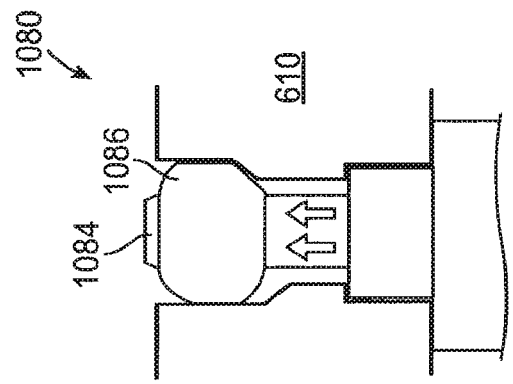
FIG. 27(c) shows a locking head embodiment when the locking head is secured to a lock interface member.
Figure 27B:
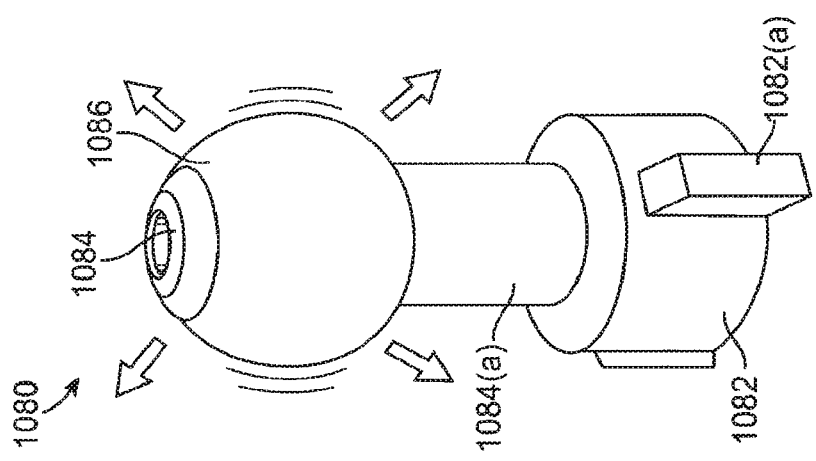
FIGS. 27(a) and 27(b) show perspective views of a locking head embodiment in an unlocked and a locked configuration.
Figure 27A:
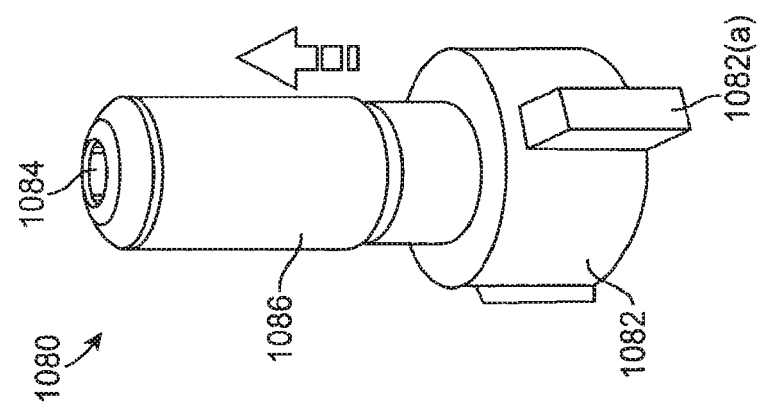

FIG. 27(a) shows another locking head embodiment according to another embodiment of the invention. The locking head 1080 includes a base 1082 including stabilizing elements 1082(a) that extend radially outward. The locking head 1080 also includes a compressible element 1086 that is between a movable structure 1084(a) and an end structure 1084. In this example, the compressible element 1086 may be an example of an engagement element.

The locking head 1080 is in an unlocked configuration in FIG. 27(a) and the compressible element 1086 is uncompressed. In FIGS. 27(b) and 27(c), the locking head 1080 is in a locked configuration. The compressible element 1086 compresses in response to the linear movement of the movable structure 1082. The end structure 1084 remains stationary. As shown in FIG. 27(c), when the compressible element 1086 is compressed, it extends radially outward and engages the inner walls of the lock interface member 610.

Figure 28B:
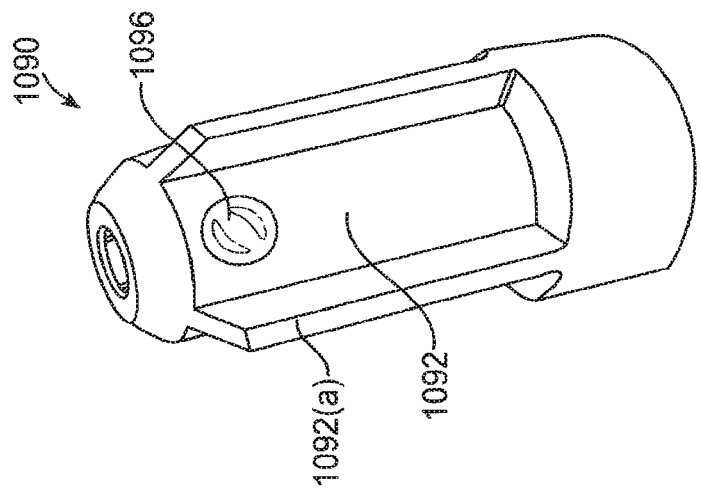
FIG. 28(b) shows an axial view of the locking head embodiment shown in FIG. 28(a).
Figure 28C:
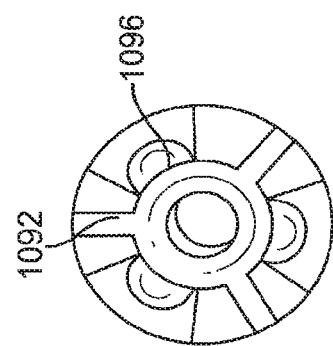
FIG. 28(c) shows a perspective view of a locking head embodiment in a locked configuration.
Figure 28A:
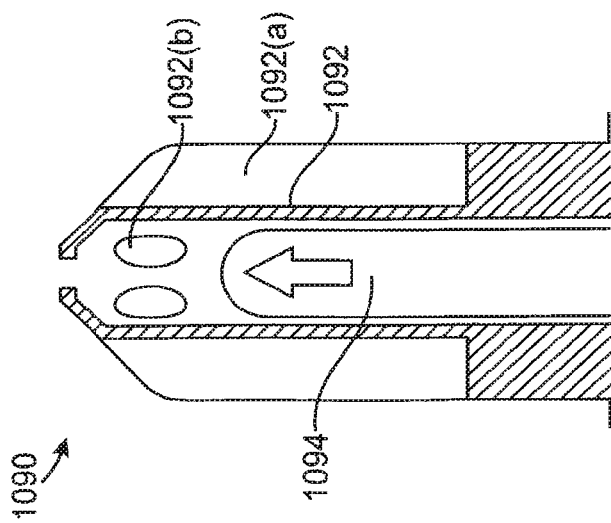
FIG. 28(a) shows a side, cross-sectional view of another locking head embodiment in an unlocked configuration.

FIG. 28(a) shows another locking head embodiment according to another embodiment of the invention. FIG. 28(a) shows a hollow body 1092 including a number of radially extending flanges 1092(a), and holes 1092(b) at a distal end. Referring to FIGS. 28(a), 28(b), and 28(c), a linear movable structure 1094 moves within the hollow body 1092 and can push balls 1096 or other structures radially outward to engage protrusions in a lock interface member (not shown).

Figure 29A:
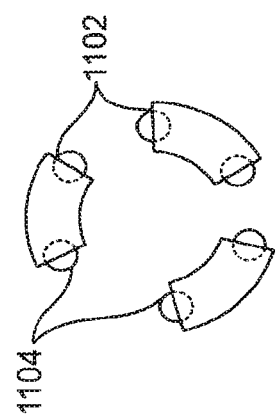
FIG. 29(a) shows a perspective view of another locking head embodiment in a locked configuration.
Figure 29B:
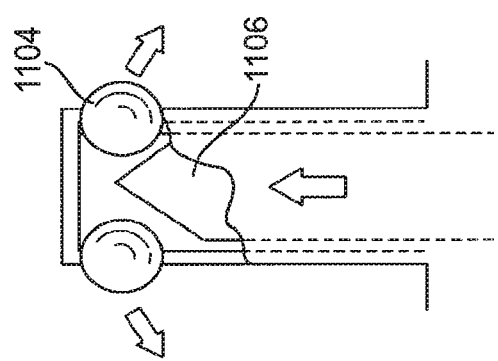
FIG. 29(b) shows an axial view of the locking head embodiment shown in FIG. 29(a).
Figure 29C:
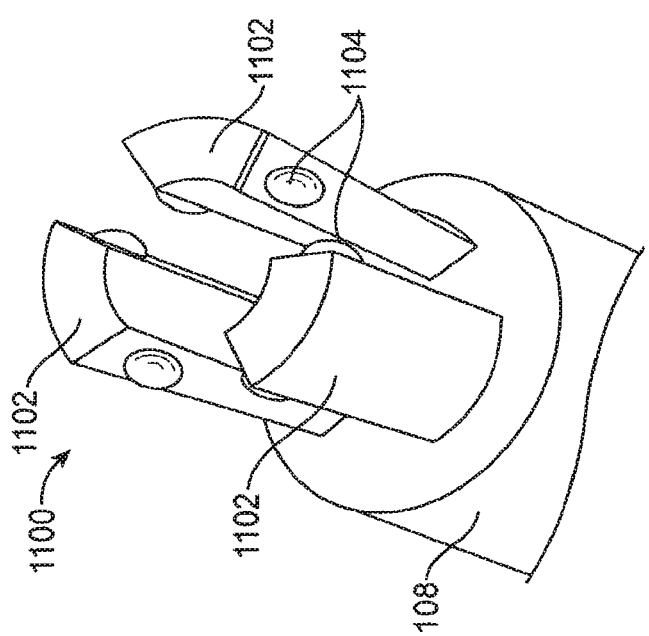
FIG. 29(c) shows a side, cross-sectional view of a locking head embodiment in a locked configuration.

FIG. 29(a) shows another locking head embodiment according to another embodiment of the invention. FIG. 29(a) shows a locking head 1100 including a base 1108 and three hollow, arc-shaped pillar structures 1102 including holes on the sides thereof. As shown in FIGS. 29(a), 29(b) and 29(c), balls 1104 may be present at lateral ends of the arc-shaped pillar structures 1102 and may extend outward from the respective pillar structures 1102 when a linear movable structure 1106 within each pillar structure 1112 can moves toward the balls 1104. The outwardly extended balls 1104 can prevent the locking head 1110 from being withdrawn from a lock interface member. As in prior embodiments, the base 1108 may have radially extending stabilizing elements (not shown in FIG. 29(a)).

Figure 30A:
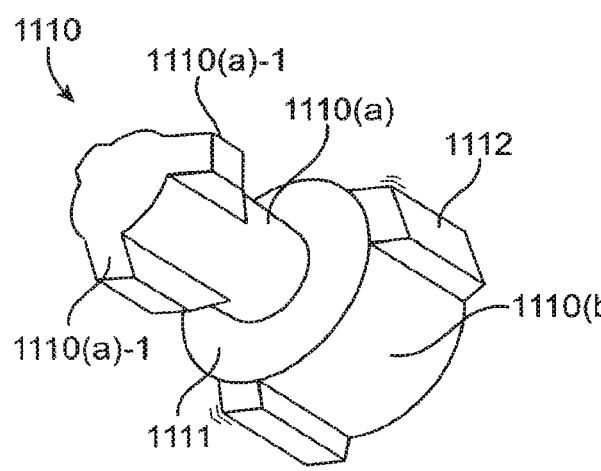
FIGS. 30(a)-30(b) respectively show locking head embodiments in locked and unlocked configurations.
Figure 30B:
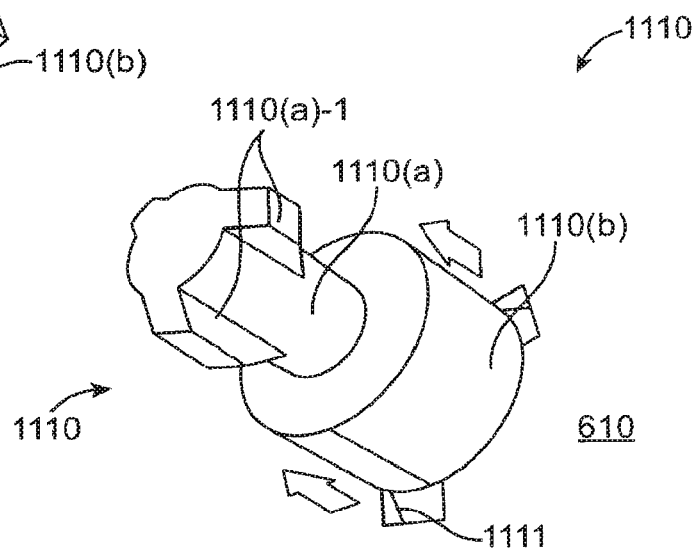

FIG. 30(a) shows another locking head embodiment according to another embodiment of the invention. FIG. 30(a) shows a locking head including a body 1111 with a first part 1110(a) and a second part 1110(b). The second part 1110(b) has a larger diameter than the first part 1110(a). The first part has engagement elements 1110(a)-1 including different axial lengths. As shown in FIGS. 30(a) and 30(b), stabilizing elements 1112 can be inserted into portions 1111 of an aperture in a lock interface member 610 and alongside the second part 1110(b) to stabilize the locking head 1110 with respect to the lock interface member 610.

Figure 31A:
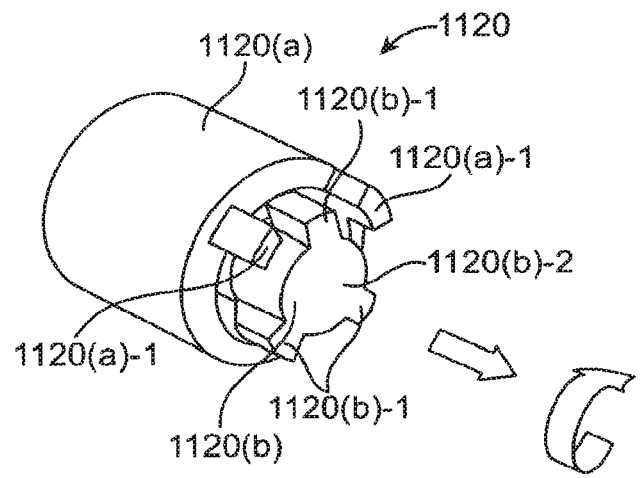
FIGS. 31(a)-31(b) respectively show locking head embodiments in locked and unlocked configurations.

FIG. 31(a) shows another locking head embodiment. FIG. 31(a) shows a locking head 1120 including a cylindrically-shaped base 1120(a) including axially extending stabilizing elements 1120(a)-1. An engagement element 1120(b) with a linear portion 1120(b)-1 and axially extending engagement portions 1120(b)-1 of different lengths, can move axially within the cylindrically-shaped base 1120(b). The engagement portions 1120(b)-1 can engage the protrusions in the previously described lock interface members. After the engagement portions 1120(b)-1 engage the protrusions in the lock interface member, the stabilizing elements 1120(a)-1 can be inserted into the lock interface member to secure the head 1120 to the lock interface member.

Figure 31B:
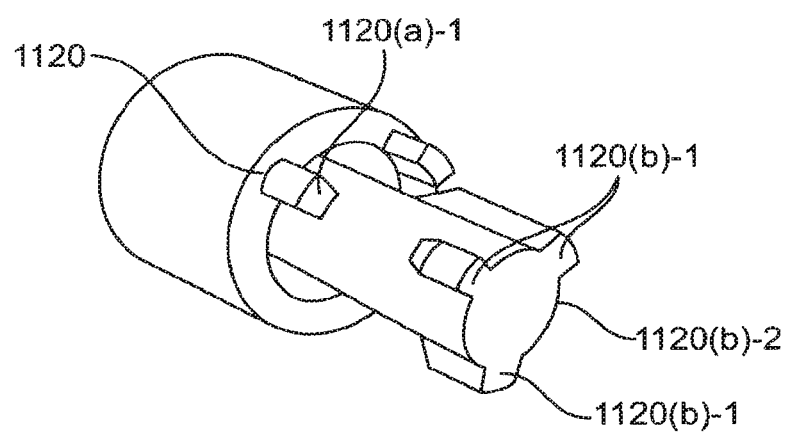
Figure 32B:
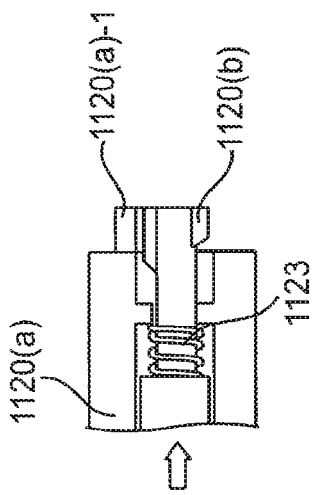
FIGS. 32(b)-32(c) show side views of other locking head embodiments.
Figure 32C:
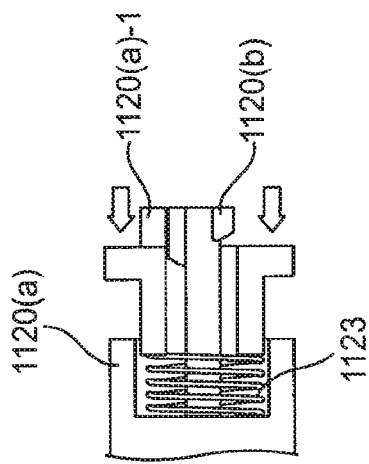
Figure 32A:
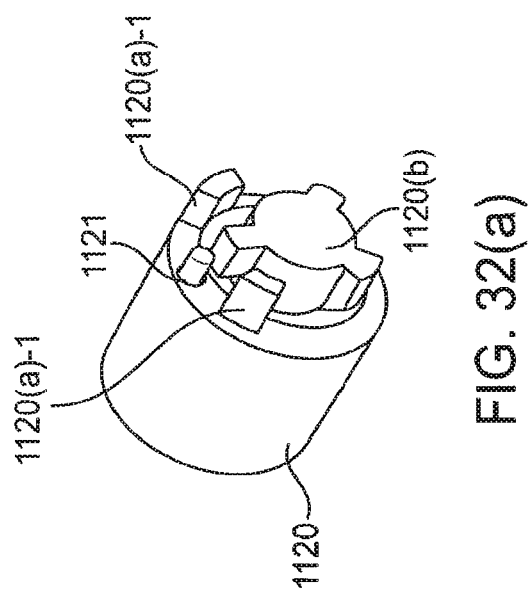
FIG. 32(a) shows another locking head embodiment.

FIGS. 32(a)-32(c) show a locking head embodiment that is somewhat similar to the locking head embodiment shown in FIGS. 31(a)-31(c). The locking head in FIG. 32(a) additionally shows an actuating button 1121. In an embodiment of the invention, the actuating button 1121 can depress when a user pushes the locking head against a lock interface member. This, in turn, can cause the engagement element 1120(b) to move forward as shown in FIG. 32(b) or cause the outer cylindrically-shaped base 1120(b) to move forward as shown in FIG. 32(c). Thus, when the locking head is placed in the lock interface member at the correct depth, the small button 1121 (or plunger or the spindle itself) pushed in. This action also comprises a spring, and the lock automatically moves into the locked position. A turn of the key unlocks the device and resets the spring. In this embodiment, the actuation of the locking head elements can be automatic.

Figure 33A:
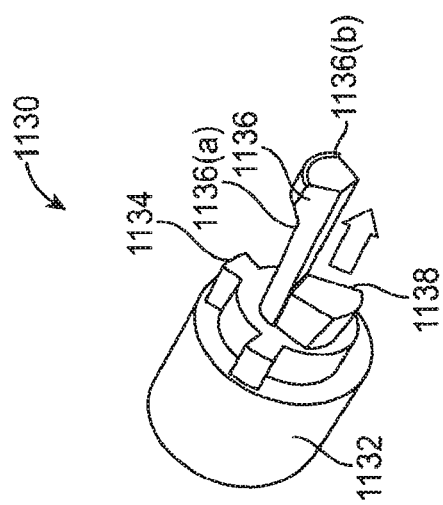
FIGS. 33(a)-33(b) respectively show locking head embodiments in unlocked and locked configurations.
Figure 33B:
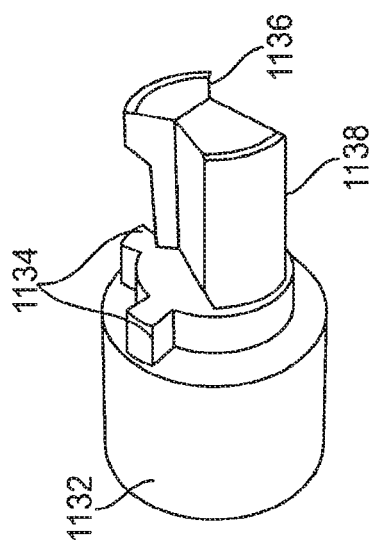
Figure 33C:
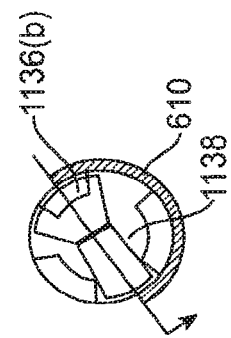
FIG. 33(c) shows a locking head embodiment secured to a lock interface member.

FIG. 33(a) shows another locking head embodiment according to another embodiment of the invention. The locking head 1130 includes a cylindrically-shaped base 1132 including axially extending stabilizing elements 1134. An engagement element 1136 with a linear portion 1136(a) and an engagement element 1136(b) can move axially within the cylindrically-shaped base 1132. An additional stabilizing element 1138 can move within the cylindrically-shaped base 1132. As shown FIG. 33(c), the engagement portion 1136(b) can lie over a protrusion in the lock interface member 610 when the lock interface member 610 is engaged to the locking head 1130. The stabilizing element 1138 can additionally reside between two adjacent internal protrusions in the lock interface member 610.

Figure 34B:
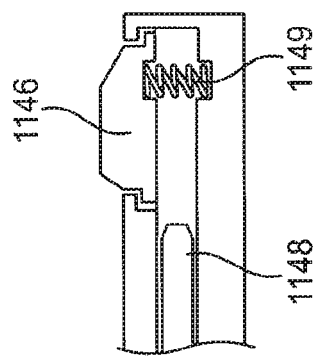
FIGS. 34(b)-34(c) show side, cross-sectional views of another locking head embodiment in an unlocked and locked configuration.
Figure 34C:
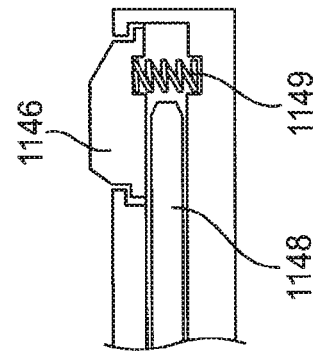
Figure 34A:
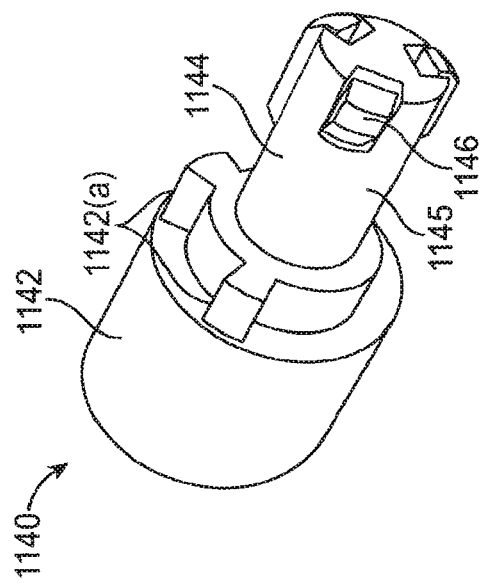
FIG. 34(a) shows a perspective view of another locking head embodiment.

FIG. 34(a) shows another locking head embodiment according to another embodiment of the invention. The locking head 1140 includes a cylindrically-shaped base 1142 including axially extending stabilizing elements 1144. An engagement element 1144 with a linear portion 1145 and movable engagement portions 1146 can extend from the base 1142. As shown in FIGS. 34(b)-34(c), the movable engagement portions 1146 can be biased radially outward using springs 1149. Moveable linear structures 1148 can be in the linear portion 1145 and can prevent the movable engagement portions 1146 from being pushed radially inward when the locking head 1130 is in a locked configuration.

Figure 35C:
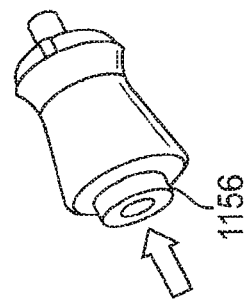
FIGS. 35(c)-35(d) respectively show how pushing a button on a lock body and how rotating a barrel on a lock body can be used to rotate engagement element portions.
Figure 35D:
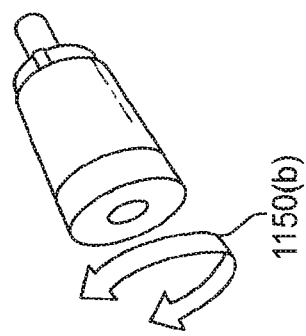
Figure 35A:
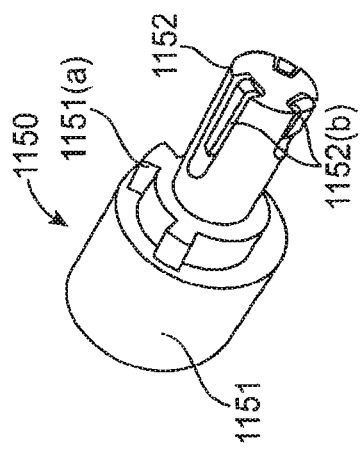
FIGS. 35(a)-35(b) show a perspective view of another locking head embodiment in an unlocked and a locked configuration.
Figure 35B:
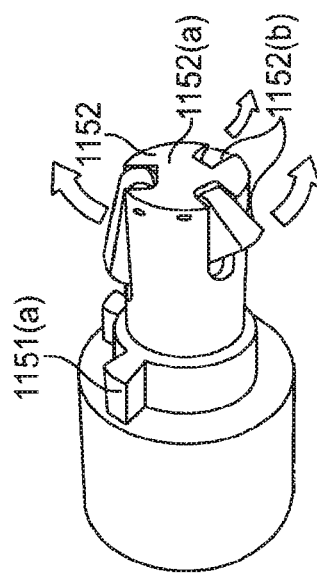

FIG. 35(a) shows another locking head embodiment according to another embodiment of the invention. The locking head 1150 includes a cylindrically-shaped base 1151 including axially extending stabilizing elements 1151(a). An engagement element 1152 with a linear portion 1152(a) and movable engagement portions 1152(b) can extend from the base 1151. As shown in FIG. 35(b), the movable engagement portions 1152(b) can extend radially outward when the locking head 1150 is in a locked configuration.

As shown in FIG. 35(a), when it is in an unlocked configuration, the engagement elements 1152(b) are flush with the linear portion 1152(a). Once placed into the lock interface member, the user pushes a button (as shown in FIG. 35(c)) or turns a knob (as shown in FIG. 36(d)) to change the locking head 1150 from a locked configuration to an unlocked configuration. The engagement elements 1152(b) then rotate into place, and are secured to the lock interface member.

FIG. 36(a) shows another locking head embodiment according to another embodiment of the invention. The locking head 1160 includes a cylindrically-shaped base 1162 including axially extending stabilizing elements 1162(a). An engagement element 1164 with a linear portion 1164(c) and movable engagement portions 1164(b) can extend from the base 1162. The linear portion 1164(c) has a triangular radial cross-section. As shown in FIG. 36(b), the movable engagement portions 1164(b) can extend radially outward when the locking head 1160 is in a locked configuration. More specifically, as shown in FIG. 36(c), when the linear portion 1164(c) rotates, it pushes the movable engagement portions 1164(b) outward so that they lie over protrusions in the lock interface member 610. The linear portion 1164(c) may be in the form of a triangular bar that is turned by a locking mechanism. This causes the locking "jaws" to rotate into place, preventing its removal from a lock interface member.

Figure 37C:
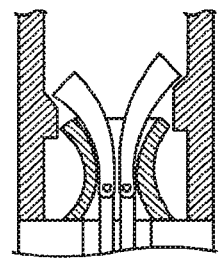
FIGS. 37(c)-37(d) respectively show side views of locking head embodiments within a lock interface member.
Figure 37D:
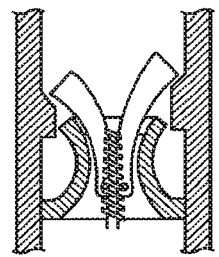
Figure 37A:
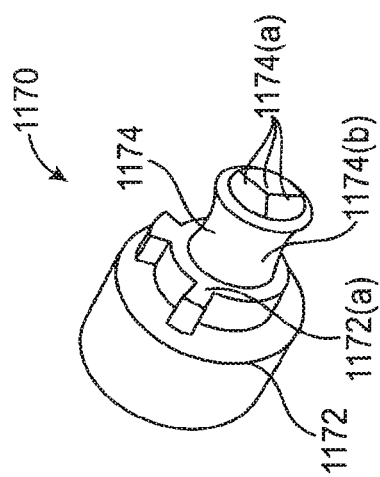
FIGS. 37(a)-37(b) show perspective views of another locking head embodiment in an unlocked and a locked configuration.
Figure 37B:
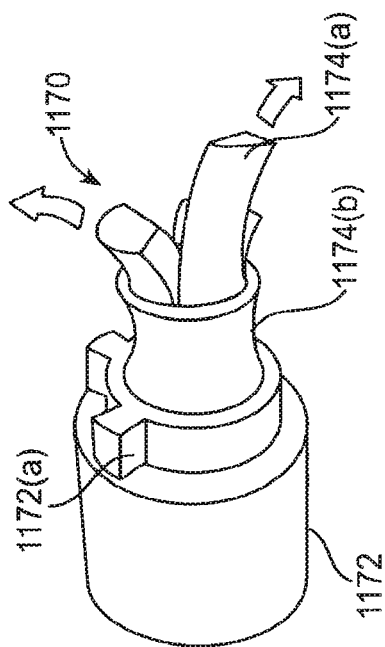

FIG. 37(a) shows another locking head embodiment according to another embodiment of the invention. The locking head 1170 includes a cylindrically-shaped base 1172 including axially extending stabilizing elements 1172(a). An engagement element 1174 with a linear portion 1174(b) and movable, curved, engagement portions 1164(a) can extend from the base 1172. The movable engagement portions 1174(a) are curved. The linear portion 1174(b) has curved sides and has a cylindrical shape. As shown in FIG. 37(b), the movable engagement portions 1174(a) can extend in a generally axial direction when the locking head 1170 is in a locked configuration. As shown in FIG. 37(a), when unlocked, the engagement portions 1174(a) are flush with the end of the linear portion 1174(b). Once placed into the lock interface member, the lock mechanism could push the engagement portions 1174(a) out via rods or using a high-angle helix to twist them out (see FIGS. 37(c) and 37(d)).

Figure 38C:
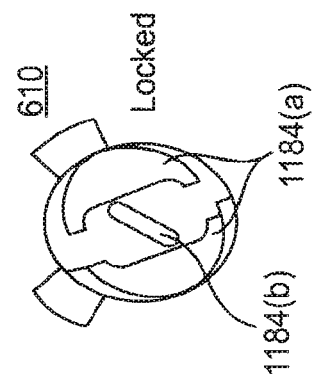
FIGS. 38(c)-38(d) respectively show outward views of the locking head embodiments in FIGS. 38(a)-38(b) when they are within a lock interface member.
Figure 38D:
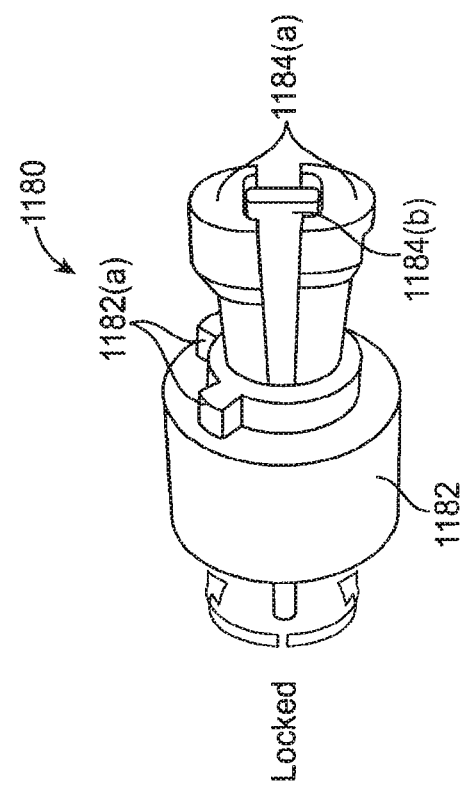
Figure 38A:
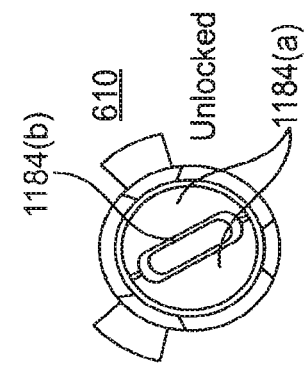
FIGS. 38(a)-38(b) respectively show perspective views of another locking head embodiment in an unlocked and a locked configuration.
Figure 38B:
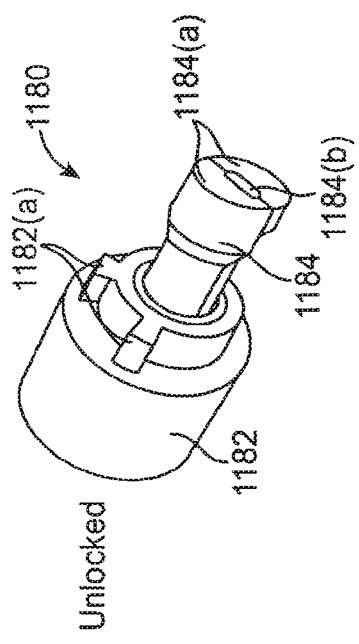

FIG. 38(a) shows another locking head embodiment according to another embodiment of the invention. The locking head 1180 includes a cylindrically-shaped base 1182 including axially extending stabilizing elements 1182(a). An engagement element 1184 with a linear portion 1184(b) and movable engagement portions 1184(a) can extend from the base 1182. The movable engagement portions 1184(a) have inner grooves that can receive the linear portion 1184(b). The linear portion 1184(b) has an elongated radial cross-section. As shown in FIG. 38(b), the movable engagement portions 1184(a) can move radially outward when the locking head 1180 is in a locked configuration. The linear portion 1184(b) can be twisted by a lock mechanism, causing the two locking "jaws" of the movable engagement portions 1184(a) to flex or hinge into place as shown in FIGS. 38(c) and 38(d).

Figure 39C:
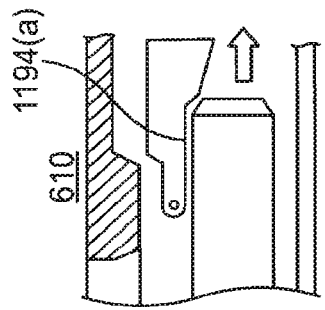
FIGS. 39(c)-39(d) show side cross-sectional views of the locking head embodiments in FIGS. 39(a)-39(b) when they are within a lock interface member.
Figure 39D:
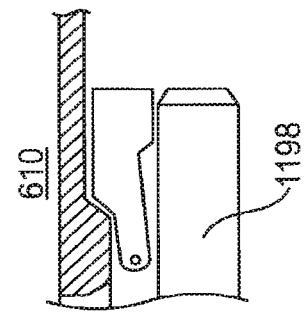
Figure 39A:
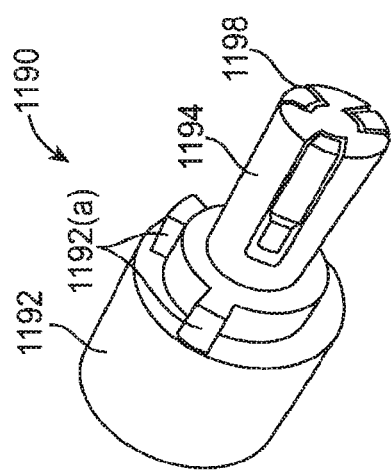
FIGS. 39(a)-39(b) respectively show perspective views of another locking head embodiment in an unlocked and a locked configuration.
Figure 39B:
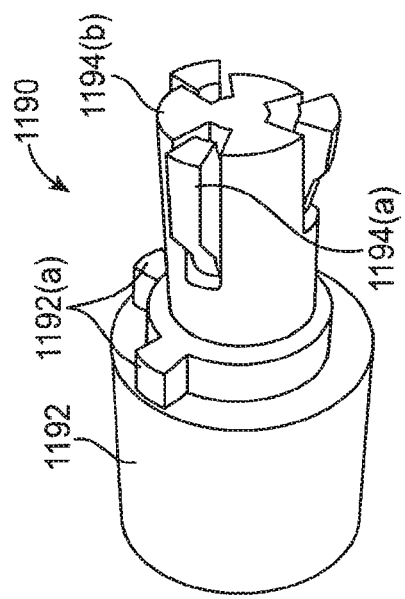

FIG. 39(a) shows another locking head embodiment according to another embodiment of the invention. The locking head 1190 includes a cylindrically-shaped base 1192 including axially extending stabilizing elements 1192(a). An engagement element 1194 with a linear portion 1194(b) and movable engagement portions 1194(a) can extend from the base 1194(b). As shown in FIG. 39(b), the movable engagement portions 1194(a) can be move radially outward. As shown in FIGS. 39(c) and 39(d), a moveable linear structure 1198 can be in the linear portion 1194(b) and can push the movable engagement portions 1194(a) outward so that they engage the protrusions of the lock interface member 610.

Figure 40C:
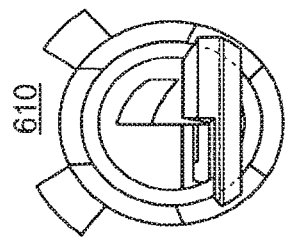
FIG. 40(c) shows an outward view of the locking head embodiment shown in FIG. 40(b) when it is inside of a lock interface member.
Figure 40D:
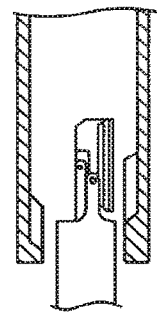
FIGS. 40(d)-40(e) show side cross-sectional views of the locking head embodiments in FIGS. 40(a)-40(b) when they are within a lock interface member.
Figure 40E:
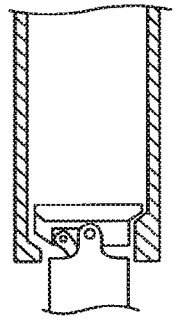
Figure 40A:
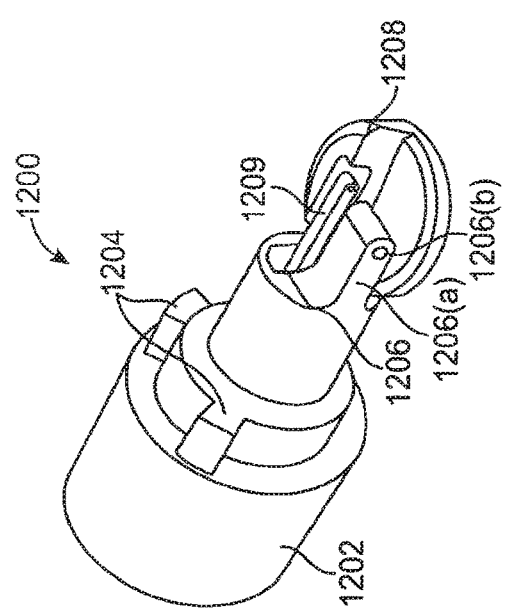
FIGS. 40(a)-40(b) respectively show perspective views of another locking head embodiment in an unlocked and a locked configuration.
Figure 40B:
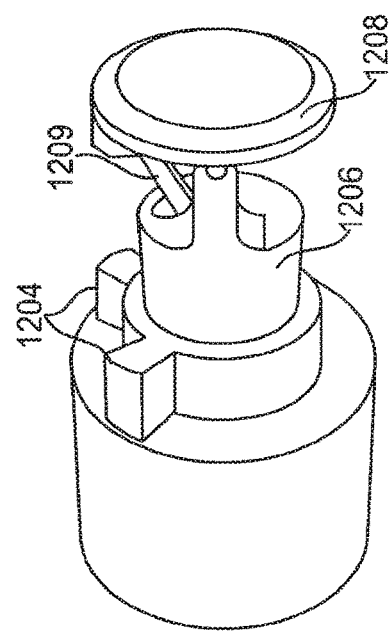

FIG. 40(a) shows another locking head embodiment according to another embodiment of the invention. The locking head 1200 includes a cylindrically-shaped base 1202 including axially extending stabilizing elements 1204. An engagement element 1208 in the form of plate is attached to a linear portion 1206 via a smaller linear portion 1206(a) and a hinge 1206(b). A second movable linear portion 1209 is attached to the engagement element 1208 and can move axially within the linear portion 1206 to cause the engagement element 1208 to be positioned perpendicular to (in a locked configuration) or parallel to (in an unlocked configuration) the linear portion 1209. Thus, in this embodiment, an engagement element 1208 in the form of a hinged plate or disc slides into the lock interface member. When the locking mechanism is actuated, the engagement element 1208 flips from horizontal to vertical, locking it into position. This is shown in FIGS. 40(c)-40(e).

Figure 41C:
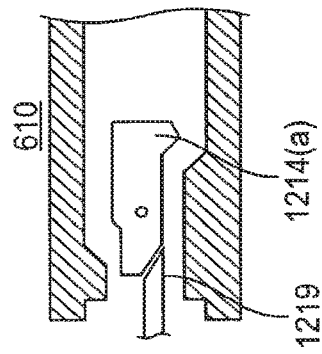
FIGS. 41(c) and 41(d) show additional views of the locking head embodiments in FIGS. 41(a)-41(b) when they are within a lock interface member.
Figure 41D:
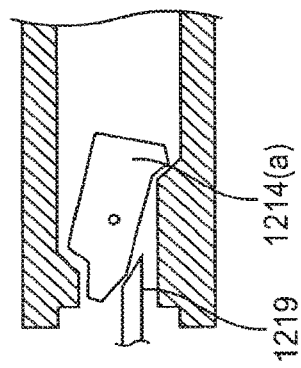
Figure 41A:
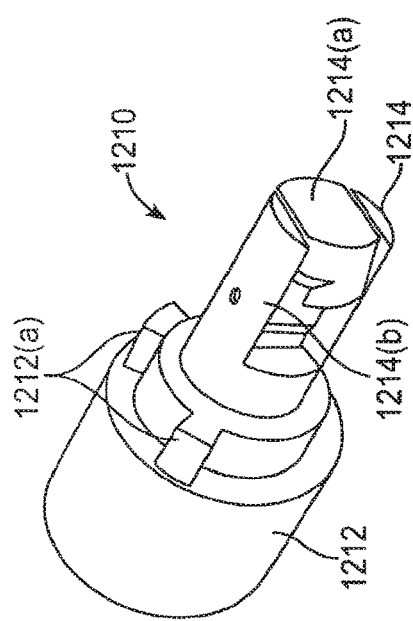
FIGS. 41(a)-41(b) respectively show perspective views of another locking head embodiment in an unlocked and a locked configuration.
Figure 41B:
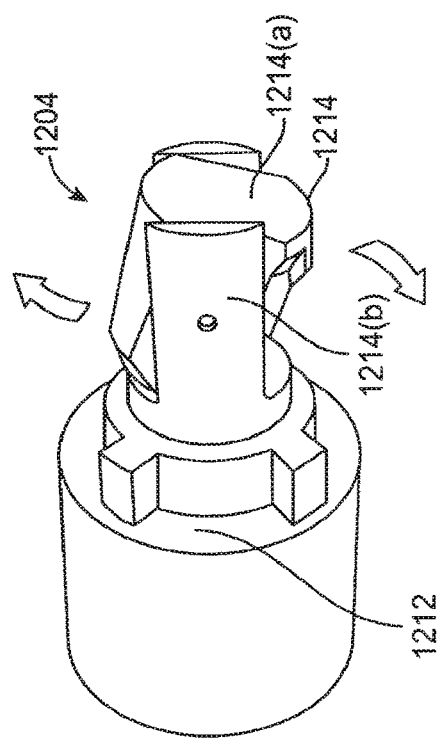

FIGS. 41(a) and 41(b) show another locking head embodiment according to another embodiment of the invention. The locking head 1210 includes a cylindrically-shaped base 1212 including axially extending stabilizing elements 1214. An engagement element 1214 with an engagement portion 1214(a), in the form of tiltable structure, is attached to linear portions 1214(b) via a hinge 1206(b). As shown in FIGS. 41(c) and 41(d), the engagement portion 1214(a) of the engagement element 1214 is flush with the linear portions 1214(b) when it is in an unlocked configuration. After the structure is placed inside the lock interface member, as shown in FIGS. 41(c) and 41(d), the lock mechanism drives a rod 1219 forward, locking the engagement element 1214 in place.

Figure 42A:
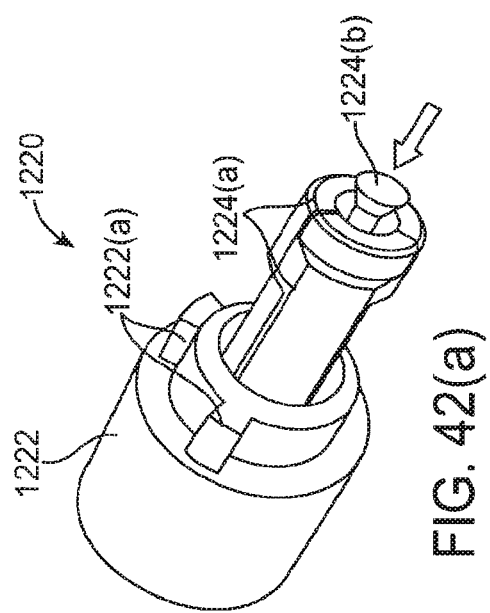
FIGS. 42(a)-42(b) respectively show perspective views of another locking head embodiment in an unlocked and a locked configuration.
Figure 42B:
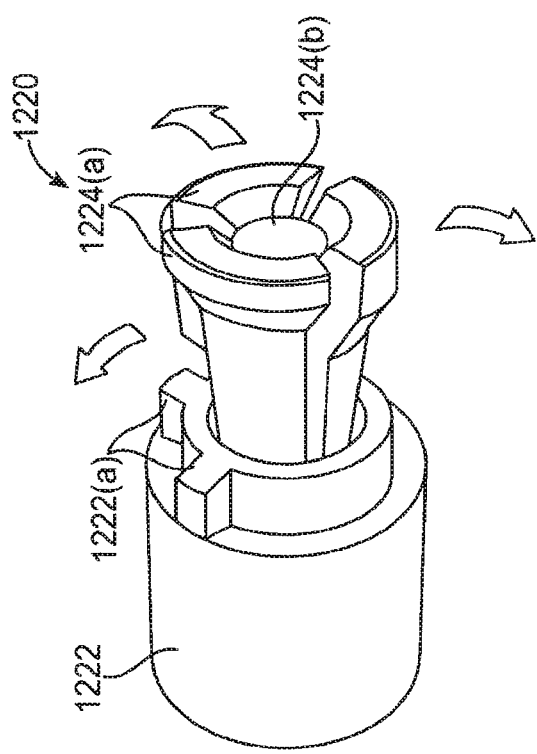
Figure 42C:
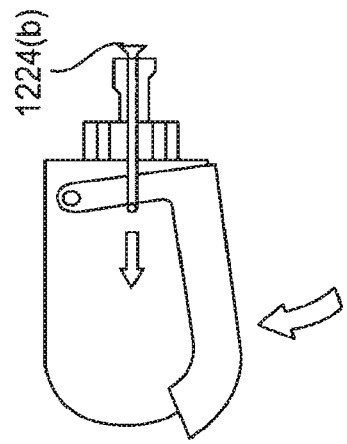
FIG. 42(c) shows a side view of the locking head embodiment shown in FIGS. 42(a)-42(b).

FIG. 42(a) shows another locking head embodiment according to another embodiment of the invention. The locking head 1220 includes a cylindrically-shaped base 1222 including axially extending stabilizing elements 1222(a). An engagement element 1224 with a linear portion 1224(b) and movable engagement portions 1224(a) can extend from the base 1222. As shown in FIG. 42(b), the movable engagement portions 1224(a) can move radially outward. As shown in FIG. 42(b), a linear portion 1224(b) can push the movable engagement portions 1224(a) outward so that they engage the protrusions of a lock interface member. The linear portion 1224(b) can have a flared end that is pulled back by a lock mechanism (e.g., as shown in FIG. 42(c). The flared end forces the three engagement portions 1224(b) apart preventing removal of the locking head 1220 from a lock interface member.

Figure 43C:
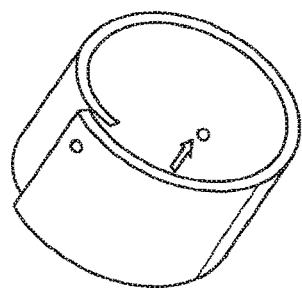
FIGS. 43(c)-43(d) respectively show an engagement element in an unlocked and a locked configuration.
Figure 43D:
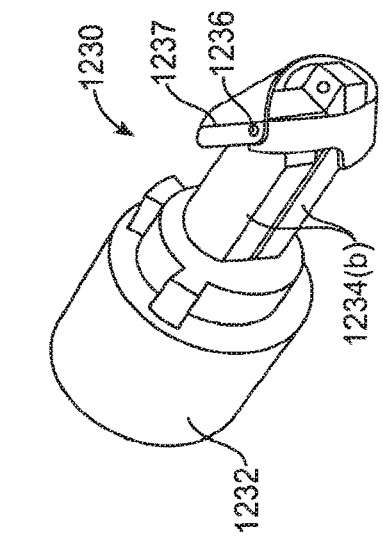
Figure 43A:
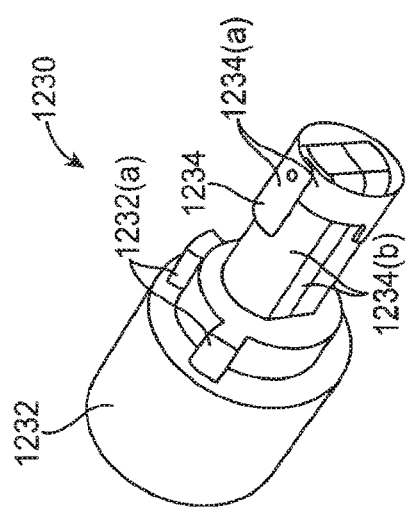
FIGS. 43(a)-43(b) respectively show perspective views of another locking head embodiment in an unlocked and a locked configuration.
Figure 43B:
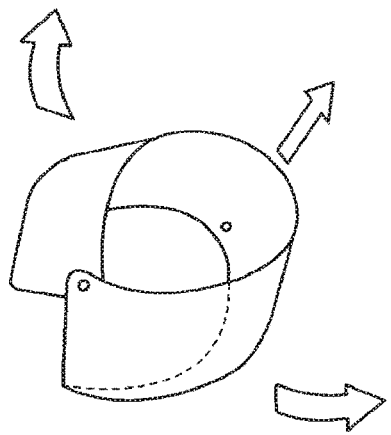

FIG. 43(a) shows another locking head embodiment according to another embodiment of the invention. The locking head 1230 includes a cylindrically-shaped base 1232 including axially extending stabilizing elements 1232(a). An engagement element 1234 with a movable engagement portion 1234(a), and linear portions 1234(b), can extend from the base 1232. As shown in FIG. 43(b), the movable engagement portions 1234(a) can move radially outward. As shown in FIG. 43(b), linear portions 1234(b) and can push the movable engagement portion 1234(a) outward so that it engages the protrusions of a lock interface member. When placed inside of a lock interface member, the linear portions 1234(b) are actuated. This distorts the engagement portion 1234(b) which may be in the form of a cylindrical leaf spring and prevents the locking head 1230 from being removed from a lock interface member.

Figure 44C:
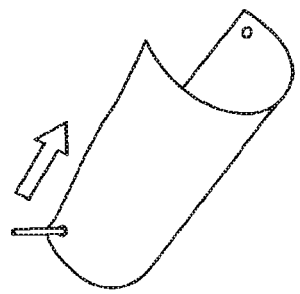
FIGS. 44(c)-44(d) respectively show an engagement element in an unlocked and a locked configuration.
Figure 44D:
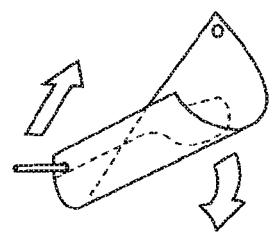
Figure 44A:
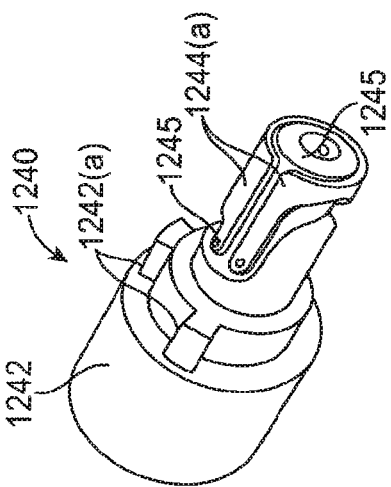
FIGS. 44(a)-44(b) respectively show perspective views of another locking head embodiment in an unlocked and a locked configuration.
Figure 44B:
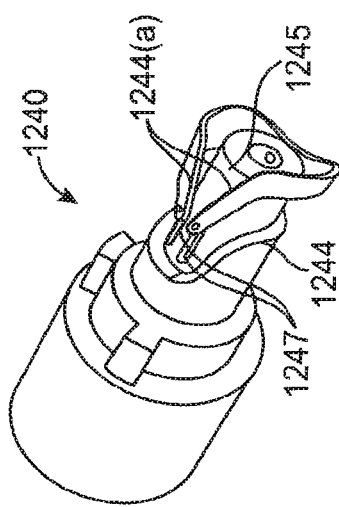

FIGS. 44(a)-44(b) show another locking head embodiment according to another embodiment of the invention. The locking head 1240 includes a cylindrically-shaped base 1242 including axially extending stabilizing elements 1242(a). An engagement element 1244 with a linear portion 1244(b) and movable engagement portions 1244(a) can extend from the base 1242. As shown in FIG. 44(b), the movable engagement portions 1244(a) can move radially outward. Pins 1245 may couple the linear portion 1244(b) to the engagement portions 1244(a) and may move linearly within tracks 1247 in the linear portion 1244(b). This embodiment is a variation on the embodiment in FIGS. 44(a) and 44(b). In this embodiment, once the locking head portions are placed inside the lock interface member, the locking mechanism drives two pins 1245 forward, causing the movable engagement portions 1244(a), which may be a leaf spring, to distort and locking it in place. FIGS. 44(c)-44(d) show the movement of the leaf spring between locked and unlocked configurations.

Figure 45C:
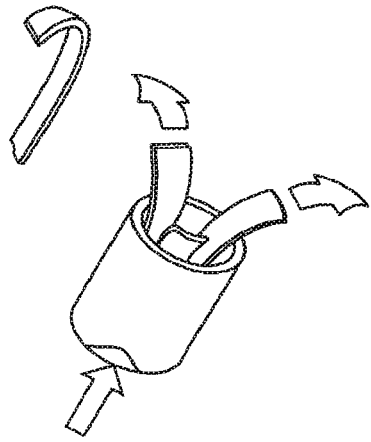
FIGS. 45(c)-45(d) respectively show an unlocked and a locked configuration of an exemplary engagement element.
Figure 45D:
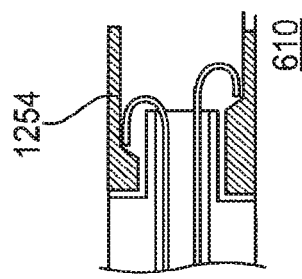
Figure 45A:
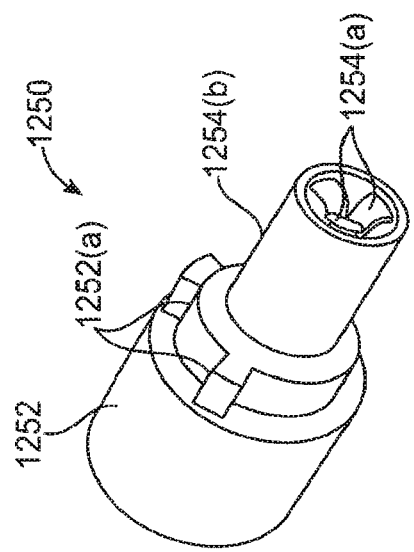
FIGS. 45(a)-45(b) respectively show perspective views of another locking head embodiment in an unlocked and a locked configuration.
Figure 45B:
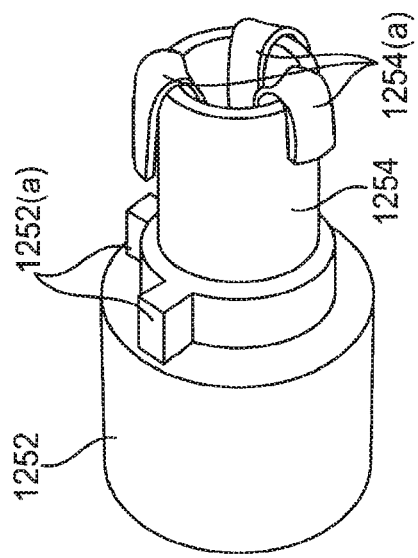

FIGS. 45(a)-45(b) show another locking head embodiment according to another embodiment of the invention. The locking head 1250 includes a cylindrically-shaped base 1252 including axially extending stabilizing elements 1252(a). An engagement element 1254 with a cylindrically shaped linear portion 1254(*b*) and movable engagement portions 1254(*a*) can extend from the base 1252. As shown in FIG. 45(*b*), the movable engagement portions 1254(*a*) can move radially outward to engage protrusions in a lock interface member 610 as shown in FIGS. 45(*c*) and 45(*d*). This embodiment can be considered a "triple leaf spring embodiment. When the locking head 1250 is in an unlocked configuration, three engagement portions 1254(*b*) in the form of three leaf springs with a "memorized" shape are inside the linear portion 1254(*b*). Once in place in the linear portion 1254(*b*), a lock mechanism pushes the engagement portions 1254(*b*) out, they return to their original shape, and the locking head 1250 cannot be separated from the lock interface member 610.

I. EXAMPLES

Three different types of locking systems were produced for testing. The engagement elements include a Type A system which resembled T-bars like those described in U.S. Pat. No. 5,502,989, a Type B system which resembled the mechanism shown in FIGS. 2(*b*) and 2(*d*) in the present application, and a Type C system which resembled the mechanism shown in FIGS. 4(*a*)-4(*c*) in the present application.

A. Test Description

A test rig was used to apply the pull force to the systems. A multi-meter was used to measure the force a load sensor from 0-3000 lbs. The basic rig was used to pull on all three locking mechanisms. As each mechanism was a different shape, each locking mechanism required a slightly different fixture to hold the unit in place for the pull test.

The objective of each test fixture was to lock the mechanism into place and pull axially along the shaft of the T-bar or other type of engagement element, and 90 degrees to the engagement surface.

Type A system including a T-bar: An engagement plate with a conventional 3.times.7 mm·sup.2 slot was affixed to a test rig with C clamps. The Type A T-bar test fixture was locked into place and pulled using a flat clamp to hold the top of the locking mechanism. The T-bar and engagement plate were made of stainless steel.

Type B system: An engagement plate with a configuration like the lock interface member in FIG. 2(*b*) was affixed to the test rig with C clamps. The Type B system was locked into place and pulled using a radial clamp to hold the top of the locking mechanism. All parts were made of stainless steel.

Type C system: An engagement plate with a configuration like the lock interface member shown in FIGS. 4(*a*)-4(*c*) included two parts including the actual engagement surface and a plate with C clamps, which held the engagement surface to the rig. As the Type C system did not have enough surface area to grip with a clamp, the Type C system was locked into place and was pulled using a flat steel metal piece with a hole in it for the shaft. All parts were made of stainless steel.

Six Type A T-bar samples, and five Type B and five Type C samples were tested. Each locking mechanism was attached to its corresponding fixture and pulled until a failure was noticed. The force of the pull was recorded by the multi-meter as a voltage. Then after the recording, the pound force required to cause the failure was calculated.

B. Test Results

Test results for the Type A system are provided below.

| Type A T-bar Sample No. | Pull force to Failure | Type of failure |
| --- | --- | --- |
| 1 | 1273.5 lbs | Unit bent |
| 2 | 1219.7 lbs | Unit broke |
| 3 | 699.5 lbs | Unit broke |
| 4 | 1215.2 lbs | Unit broke |
| 5 | 1210.7 lbs | Unit broke |
| 6 | 1174.8 lbs | Unit broke |

Test results for the Type B system are provided below.

| Type B Sample No. | Pull force to failure | Type of failure |
| --- | --- | --- |
| 1 | 1520.1 lbs | Deformed |
| 2 | 1937.2 lbs | Deformed and broke (It was not clear whether the other units broke or only deformed as broken pieces may have been missed as they were so small) |
| 3 | 1488.7 | Deformed |
| 4 | 1668.1 | Deformed |
| 5 | 1937.2 | Deformed |

Test results for the Type C system are provided below.

| Type C Sample No. | Pull force to failure (lbs) | Type of failure |
| --- | --- | --- |
| 1 | 1757.8 | Unit broke |
| 2 | 1753.3 | Unit broke |
| 3 | 1793.7 | Unit broke |
| 4 | 1623.3 | Unit broke |
| 5 | 1668.1 | Unit broke |

The Type A T-Bar failure range was from 699.5 to 1273.5 with an average of 1132.2. The Type B failure range was from 1448.7 to 1937.2 with an average of 1710.3. The Type C failure range was from 1623.3 to 1793.7 with an average of 1719.2. Based on the averages as well as the 5 data points, the Type B and Type C embodiments required greater pound force to failure than the Type A T-bar embodiment. On average, the Type C embodiment and the Type B embodiment experienced approximately 50% more pound force to failure than the Type A T-bar embodiment.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A security apparatus for securing a portable electronic device to an immovable object, the portable electronic device having an aperture, the security apparatus comprising:
a locking head including
a base,
a first linear element extending from the base, the first linear element configured to be inserted into the aperture of the portable electronic device, and
a movable engagement element coupled to an end of the first linear element opposite from the base, the movable engagement element configured to be inserted into the aperture of the portable electronic device with the first linear element, the movable engagement element movable to a position in which the movable engagement element is perpendicular to the first linear element to secure the locking head to the portable electronic device; and
a security device attached to the locking head and configured to engage the immovable object.

2. The security apparatus of claim 1, wherein the movable engagement element is movable from a position in which the movable engagement element is parallel to the first linear element to the position in which the movable engagement element is perpendicular to the first linear element.

3. The security apparatus of claim 2, wherein the movable engagement element is rotatable between the position in which the movable engagement element is parallel to the first linear element and the position in which the movable engagement element is perpendicular to the first linear element.

4. The security apparatus of claim 1, wherein the movable engagement element is coupled to the end of the first linear element via a hinge.

5. The security apparatus of claim 1, wherein the locking head further includes a second linear element extending from the base and connected to the movable engagement element, and wherein the second linear element is actuatable to cause movement of the movable engagement element.

6. The security apparatus of claim 5, wherein the second linear element actuates in an axial direction out of the base to cause the movable engagement element to be perpendicular to the first linear element.

7. The security apparatus of claim 6, wherein the second linear element actuates in an axial direction into the base to cause the movable engagement element to be parallel to the first linear element.

8. The security apparatus of claim 5, wherein the second linear element extends parallel to the first linear element.

9. The security apparatus of claim 5, wherein the second linear element is connected to the movable engagement element via a hinge.

10. The security apparatus of claim 1, further comprising a lock mechanism coupled to the locking head, wherein the lock mechanism is operable to move the movable engagement element relative to the first linear element.

11. The security apparatus of claim 1, wherein the security device includes a cable.

12. A security apparatus for securing a portable electronic device to an immovable object, the portable electronic device having an aperture, the security apparatus comprising:
a locking head including
a base,
a first linear element extending from the base, the first linear element configured to be inserted into the aperture of the portable electronic device,
a movable engagement element coupled to the first linear element, the movable engagement element configured to be inserted into the aperture of the portable electronic device with the first linear element, and
a second linear element extending from the base and connected to the movable engagement element, the second linear element actuatable relative to the base to move the movable engagement element relative to the first linear element; and
a security device attached to the locking head and configured to engage the immovable object.

13. The security apparatus of claim 12, wherein the second linear element is actuatable relative to the base to move the movable engagement element between a first position, in which the movable engagement element is parallel to the first linear element, and a second position, in which the movable engagement element is perpendicular to the first linear element.

14. The security apparatus of claim 13, wherein the second linear element actuates in an axial direction into the base to move the movable engagement element toward the first position, and in an axial direction out of the base to move the movable engagement element toward the second position.

15. The security apparatus of claim 12, wherein the movable engagement element is rotatable relative to the first linear element.

16. The security apparatus of claim 12, further comprising a lock mechanism coupled to the lock head, wherein the lock mechanism is operable to actuate the second linear element relative to the base.

17. The security apparatus of claim 12, wherein the security device includes a cable.

18. A system comprising:
a portable electronic device having an aperture; and
a security apparatus including
a locking head having
a base,
a first linear element extending from the base, the first linear element being insertable into the aperture of the portable electronic device,
a movable engagement element coupled to the first linear element, the movable engagement element being insertable into the aperture of the portable electronic device with the first linear element, and
a second linear element extending from the base and connected to the movable engagement element, the second linear element actuatable relative to the base to move the movable engagement element between a first position, in which the movable engagement element is parallel to the first linear element and is insertable into the aperture, and a second position, in which the movable engagement element is perpendicular to the first linear element to secure the locking head to the portable electronic device, and
a security device attached to the locking head and configured to engage an immovable object to secure the portable electronic device to the immovable object.

19. The system of claim 18, wherein the security apparatus further includes a lock mechanism coupled to the lock head, and wherein the lock mechanism is operable to actuate the second linear element relative to the base.

20. The system of claim 18, wherein the security device includes a cable.

* * * * *